United States Patent
Abbott et al.

(10) Patent No.: US 11,221,611 B2
(45) Date of Patent: Jan. 11, 2022

(54) POWER TOOL INCLUDING A MACHINE LEARNING BLOCK

(71) Applicant: MILWAUKEE ELECTRIC TOOL CORPORATION, Brookfield, WI (US)

(72) Inventors: Jonathan E. Abbott, Milwaukee, WI (US); John S. Dey, IV, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 8 days.

(21) Appl. No.: 16/254,910

(22) Filed: Jan. 23, 2019

(65) Prior Publication Data

US 2019/0227528 A1     Jul. 25, 2019

Related U.S. Application Data

(60) Provisional application No. 62/621,095, filed on Jan. 24, 2018.

(51) Int. Cl.
*G05B 19/4155* (2006.01)
*G05B 13/02* (2006.01)
(Continued)

(52) U.S. Cl.
CPC .......... *G05B 19/4155* (2013.01); *B25F 5/00* (2013.01); *G05B 13/027* (2013.01);
(Continued)

(58) Field of Classification Search
CPC .............. G05B 13/027; G05B 13/0265; G05B 19/4155; G05B 2219/33034;
(Continued)

(56) References Cited

U.S. PATENT DOCUMENTS 5,914,882 A    6/1999  Yeghiazarins
6,308,138 B1  10/2001  Jones et al.
(Continued)

FOREIGN PATENT DOCUMENTS

EP    1398119 A1    3/2004
JP    H07186060 A   7/1995

OTHER PUBLICATIONS

Invitation to Pay Additional Fees and Partial Search Report for Application No. PCT/US2019/014683, dated Apr. 15, 2019, 13 pages.
(Continued)

*Primary Examiner* — M. N. Von Buhr
(74) *Attorney, Agent, or Firm* — Michael Best & Friedrich LLP

(57) ABSTRACT

A power tool includes a housing and a sensor, a machine learning controller, a motor, and an electronic controller supported by the housing. The sensor is configured to generate sensor data indicative of an operational parameter of the power tool. The machine learning controller includes a first processor and a first memory and is coupled to the sensor. The machine learning controller further includes a machine learning control program configured to receive the sensor data, process the sensor data using the machine learning control program, and generate an output based on the sensor data using the machine learning control program. The electronic controller includes a second processor and a second memory and is coupled to the motor and to the machine learning controller. The electronic controller is configured to receive the output from the machine learning controller and control the motor based on the output.

22 Claims, 33 Drawing Sheets

(51) Int. Cl.
   *G06N 20/00*       (2019.01)
   *B25F 5/00*        (2006.01)
   *B23D 51/16*       (2006.01)
   *B25B 21/02*       (2006.01)

(52) U.S. Cl.
   CPC ......... *G05B 13/0265* (2013.01); *G06N 20/00* (2019.01); *B23D 51/16* (2013.01); *B25B 21/02* (2013.01); *G05B 2219/31103* (2013.01); *G05B 2219/33034* (2013.01)

(58) Field of Classification Search
   CPC . G05B 2219/31103; B25F 5/00; B25B 21/02; B23D 51/16; G06N 20/00
   See application file for complete search history.

(56) References Cited

U.S. PATENT DOCUMENTS

| | | | |
|---|---|---|---|
| 6,336,931 | B1 | 1/2002 | Hsu et al. |
| 7,372,226 | B2 | 5/2008 | Wilker et al. |
| 7,699,118 | B2 | 4/2010 | Setter et al. |
| 9,537,335 | B2 * | 1/2017 | Furui ............... B25F 3/00 |
| 9,652,217 | B2 | 5/2017 | Winkler et al. |
| 9,707,671 | B2 | 7/2017 | Shi |
| 10,331,088 | B2 * | 6/2019 | Boeck ............ B25F 5/021 |
| 10,706,640 | B2 * | 7/2020 | Wenger ........... B25F 5/00 |
| 2004/0182588 | A1 * | 9/2004 | Tokunaga ....... B25B 23/1475 173/2 |
| 2006/0155582 | A1 * | 7/2006 | Brown ............ G06F 19/3418 705/3 |
| 2006/0289183 | A1 | 12/2006 | Schreiber |
| 2014/0107853 | A1 * | 4/2014 | Ashinghurst ........ B25F 5/00 700/297 |
| 2014/0158390 | A1 | 6/2014 | Mashiko et al. |
| 2015/0217449 | A1 * | 8/2015 | Meier ............. B25J 9/1602 700/257 |
| 2016/0167186 | A1 * | 6/2016 | Chan ............... B25F 5/00 173/2 |
| 2016/0342151 | A1 | 11/2016 | Dey, IV et al. |
| 2016/0354848 | A1 | 12/2016 | Myrfield, Jr. |
| 2016/0361070 | A1 | 12/2016 | Ardel et al. |
| 2016/0375570 | A1 * | 12/2016 | Boeck ............. H02P 6/00 700/169 |
| 2017/0028521 | A1 | 2/2017 | Yamamoto |
| 2017/0032281 | A1 | 2/2017 | Hsu |
| 2017/0090430 | A1 * | 3/2017 | Nakazawa ........ H02P 29/60 |
| 2017/0232597 | A1 * | 8/2017 | Gaul ............. B25B 23/1475 29/407.02 |
| 2018/0164756 | A1 * | 6/2018 | Yamaguchi ...... G05B 19/4083 |
| 2019/0205950 | A1 * | 7/2019 | Balasubramanian ........ H04L 67/306 |
| 2020/0052479 | A1 * | 2/2020 | Friedman .......... H02H 7/20 |
| 2021/0240145 | A1 * | 8/2021 | Abbott ............. B25F 5/02 |

OTHER PUBLICATIONS

International Search Report and Written opinion for Application No. PCT/US2019/014683, dated Jun. 19, 2019, 19 pages.

Sense, "The Sense Home Energy Monitor," <https://sense.com/> website available as early as Oct. 1, 2015, 4 pages.

* cited by examiner

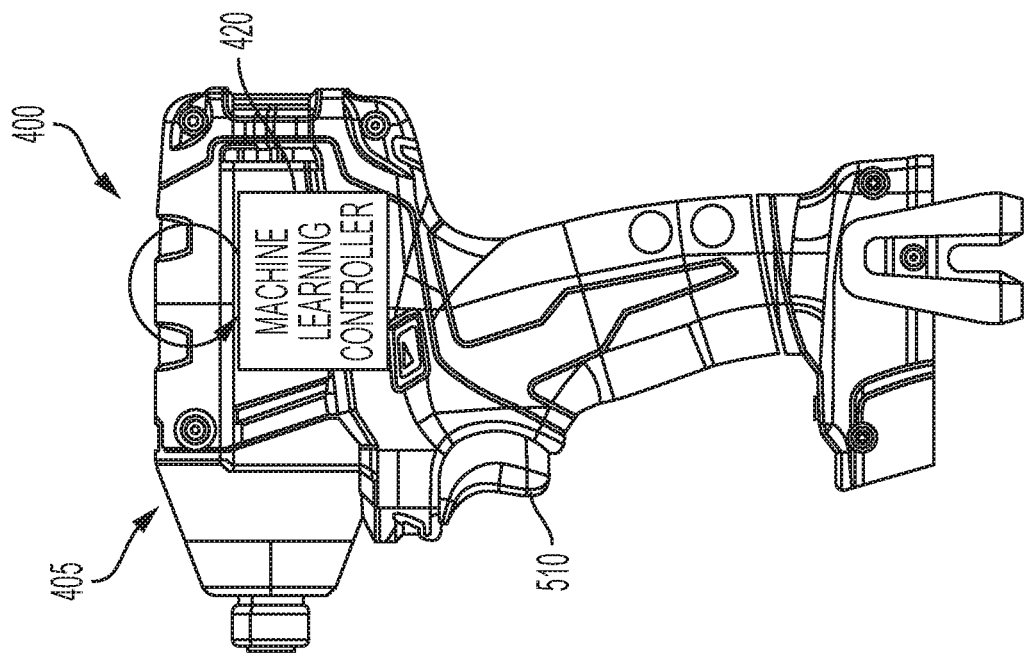

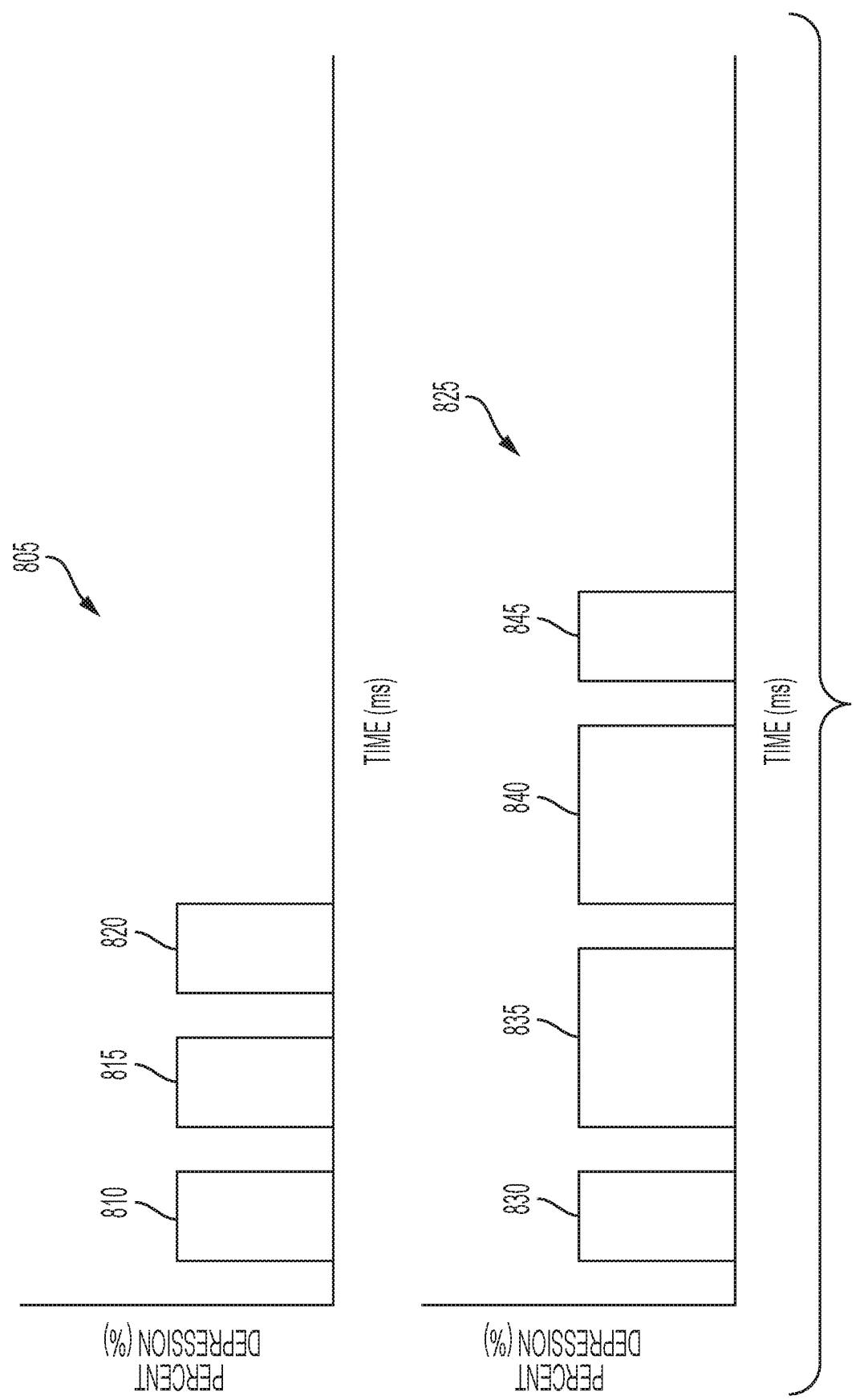

POWER TOOL INCLUDING A MACHINE LEARNING BLOCK

RELATED APPLICATIONS

This application claims priority to U.S. Provisional Patent Application No. 62/621,095, filed on Jan. 24, 2018, the entire contents of which are hereby incorporated by reference.

FIELD OF THE INVENTION

The present invention relates to power tools that adjust operation based on detected signals.

SUMMARY

In one embodiment, a power tool is provided including a motor, a sensor, and an electronic control assembly having a machine learning controller including an electronic processor and a memory. The sensor is configured to generate sensor data indicative of an operational parameter of the power tool. The electronic control assembly is coupled to the sensor and the motor and is configured to receive the sensor data from the sensor, and control the motor. The machine learning controller is configured to receive the sensor data and generate an output based on the sensor data using machine learning control. The electronic control assembly is further configured to activate the motor based on the output from the machine learning controller.

In some embodiments, the output is at least one selected from the group consisting of: an identity of a type of fastener, an identity of a target operating mode, an identity of a type of operation, a torque value, a detected obstacle indication, an abnormal accessory condition indication, a kickback indication, and an operation completed indication. In some embodiments, the machine learning controller receives feedback and retrains the machine learning control based on the feedback.

In one embodiment, a power tool is provided including a motor, a sensor, a transceiver, and an electronic control assembly having an electronic processor and a memory. The electronic processor is coupled to the sensor, the motor, and the transceiver. The sensor is configured to generate sensor data indicative of an operational parameter of the power tool. The electronic processor is configured to receive, via the transceiver, a tool profile with an operational parameter threshold, for the operational parameter, that is generated by a machine learning controller residing remote from the power tool. The electronic processor is further configured to receive the sensor data from the sensor, compare the sensor data to the operational parameter threshold, and control the motor based on the comparison.

In one embodiment, a machine learning controller in communication with a power tool is provided. The machine learning controller includes an electronic processor coupled to a memory storing a machine learning control trained using tool usage data. The electronic processor is configured to receive new tool usage data and, through execution of the machine learning control, generate an output based on the new tool usage data. The electronic processor is further configured to generate a tool profile with an operational parameter threshold based on the output, and to transmit the tool profile to the power tool.

In one embodiment, a machine learning controller in communication with a plurality of power tools is provided. The machine learning controller includes an electronic processor coupled to a memory storing a machine learning control trained using tool usage data. The electronic processor is configured to receive new tool usage data and, through execution of the machine learning control, generate an output based on the new tool usage data indicative of the type of tool that generated the new tool usage data.

In one embodiment, a power tool is provided including a housing, a sensor supported by the housing and configured to generate sensor data indicative of an operational parameter of the power tool, a machine learning controller supported by the housing, a motor supported by the housing, and an electronic controller supported by the housing. The machine learning controller includes a first processor and a first memory, is coupled to the sensor, and includes a machine learning control program. The machine learning controller is configured to: receive the sensor data; process the sensor data, using the machine learning control program, wherein the machine learning control program is a trained machine learning control program; and generate, using the machine learning control program, an output based on the sensor data. The electronic controller includes a second processor and a second memory and is coupled to the motor and to the machine learning controller. The electronic controller is configured to receive the output from the machine learning controller, and to control the motor based on the output.

In one embodiment, a method of operating a power tool is provided. The method includes generating, by a sensor of the power tool, sensor data indicative of an operational parameter of the power tool; and receiving, by a machine learning controller of the power tool, the sensor data. The machine learning controller includes a first memory and a first processor configured to execute instructions stored on the first memory. The method further includes processing the sensor data, using a machine learning control program of the machine learning controller; and generating, using the machine learning control program, an output based on the sensor data. The method also includes receiving, by an electronic controller of the power tool, the output from the machine learning controller. The electronic controller includes a second memory and a second processor configured to execute instructions stored on the second memory. The method further includes controlling, by the electronic controller, a motor of the power tool based on the output.

In one embodiment, an external system device is provided in communication with a power tool. The external system device includes a transceiver for communicating with the power tool and a first machine learning controller in communication with the transceiver. The machine learning controller includes an electronic processor and a memory, and is configured to receive, via the transceiver, tool usage data from the power tool including feedback collected by the power tool. The machine learning controller is further configured to train a machine learning control program using the tool usage data to generate an updated machine learning control program. The updated machine learning control program is configured to be executed by a second machine learning controller of the power tool to cause the second machine learning controller of the power tool to: receive power tool sensor data as input, process the power tool sensor data, using the machine learning control program, and provide an output, on which motor control is to be based, to a power tool electronic controller that controls a motor of the power tool. The machine learning controller is further configured to transmit, via the transceiver, the updated machine learning control program to the power tool.

Additional embodiments are described below.

BRIEF DESCRIPTION OF THE DRAWINGS

FIGS. 4A-B illustrate a fourth power tool system.

FIG. 8 illustrates an example trigger activation patterns.

DETAILED DESCRIPTION

Figure 1:
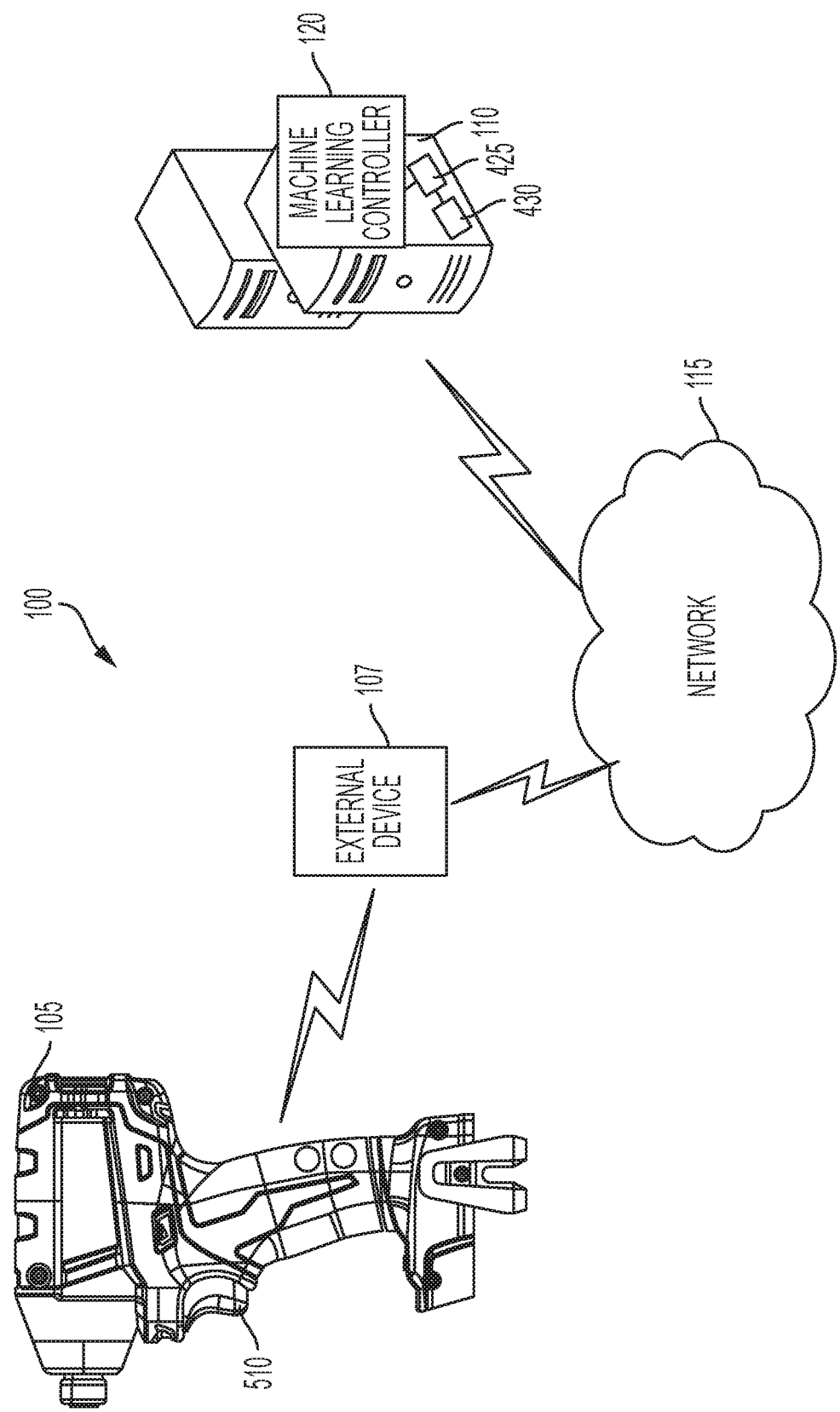
FIG. 1 illustrates a first power tool system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected," "supported by," and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Some power tools include sensors and a control system that uses hard-corded thresholds to, for example, change or adjust the operation of the tool. For example, a sensor may detect that a battery voltage is below a predetermined, hard-coded threshold. The power tool may then cease operation of the motor to protect the battery pack. While these type of thresholds may be simple to implement and provide some benefit to the operation of a power tool, these type of hard-coded thresholds cannot adapt to changing conditions or applications during which the power tool is operated, and may not ultimately be helpful in detecting and responding to more complicated conditions such as, for example, when the power tool experiences kickback.

The present application describes various systems in which a machine learning controller is utilized to control a feature or function of the power tool. For example, the machine learning controller, instead of implementing hard-coded thresholds determined and programmed by, for example, an engineer, detects conditions based on data collected during previous operations of the power tool. In some embodiments, the machine learning controller determines adjustable thresholds that are used to operate the tool based on, for example, a particular application of the power tool or during a particular mode of the power tool. Accordingly, the thresholds, conditions, or combinations thereof are based on previous operation of the same type of power tool and may change based on input received from the user and further operations of the power tool.

FIG. 1 illustrates a first power tool system 100. The first power tool system 100 includes a power tool 105, an external device 107, a server 110, and a network 115. The power tool 105 includes various sensors and devices that collect usage information during the operation of the power tool 105. The usage information may alternatively be referred to as operational information of the power tool 105, and refers to, for example, data regarding the operation of the motor (e.g., speed, position, acceleration, temperature, usage time, and the like), the operating mode of the power tool 105 (e.g., driving mode, impact mode, operation time in each mode, frequency of operation in each mode, and the like), conditions encountered during operation (e.g., overheating of the motor, and the like), and other aspects (e.g., state of charge of the battery, rate of discharge, and the like).

In the illustrated embodiment, the power tool 105 communicates with the external device 107. The external device 107 may include, for example, a smart telephone, a tablet computer, a cellular phone, a laptop computer, a smart watch, and the like. The power tool 105 communicates with the external device 107, for example, to transmit at least a portion of the usage information for the power tool 105, to receive configuration information for the power tool 105, or a combination thereof. In some embodiments, the external device may include a short-range transceiver to communicate with the power tool 105, and a long-range transceiver to communicate with the server 110. In the illustrated embodiment, the power tool 105 also includes a transceiver to communicate with the external device via, for example, a short-range communication protocol such as BLUETOOTH®. In some embodiments, the external device 107 bridges the communication between the power tool 105 and the server 110. That is, the power tool 105 transmits operational data to the external device 107, and the external device 107 forwards the operational data from the power tool 105 to the server 110 over the network 115. The network 115 may be a long-range wireless network such as the Internet, a local area network ("LAN"), a wide area network ("WAN"), or a combination thereof. In other embodiments, the network 115 may be a short-range wireless communication network, and in yet other embodiments, the network 115 may be a wired network using, for example, USB cables. Similarly, the server 110 may transmit information to the external device 107 to be forwarded to the power tool 105. In some embodiments, the power tool 105 is equipped with a long-range transceiver instead of or in addition to the short-range transceiver. In such embodiments, the power tool 105 communicates directly with the server 110. In some embodiments, the power tool 105 may communicate directly with both the server 110 and the external device 107. In such embodiments, the external device 107 may, for example, generate a graphical user interface to facilitate control and programming of the power tool 105, while the server 110 may store and analyze larger amounts of operational data for future programming or operation of the power tool 105. In other embodiments, however, the power tool 105 may communicate directly with the server 110 without utilizing a short-range communication protocol with the external device 107.

The server 110 includes a server electronic control assembly having a server electronic processor 425, a server memory 430, a transceiver, and a machine learning controller 120. The transceiver allows the server 110 to communicate with the power tool 105, the external device 107, or both. The server electronic processor 425 receives tool usage data from the power tool 105 (e.g., via the external device 107), stores the received tool usage data in the server memory 430, and, in some embodiments, uses the received tool usage data for building or adjusting a machine learning controller 120.

The machine learning controller 120 implements a machine learning program. The machine learning controller 120 is configured to construct a model (e.g., building one or more algorithms) based on example inputs. Supervised learning involves presenting a computer program with example inputs and their actual outputs (e.g., categorizations). The machine learning controller 120 is configured to learn a general rule or model that maps the inputs to the outputs based on the provided example input-output pairs. The machine learning algorithm may be configured to perform machine learning using various types of methods. For example, the machine learning controller 120 may implement the machine learning program using decision tree learning, associates rule learning, artificial neural networks, recurrent artificial neural networks, long short term memory neural networks, inductive logic programming, support vector machines, clustering, Bayesian networks, reinforcement learning, representation learning, similarity and metric learning, sparse dictionary learning, genetic algorithms, k-nearest neighbor (KNN), among others, such as those listed in Table 1 below.

TABLE 1

| | |
|---|---|
| Recurrent Models | Recurrent Neural Networks ["RNNs"], Long Short-Term Memory ["LSTM"] models, Gated Recurrent Unit ["GRU"] models, Markov Processes, Reinforcement learning |
| Non-Recurrent Models | Deep Neural Network ["DNN"], Convolutional Neural Network ["CNN"], Support Vector Machines ["SVM"], Anomaly detection (ex: Principle Component Analysis ["PCA"]), logistic regression, decision trees/forests, ensemble methods (combining models), polynomial/Bayesian/other regressions, Stochastic Gradient Descent ["SGD"], Linear Discriminant Analysis ["LDA"], Quadratic Discriminant Analysis ["QDA"], Nearest neighbors classifications/regression, naive Bayes, etc. |

The machine learning controller 120 is programmed and trained to perform a particular task. For example, in some embodiments, the machine learning controller 120 is trained to identify an application for which the power tool 105 is used (e.g., for installing drywall). The task for which the machine learning controller 120 is trained may vary based on, for example, the type of power tool, a selection from a user, typical applications for which the power tool is used, and the like. Analogously, the way in which the machine learning controller 120 is trained also varies based on the particular task. In particular, the training examples used to train the machine learning controller may include different information and may have different dimensions based on the task of the machine learning controller 120. In the example mentioned above in which the machine learning controller 120 is configured to identify a use application of the power tool 105, each training example may include a set of inputs such as motor speed, motor current and voltage, an operating mode currently being implemented by the power tool 105, and movement of the power tool 105 (e.g., from an accelerometer). Each training example also includes a specified output. For example, when the machine learning controller 130 identifies the use application of the power tool 105, a training example may have an output that includes a particular use application of the power tool 105, such as installing drywall. Other training examples, including different values for each of the inputs and an output indicating that the use application is, for example, installing screws on a wooden workpiece. The training examples may be previously collected training examples, from for example, a plurality of the same type of power tools. For example, the training examples may have been previously collected from, for example, two hundred power tools of the same type (e.g., drills) over a span of, for example, one year.

A plurality of different training examples is provided to the machine learning controller 120. The machine learning controller 120 uses these training examples to generate a model (e.g., a rule, a set of equations, and the like) that helps categorize or estimate the output based on new input data. The machine learning controller 120 may weigh different training examples differently to, for example, prioritize different conditions or outputs from the machine learning controller 120. For example, a training example corresponding to a kickback condition may be weighted more heavily than a training example corresponding to a stripping condition to prioritize the correct identification of the kickback condition relative to the stripping condition. In some embodiments, the training examples are weighted differently by associating a different cost function or value to specific training examples or types of training examples.

In one example, the machine learning controller 120 implements an artificial neural network. The artificial neural network typically includes an input layer, a plurality of hidden layers or nodes, and an output layer. Typically, the input layer includes as many nodes as inputs provided to the machine learning controller 120. As described above, the number (and the type) of inputs provided to the machine learning controller 120 may vary based on the particular task for the machine learning controller 120. Accordingly, the input layer of the artificial neural network of the machine learning controller 120 may have a different number of nodes based on the particular task for the machine learning controller 120. The input layer connects to the hidden layers. The number of hidden layers varies and may depend on the particular task for the machine learning controller 120. Additionally, each hidden layer may have a different number of nodes and may be connected to the next layer differently. For example, each node of the input layer may be connected to each node of the first hidden layer. The connection between each node of the input layer and each node of the first hidden layer may be assigned a weight parameter. Additionally, each node of the neural network may also be assigned a bias value. However, each node of the first hidden layer may not be connected to each node of the second hidden layer. That is, there may be some nodes of the first hidden layer that are not connected to all of the nodes of the second hidden layer. The connections between the nodes of the first hidden layers and the second hidden layers are each assigned different weight parameters. Each node of the hidden layer is associated with an activation function. The activation function defines how the hidden layer is to process the input received from the input layer or from a previous input layer. These activation functions may vary and be based on not only the type of task associated with the machine learning controller 120, but may also vary based on the specific type of hidden layer implemented.

Each hidden layer may perform a different function. For example, some hidden layers can be convolutional hidden layers which can, in some instances, reduce the dimensionality of the inputs, while other hidden layers can perform more statistical functions such as max pooling, which may reduce a group of inputs to the maximum value, an averaging layer, among others. In some of the hidden layers (also referred to as "dense layers"), each node is connected to each node of the next hidden layer. Some neural networks including more than, for example, three hidden layers may be considered deep neural networks. The last hidden layer is connected to the output layer. Similar to the input layer, the output layer typically has the same number of nodes as the possible outputs. In the example above in which the machine learning controller 120 identifies a use application of the power tool 105, the output layer may include, for example, four nodes. A first node may indicate that the use application corresponds to installing drywall, a second node may indicate that the use application corresponds to installing a screw on a wooden workpiece, a third node may indicate that the use application corresponds to removing a screw, and the fourth node may indicate that the use application corresponds to an unknown (or unidentifiable) task. In some embodiments, the machine learning controller 120 then selects the output node with the highest value and indicates to the power tool 105 or to the user the corresponding use application. In some embodiments, the machine learning controller 120 may also select more than one output node. The machine learning controller 120 or the electronic processor 550 may then use the multiple outputs to control the power tool 500. For example, the machine learning controller 120 may identify the type of fastener and select a self-drilling screw (e.g., a TEK screw) and a sheet metal screw as the most likely candidates for the fastener. The machine learning controller 120 or the electronic processor 550 may then, for example, control the motor 100 according to the ramp up speed for a self-drilling screw, but adopt the kickback detection from the sheet metal screw. The machine learning controller 120 and the electronic processor 550 may implement different methods of combining the outputs from the machine learning controller 120.

During training, the artificial neural network receives the inputs for a training example and generates an output using the bias for each node, and the connections between each node and the corresponding weights. The artificial neural network then compares the generated output with the actual output of the training example. Based on the generated output and the actual output of the training example, the neural network changes the weights associated with each node connection. In some embodiments, the neural network also changes the weights associated with each node during training. The training continues until a training condition is met. The training condition may correspond to, for example, a predetermined number of training examples being used, a minimum accuracy threshold being reached during training and validation, a predetermined number of validation iterations being completed, and the like. Different types of training algorithms can be used to adjust the bias values and the weights of the node connections based on the training examples. The training algorithms may include, for example, gradient descent, newton's method, conjugate gradient, quasi newton, levenberg marquardt, among others, see again Table 1.

In another example, the machine learning controller 120 implements a support vector machine to perform classification. The machine learning controller 120 may, for example, classify whether a fastener is stripping. In such embodiments, the machine learning controller 120 may receive inputs such as motor speed, output torque, and operation time (e.g., how long the power tool 105 has been working on the same fastener). The machine learning controller 120 then defines a margin using combinations of some of the input variables (e.g., motor speed, output torque, operation time, and the like) as support vectors to maximize the margin. In some embodiments, the machine learning controller 120 defines a margin using combinations of more than one of similar input variables (e.g. motion of a tool along different axes). The margin corresponds to the distance between the two closest vectors that are classified differently. For example, the margin corresponds to the distance between a vector representing a fastener that is stripping and a vector that represents a fastener that is not stripping. In some embodiments, the machine learning controller 120 uses more than one support vector machine to perform a single classification. For example, when the machine learning controller 120 classifies whether a fastener is stripping, a first support vector machine may determine whether the fastener is stripping based on the motor speed and the operation time, while a second support vector machine may determine whether the fastener is stripping based on the motor speed and the output torque. The machine learning controller 120 may then determine whether the fastener is stripping when both support vector machines classify the fastener as stripping. In other embodiments, a single support vector machine can use more than two input variables and define a hyperplane that separates those fasteners that are stripping from the fasteners that are not stripping.

The training examples for a support vector machine include an input vector including values for the input variables (e.g., motor speed, operation time, output torque, and the like), and an output classification indicating whether the fastener represents a fastener that is stripping. During training, the support vector machine selects the support vectors (e.g., a subset of the input vectors) that maximize the margin. In some embodiments, the support vector machine may be able to define a line or hyperplane that accurately separates the fasteners that are stripping from those that are not stripping. In other embodiments (e.g., in a non-separable case), however, the support vector machine may define a line or hyperplane that maximizes the margin and minimizes the slack variables, which measure the error in a classification of a support vector machine. After the support vector machine has been trained, new input data can be compared to the line or hyperplane to determine how to classify the new input data (e.g., to determine whether the fastener is stripping). In other embodiments, as mentioned above, the machine learning controller 120 can implement different machine learning algorithms to make an estimation or classification based on a set of input data. Some examples of input data, processing technique, and machine learning algorithm pairings are listed below in Table 2. The input data, listed as time series data in the below table, includes, for example, one or more of the various examples of time-series tool usage information described herein.

TABLE 2

| Input Data | Data Processing | Exemplary Model |
| --- | --- | --- |
| Time Series Data | N/A | RNN (using LSTM) (e.g., for screw stripping indication) |
| Time Series Data | Filtering (e.g. low-pass filters) | DNN classifier/regression (e.g., for screw seating detection), or another non-recurrent algorithm |
| Time Series Data | Sliding window, padding, or data subset | DNN classifier/regression (e.g., for screw seating detection), or another non-recurrent algorithm |
| Time Series Data | Make features (e.g. summarize analysis of runtime data) | KNN or another non-recurrent or recurrent algorithm |
| Time Series Data | Initial (e.g. pre-trained) model | Model adaptation |
| Time Series Data | Initial RNN or DNN analysis for classification | Markov Model (for likely tool application determination during or between tool operations) |

In the example of FIG. 1, the server 110 receives usage information from the power tool 105. In some embodiments, the server 110 uses the received usage information as additional training examples (e.g., when the actual value or classification is also known). In other embodiments, the server 110 sends the received usage information to the trained machine learning controller 120. The machine learning controller 120 then generates an estimated value or classification based on the input usage information. The server electronic processor 425 then generates recommendations for future operations of the power tool 105. For example, the trained machine learning controller 120 may determine that the fastener is stripping. The server electronic processor 425 may then determine that a slower motor speed for the selected operating mode may inhibit other fasteners from stripping. The server 110 may then transmit the suggested operating parameters to the external device 107. The external device 107 may display the suggested changes to the operating parameters (for example, FIG. 15) and request confirmation from the user to implement the suggested changes before forwarding the changes on to the power tool 105. In other embodiments, the external device 107 forwards the suggested changes to the power tool 105 and displays the suggested changes to inform the user of changes implemented by the power tool 105.

In particular, in the embodiment illustrated in FIG. 1, the server electronic control assembly generates a set of parameters and updated thresholds recommended for the operation of the power tool 105 in particular modes. For example, the machine learning controller 120 may detect that, during various operations of the power tool 105 in the impacting mode, the power tool 105 could have benefited from a faster average rotation speed of the motor during the first ten seconds of operation. The machine learning controller 120 may then adjust a motor speed threshold of an impacting mode such that the motor speed during the first ten seconds of the impacting mode of the power tool 105 is increased. The server 110 then transmits the updated motor speed threshold to the power tool 105 via the external device 107.

The power tool 105 receives the updated motor speed threshold, updates the impacting mode according to the updated motor speed threshold, and operates according to the updated motor speed threshold when in the impacting mode. In some embodiments, the power tool 105 periodically transmits the usage data to the server 110 based on a predetermined schedule (e.g., every eight hours). In other embodiments, the power tool 105 transmits the usage data after a predetermined period of inactivity (e.g., when the power tool 105 has been inactive for two hours), which may indicate that a session of operation has been completed. In some embodiments, the power tool 105 transmits the usage data in real time to the server 110 and may implement the updated thresholds and parameters in subsequent operations.

Figure 2:
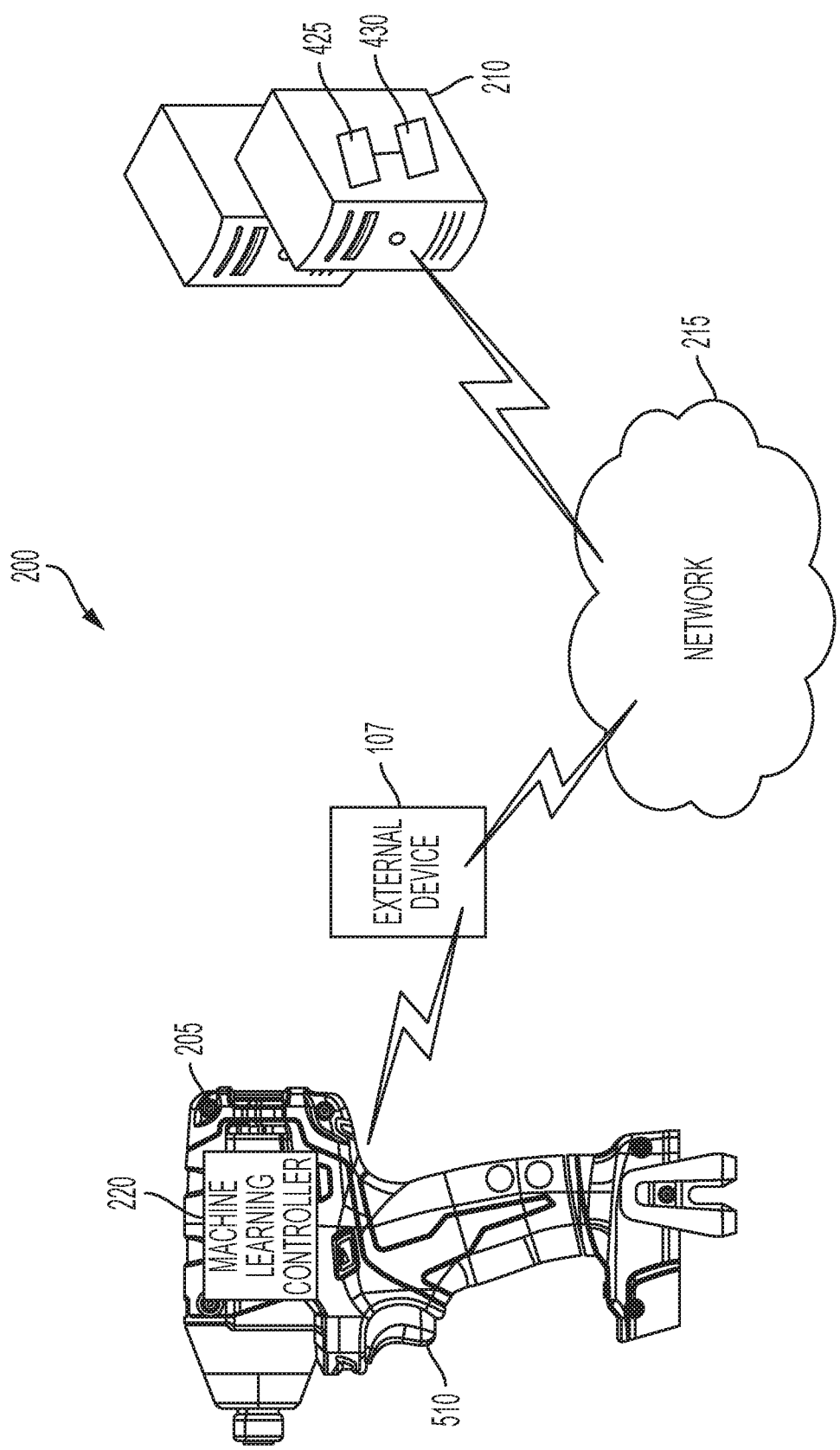
FIG. 2 illustrates a second power tool system.

FIG. 2 illustrates a second power tool system 200. The second power tool system 200 includes a power tool 205, the external device 107, a server 210, and a network 215. The power tool 205 is similar to that of the power tool system 100 of FIG. 1 and collects similar usage information as that described with respect to FIG. 1. Unlike the power tool 105 of the first power tool system 100, the power tool 205 of the second power tool system 200 includes a static machine learning controller 220. In the illustrated embodiment, the power tool 205 receives the static machine learning controller 220 from the server 210 over the network 215. In some embodiments, the power tool 205 receives the static machine learning controller 220 during manufacturing, while in other embodiments, a user of the power tool 205 may select to receive the static machine learning controller 220 after the power tool 205 has been manufactured and, in some embodiments, after operation of the power tool 205. The static machine learning controller 220 is a trained machine learning controller similar to the trained machine learning controller 120 in which the machine learning controller 120 has been trained using various training examples, and is configured to receive new input data and generate an estimation or classification for the new input data.

The power tool 205 communicates with the server 210 via, for example, the external device 107 as described above with respect to FIG. 1. The external device 107 may also provide additional functionality (e.g., generating a graphical user interface) to the power tool 205. The server 210 of the power tool system 200 may utilize usage information from power tools similar to the power tool 205 (for example, when the power tool 205 is a drill, the server 210 may receive usage information from various other drills) and trains a machine learning program using training examples from the received usage information from the power tools. The server 210 then transmits the trained machine learning program to the machine learning controller 220 of the power tool 205 for execution during future operations of the power tool 205.

Accordingly, the static machine learning controller 220 includes a trained machine learning program provided, for example, at the time of manufacture. During future operations of the power tool 205, the static machine learning controller 220 analyzes new usage data from the power tool 205 and generates recommendations or actions based on the new usage data. As discussed above with respect to the machine learning controller 120, the static machine learning controller 220 has one or more specific tasks such as, for example, determining a current application of the power tool 205. In other embodiments, the task of the static machine learning controller 220 may be different. In some embodiments, a user of the power tool 205 may select a task for the static machine learning controller 220 using, for example, a graphical user interface generated by the external device 107. The external device 107 may then transmit the target task for the static machine learning controller 220 to the server 210. The server 210 then transmits a trained machine learning program, trained for the target task, to the static machine learning controller 220. Based on the estimations or classifications from the static machine learning controller 220, the power tool 205 may change its operation, adjust one of the operating modes of the power tool 205, and/or adjust a different aspect of the power tool 205. In some embodiments, the power tool 205 may include more than one static machine learning controller 220, each having a different target task.

Figure 3:
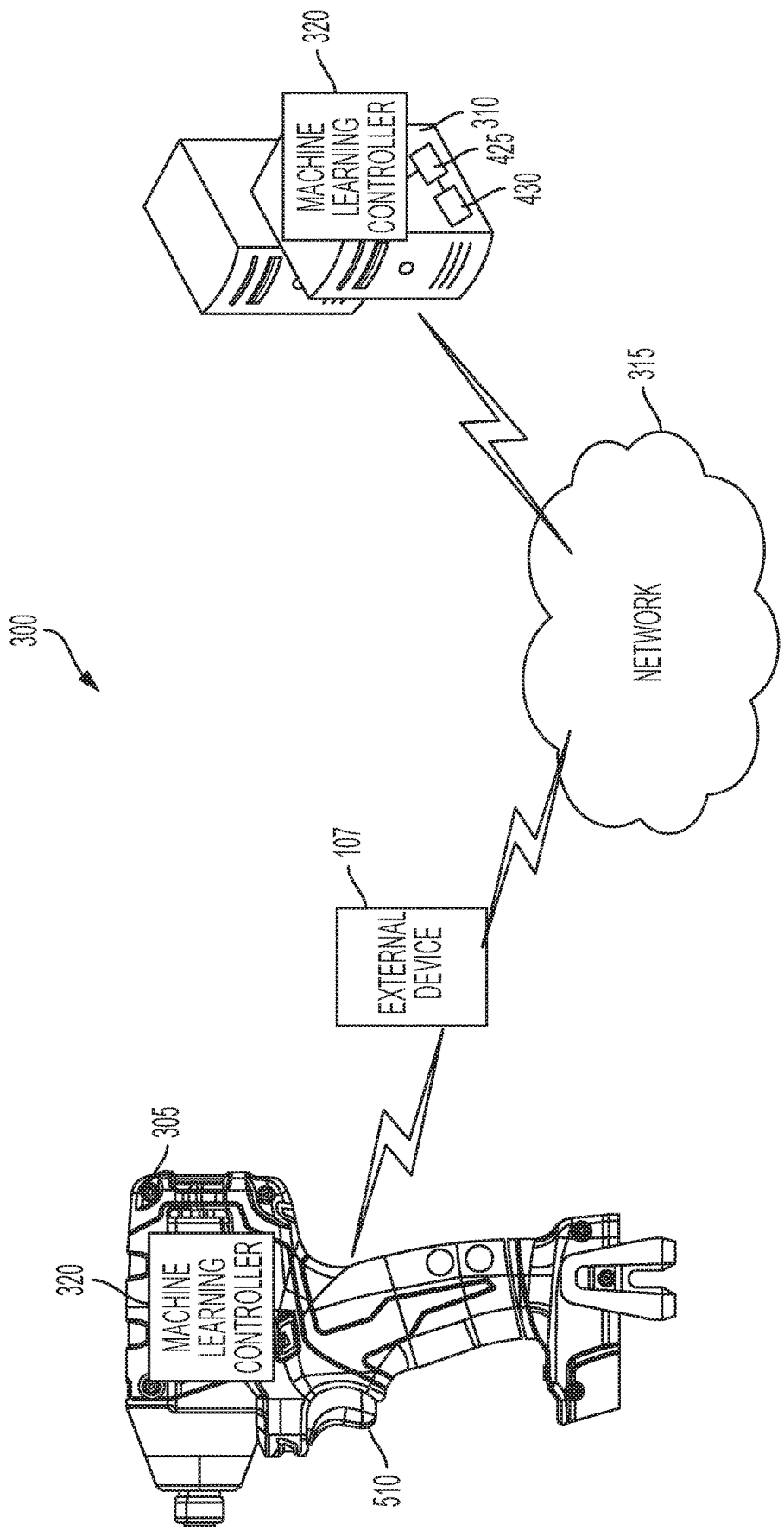
FIG. 3 illustrates a third power tool system.

FIG. 3 illustrates a third power tool system 300. The third power tool system 300 also includes a power tool 305, an external device 107, a server 310, and a network 315. The power tool 305 is similar to the power tools 105, 205 described above and includes similar sensors that monitor various types of usage information of the power tool 305 (e.g., motor speed, output torque, type of battery pack, state of charge of battery pack, and the like). The power tool 305 of the third power tool system 300, however, includes an adjustable machine learning controller 320 instead of the static machine learning controller 220 of the second power tool 205. In the illustrated embodiment, the adjustable machine learning controller 320 of the power tool 305 receives the machine learning program from the server 310 over the network 315. Unlike the static machine learning controller 220 of the second power tool 205, the server 310 may transmit updated versions of the machine learning program to the adjustable machine learning controller 320 to replace previous versions.

The power tool 305 of the third power tool system 300 transmits feedback to the server 310 (via, for example, the external device 107) regarding the operation of the adjustable machine learning controller 320. The power tool 305, for example, may transmit an indication to the server 310 regarding the number of operations that were incorrectly classified by the adjustable machine learning controller 320. The server 310 receives the feedback from the power tool 305, updates the machine learning program, and provides the updated program to the adjustable machine learning controller 320 to reduce the number of operations that are incorrectly classified. Thus, the server 310 updates or re-trains the adjustable machine learning controller 320 in view of the feedback received from the power tool 305. In some embodiments, the server 310 also uses feedback received from similar power tools to adjust the adjustable machine learning controller 320. In some embodiments, the server 310 updates the adjustable machine learning controller 320 periodically (e.g., every month). In other embodiments, the server 310 updates the adjustable machine learning controller 320 when the server 310 receives a predetermined number of feedback indications (e.g., after the server 310 receives two feedback indications). The feedback indications may be positive (e.g., indicating that the adjustable machine learning controller 320 correctly classified a condition, event, operation, or combination thereof), or the feedback may be negative (e.g., indicating that the adjustable machine learning controller 320 incorrectly classified a condition, event, operation, or combination thereof).

In some embodiments, the server 310 also utilizes new usage data received from the power tool 305 and other similar power tools to update the adjustable machine learning controller 320. For example, the server 310 may periodically re-train (or adjust the training) of the adjustable machine learning controller 320 based on the newly received usage data. The server 310 then transmits an updated version of the adjustable machine learning controller 320 to the power tool 305.

When the power tool 305 receives the updated version of the adjustable machine learning controller 320 (e.g., when an updated machine learning program is provided to and stored on the machine learning controller 320), the power tool 305 replaces the current version of the adjustable machine learning controller 320 with the updated version. In some embodiments, the power tool 305 is equipped with a first version of the adjustable machine learning controller 320 during manufacturing. In such embodiments, the user of the power tool 305 may request newer versions of the adjustable machine learning controller 320. In some embodiments, the user may select a frequency with which the adjustable machine learning controller 320 is transmitted to the power tool 305.

Figure 4A:
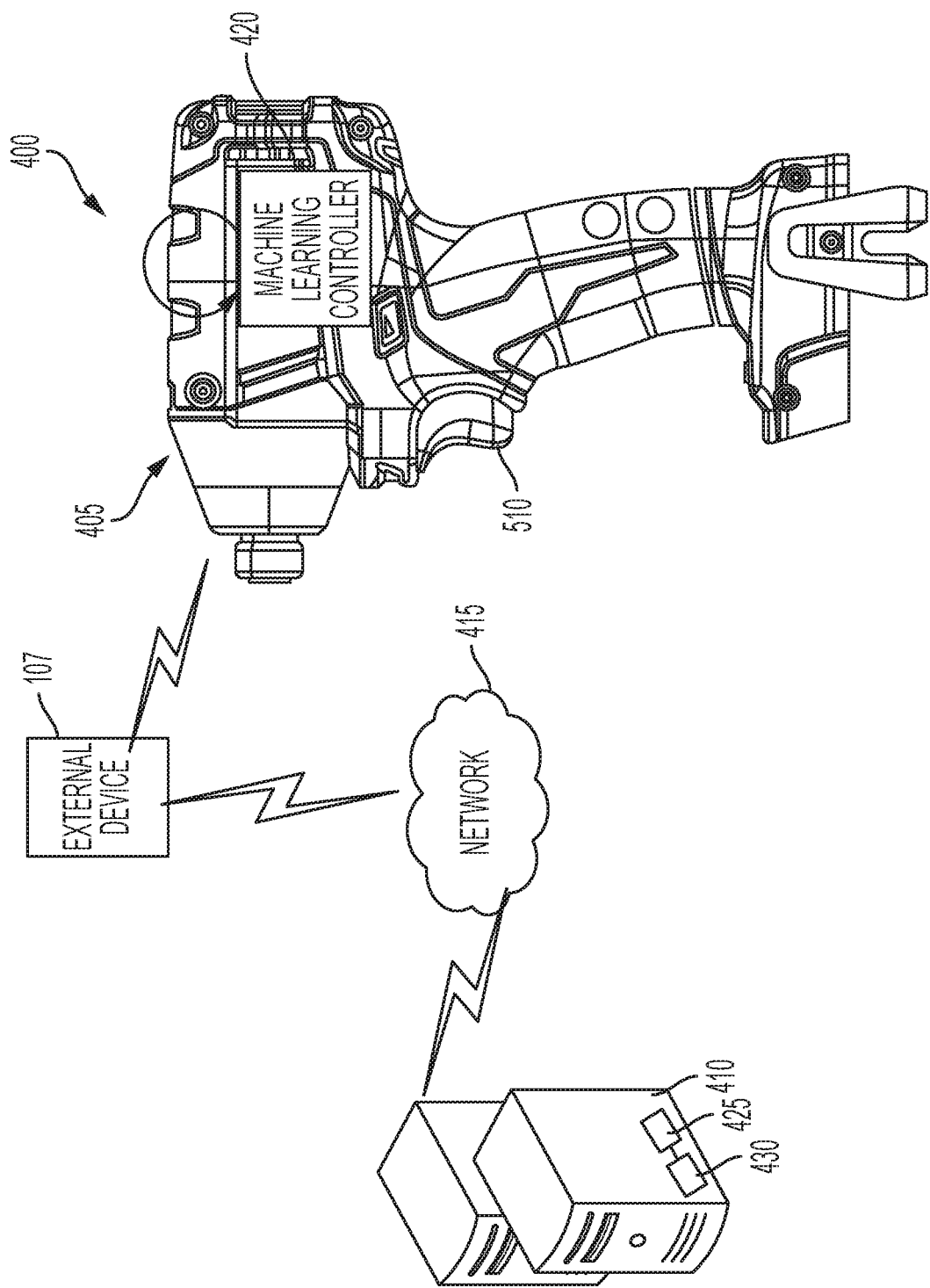

FIG. 4A illustrates a fourth power tool system 400. The fourth power tool system 400 includes a power tool 405, an external device 107, a network 415, and a server 410. The power tool 405 includes a self-updating machine learning controller 420. The self-updating machine learning controller 420 is first loaded on the power tool 405 during, for example, manufacturing. The self-updating machine learning controller 420 updates itself. In other words, the self-updating machine learning controller 420 receives new usage information from the sensors in the power tool 405, feedback information indicating desired changes to operational parameters (e.g., user wants to increase motor speed or output torque), feedback information indicating whether the classification made by the machine learning controller 420 is incorrect, or a combination thereof. The self-updating machine learning controller 420 then uses the received information to re-train the self-updating machine learning controller 420.

In some embodiments, the power tool 405 re-trains the self-updating machine learning controller 420 when the power tool 405 is not in operation. For example, the power tool 405 may detect when the motor has not been operated for a predetermined time period, and start a re-training process of the self-updating machine learning controller 420 while the power tool 405 remains non-operational. Training the self-updating machine learning controller 420 while the power tool 405 is not operating allows more processing power to be used in the re-training process instead of competing for computing resources typically used to operate the power tool 405.

As shown in FIG. 4A, in some embodiments, the power tool 405 also communicates with the external device 107 and a server 410. For example, the external device 107 communicates with the power tool 405 as described above with respect to FIGS. 1-3. The external device 107 generates a graphical user interface to facilitate the adjustment of operational parameters of the power tool 405. The external device 107 may also bridge the communication between the power tool 405 and the server 410. For example, as described above with respect to FIG. 2, in some embodiments, the external device 107 receives a selection of a target task for the machine learning controller 420. The external device 107 may then request a corresponding machine learning program from the server 410 for transmitting to the power tool 405. The power tool 405 also communicates with the server 410 (e.g., via the external device 107). In some embodiments, the server 410 may also re-train the self-updating machine learning controller 420, for example, as described above with respect to FIG. 3. The server 410 may use additional training examples from other similar power tools. Using these additional training examples may provide greater variability and ultimately make the machine learning controller 420 more reliable. In some embodiments, the power tool 405 re-trains the self-updating machine learning controller 420 when the power tool 405 is not in operation, and the server 410 may re-train the machine learning controller 420 when the power tool 405 remains in operation (for example, while the power tool 405 is in operation during a scheduled re-training of the machine learning controller 420). Accordingly, in some embodiments, the self-updating machine learning controller 420 may be re-trained on the power tool 405, by the server 410, or with a combination thereof. In some embodiments, the server 410 does not re-train the self-updating machine learning controller 420, but still exchanges information with the power tool 405. For example, the server 410 may provide other functionality for the power tool 405 such as, for example, transmitting information regarding various operating modes for the power tool 405.

Each of FIGS. 1-4A describes a power tool system 100, 200, 300, 400 in which a power tool 105, 205, 305, 405 communicates with a server 110, 210, 310, 410 and with an external device 107. As discussed above with respect to FIG. 1, the external device 107 may bridge communication between the power tool 105, 205, 305, 405 and the server 110, 210, 310, 410. That is, the power tool 105, 205, 305, 405 may communicate directly with the external device 107. The external device 107 may then forward the information received from the power tool 105, 205, 305, 405 to the server 110, 210, 310, 410. Similarly, the server 110, 210, 310, 410 may transmit information to the external device 107 to be forwarded to the power tool 105, 205, 305, 405. In such embodiments, the power tool 105, 205, 305, 405 may include a transceiver to communicate with the external device 107 via, for example, a short-range communication protocol such as BLUETOOTH®. The external device 107 may include a short-range transceiver to communicate with the power tool 105, 205, 305, 405, and may also include a long-range transceiver to communicate with the server 110, 210, 310, 410. In some embodiments, a wired connection (via, for example, a USB cable) is provided between the external device 107 and the power tool 105, 205, 405 to enable direct communication between the external device 107 and the power tool 105, 205, 305, 405. Providing the wired connection may provide a faster and more reliable communication method between the external device 107 and the power tool 105, 205, 305, 405.

The external device 107 may include, for example, a smart telephone, a tablet computer, a cellular phone, a laptop computer, a smart watch, and the like. The server 110, 210, 310, 410 illustrated in FIGS. 1-4A includes at least a server electronic processor 425, a server memory 430, and a transceiver to communicate with the power tool 105, 205, 305, 405 via the network 115, 215, 315, 415. The server electronic processor 425 receives tool usage data from the power tool 105, 205, 305, 405, stores the tool usage data in the server memory 430, and, in some embodiments, uses the received tool usage data for building or adjusting the machine learning controller 120, 220, 320, 420. The term external system device may be used herein to refer to one or more of the external device 107 and the server 110, 210, 310, and 410, as each are external to the power tool 105, 205, 305, 405. Further, in some embodiments, the external system device is a wireless hub, such as a beaconing device place on a jobsite to monitor tools, function as a gateway network device (e.g., providing Wi-Fi® network), or both. As described herein, the external system device includes at least an input/output unit (e.g., a wireless or wired transceiver) for communication, a memory storing instructions, and an electronic processor to execute instructions stored on the memory to carry out the functionality attributed to the external system device.

In some embodiments, the power tool 405 may not communicate with the external device 107 or the server 410. For example, FIG. 4B illustrates the power tool 405 with no connection to the external device 107 or the server 410. Rather, since the power tool 405 includes the self-updating machine learning controller 420, the power tool 405 can implement the machine learning controller 420, receive user feedback, and update the machine learning controller 420 without communicating with the external device 107 or the server 410.

Figure 4C:
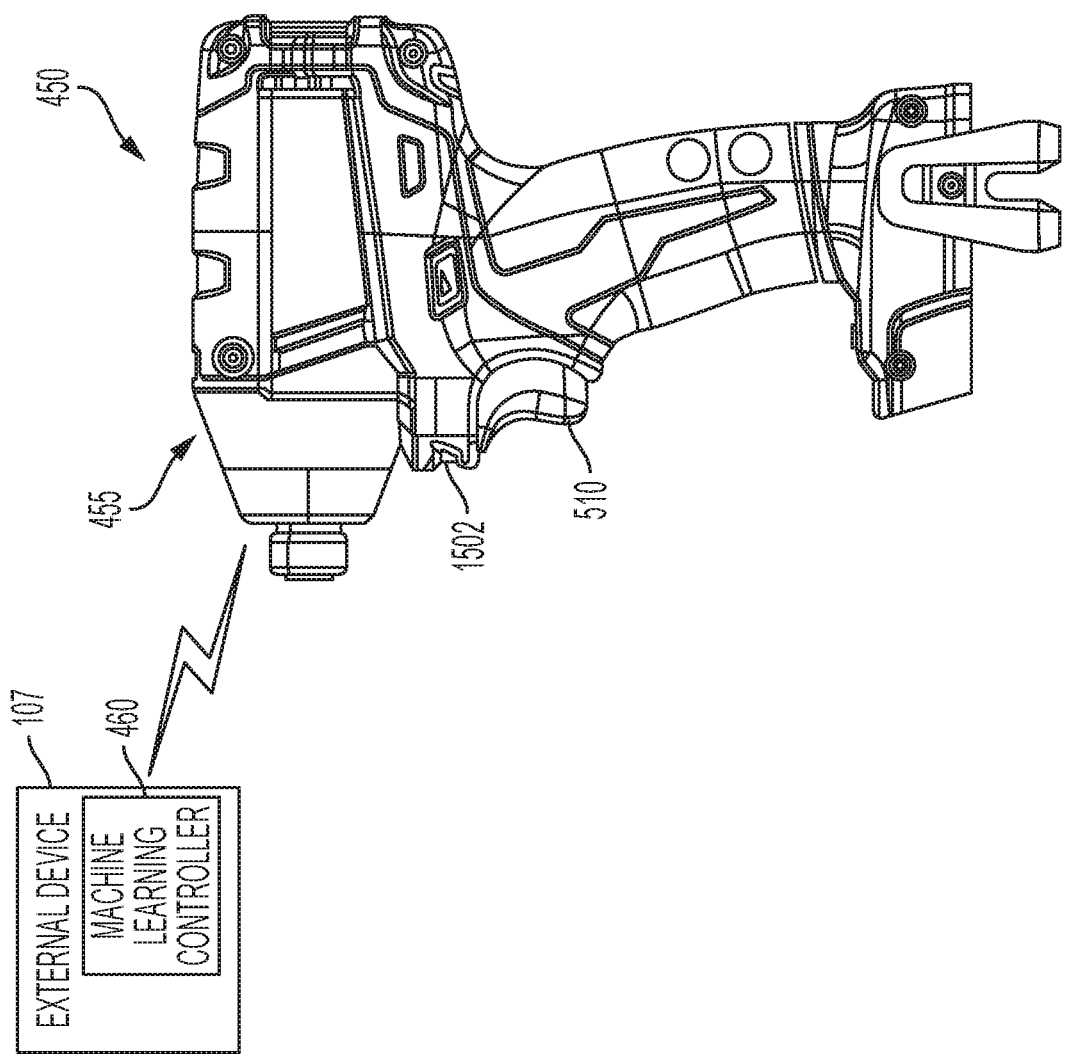
FIG. 4C illustrates a fourth power tool system.

FIG. 4C illustrates a fifth power tool system 450 including a power tool 455 and the external device 107. The external device 107 communicates with the power tool 455 using the various methods described above with respect to FIGS. 1-4A. In particular, the power tool 455 transmits operational data regarding the operation of the power tool 455 to the external device 107. The external device 107 generates a graphical user interface to facilitate the adjustment of operational parameters of the power tool 455 and to provide information regarding the operation of the power tool 455 to the user. In the illustrated embodiment of FIG. 4C, the external device 107 includes a machine learning controller 460. In some embodiments, the machine learning controller 460 is similar to the machine learning controller 120 of FIG. 1. In such embodiments, the machine learning controller 460 receives the usage information from the power tool 455 and generates recommendations for future operations of the power tool 455. The machine learning controller 460 may, in such embodiments, generate a set of parameters and updated threshold recommended for the operation of the power tool 105 in particular modes. The external device 107 then transmits the updated set of parameters and updated thresholds to the power tool 455 for implementation.

In some embodiments, the machine learning controller 460 is similar to the machine learning controller 320 of FIG. 3. In such embodiments, the external device 107 may update the machine learning controller 460 based on, for example, feedback received from the power tool 455 and/or other operational data from the power tool 455. In such embodiments, the power tool 455 also includes a machine learning controller similar to, for example, the adjustable machine learning controller 320 of FIG. 3. The external device 107 can then modify and update the adjustable machine learning controller 320 and communicate the updates to the machine learning controller 320 to the power tool 455 for implementation. For example, the external device 107 can use the feedback from the user to retrain the machine learning controller 460, to continue training a machine learning controller 460 implementing a reinforcement learning control, or may, in some embodiments, use the feedback to adjust a switching rate on a recurrent neural network for example.

In some embodiments, as discussed briefly above, the power tool 455 also includes a machine learning controller. The machine learning controller of the power tool 455 may be similar to, for example, the static machine learning controller 220 of FIG. 2, the adjustable machine learning controller 320 of FIG. 3 as described above, or the self-updating machine learning controller 420 of FIG. 4A.

Figure 4D:
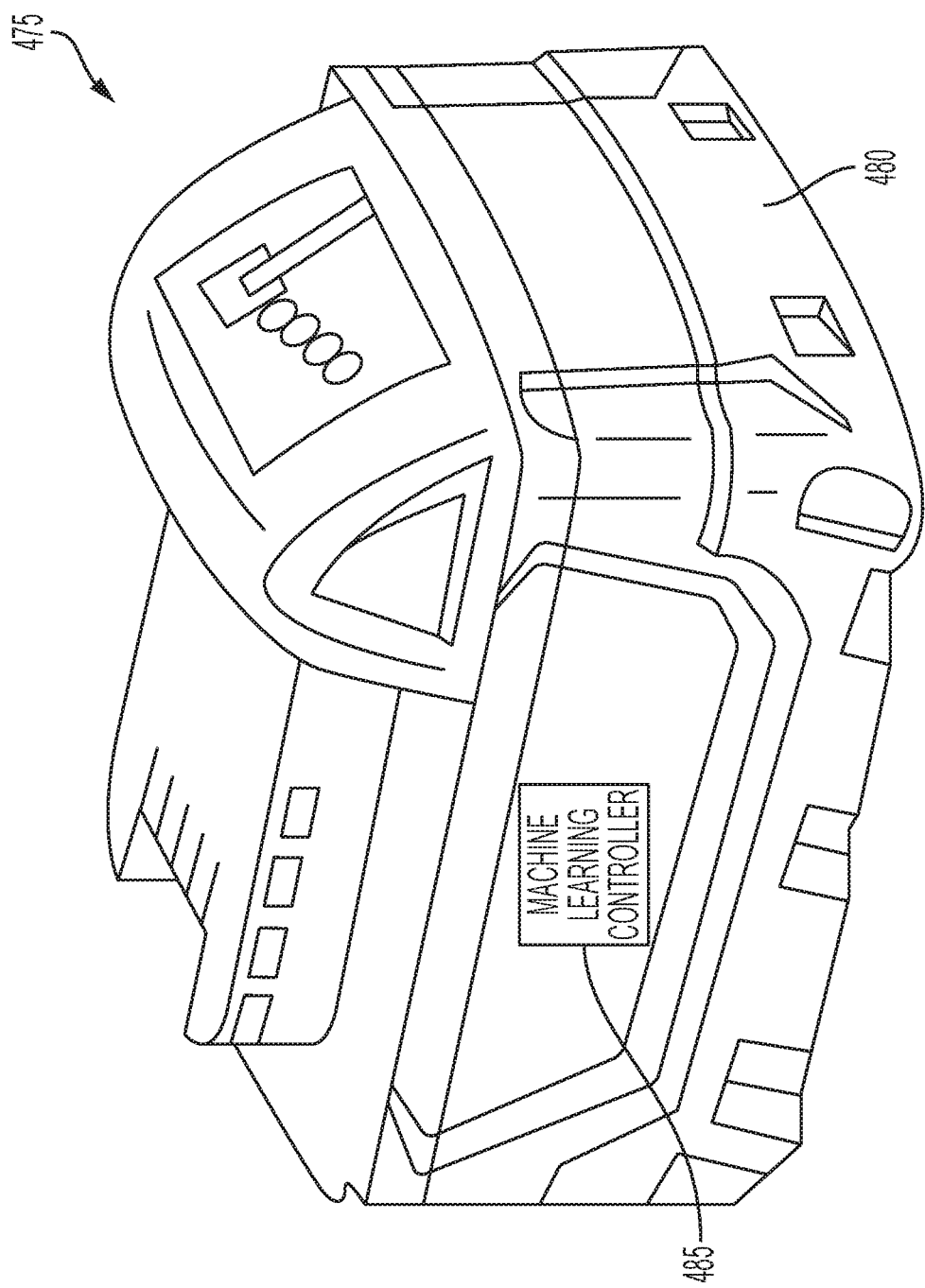
FIG. 4D illustrates a fifth power tool system.

FIG. 4D illustrates a sixth power tool system 475 including a battery pack 480. The battery pack 480 includes a machine learning controller 485. Although not illustrated, the battery pack 480 may, in some embodiments, communicate with the external device 107, a server, or a combination thereof through, for example, a network. Alternatively, or in addition, the battery pack may communicate with a power tool 455, such as a power tool 455 attached to the battery pack 480. The external device 107 and the server may be similar to the external device 107 and server 110, 210, 310, 410 described above with respect to FIGS. 1-4A. The machine learning controller 485 of the battery pack 480 may be similar to any of the machine learning controllers 220, 320, 420 described above. In one embodiment, the machine learning controller 220, 320, 420 controls operation of the battery pack 480. For example, the machine learning controller 485 may help identify different battery conditions that may be detrimental to the battery pack 480 and may automatically change (e.g., increase or decrease) the amount of current provided by the battery pack 480, and/or may change some of the thresholds that regulate the operation of the battery pack 480. For example, the battery pack 480 may, from instructions of the machine learning controller 485, reduce power to inhibit overheating of the battery cells. In some embodiments, the battery pack 480 communicates with a power tool (e.g., similar to the power tool 105, 205, 305, 405, 455) and the machine learning controller 485 controls at least some aspects and/or operations of the power tool. For example, the battery pack 480 may receive usage data (e.g., sensor data) from the power tool and generate outputs to control the operation of the power tool. The battery pack 480 may then transmit the control outputs to the electronic processor of the power tool.

In still other embodiments, a power system including a charger (e.g., for charging the battery pack 480 or a similar battery pack without a machine learning controller) is provided, wherein the charger includes a machine learning controller similar to those described herein.

FIGS. 1-4C illustrate example power tools in the form of an impact driver 105, 205, 305, 405. The particular power tools 105, 205, 305, 405 illustrated and described herein, however, are merely representative. In other embodiments, the power tool systems 100, 200, 300, 400 described herein may include different types of power tools such as, for example, a power drill, a hammer drill, a pipe cutter, a sander, a nailer, a grease gun, and the like. A power tool 105, 205, 305, 405 of the power tool systems 100, 200, 300, 400 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). The task(s) associated with a particular tool may also be referred to as the primary function(s) of the tool. Each power tool includes a drive device specifically designed for the primary function of the power tool. For example, in the illustrated embodiments in which the power tool corresponds to an impact driver, the drive device is a socket. In embodiments, however, where the power tool is, for example, a power drill, the drive device may include an adjustable chuck as a bit driver.

Each of FIGS. 1-4D illustrate various embodiments in which different types of machine learning controllers 120, 220, 320, 420 are used in conjunction with the power tool 105, 205, 305, 405. In some embodiments, each power tool 105, 205, 305, 405 may include more than one machine learning controller 120, 220, 320, 420, and each machine learning controller 120, 220, 320, 420 may be of a different type. For example, a power tool 105, 205, 305, 405 may include a static machine learning controller 220 as described with respect to FIG. 2 and may also include a self-updating machine learning controller 420 as described with respect to FIG. 4A. In another example, the power tool 105, 205, 305, 405 may include a static machine learning controller 220. The static machine learning controller 220 may be subsequently removed and replaced by, for example, an adjustable machine learning controller 320. In other words, the same power tool may include any of the machine learning controllers 120, 220, 320, 420 described above with respect to FIGS. 1-4B. Additionally, a machine learning controller 540, shown in FIG. 6 and described in further detail below, is an example controller that may be used as one or more of the machine learning controllers 120, 220, 320, 420, 460, and 485.

Figure 5A:
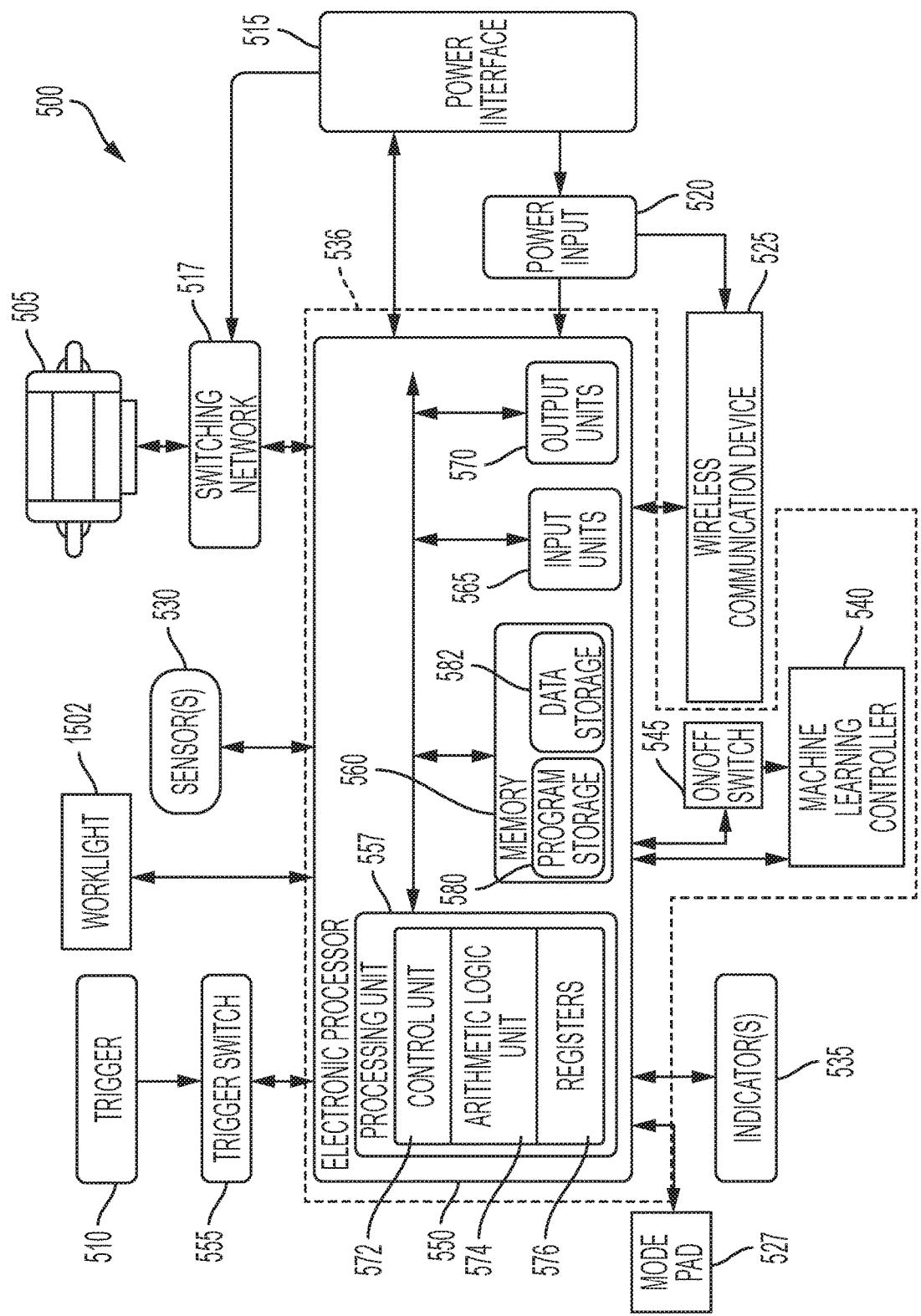
FIG. 5A is a block diagram of an example power tool of the power tool systems of FIGS. 1-4C.

FIG. 5A is a block diagram of a representative power tool 500 in the form of an impact driver, and including a machine learning controller. Similar to the example power tools of FIGS. 1-4C, the power tool 500 is representative of various types of power tools. Accordingly, the description with respect to the power tool 500 is similarly applicable to other types of power tools. The machine learning controller of the power tool 500 may be a static machine learning controller similar to the static machine learning controller 220 of the second power tool 205, an adjustable machine learning controller similar to the adjustable machine learning controller 320 of the third power tool 305, or a self-updating machine learning controller similar to the self-updating machine learning controller 420 of the fourth power tool 405. Although the power tool 500 of FIG. 5A is described as being in communication with the external device 107 or with a server, in some embodiments, the power tool 500 is self-contained or closed, in terms of machine learning, and does not need to communicate with the external device 107 or the server to perform the functionality of the machine learning controller 540 described in more detail below.

As shown in FIG. 5A, the power tool 500 includes a motor 505, a trigger 510, a power interface 515, a switching network 517, a power input control 520, a wireless communication device 525, a mode pad 527, a plurality of sensors 530, a plurality of indicators 535, and an electronic control assembly 536. The electronic control assembly 536 includes a machine learning controller 540, an activation switch 545, and an electronic processor 550. The motor 505 actuates the drive device of the power tool 500 and allows the drive device to perform the particular task for the power tool 500. The motor 505 receives power from an external power source through the power interface 515. In some embodiment, the external power source includes an AC power source. In such embodiments, the power interface 515 includes an AC power cord that is connectable to, for example, an AC outlet. In other embodiments, the external power source includes a battery pack. In such embodiments, the power interface 515 includes a battery pack interface. The battery pack interface may include a battery pack receiving portion on the power tool 500 that is configured to receive and couple to a battery pack (e.g., the battery pack 485 or a similar battery pack without machine learning controller). The battery pack receiving portion may include a connecting structure to engage a mechanism that secures the battery pack and a terminal block to electrically connect the battery pack to the power tool 500.

The motor 505 is energized based on a state of the trigger 510. Generally, when the trigger 510 is activated, the motor 505 is energized, and when the trigger 510 is deactivated, the motor is de-energized. In some embodiments, such as the power tools 105, 205, 305, 405 illustrated in FIGS. 1-4C, the trigger 510 extends partially down a length of the handle of the power tool and is moveably coupled to the handle such that the trigger 510 moves with respect to the power tool housing. In the illustrated embodiment, the trigger 510 is coupled to a trigger switch 555 such that when the trigger 510 is depressed, the trigger switch 555 is activated, and when the trigger is released, the trigger switch 555 is deactivated. In the illustrated embodiment, the trigger 510 is biased (e.g., with a biasing member such as a spring) such that the trigger 510 moves in a second direction away from the handle of the power tool 500 when the trigger 510 is released by the user. In other words, the default state of the trigger switch 555 is to be deactivated unless a user presses the trigger 510 and activates the trigger switch 555.

The switching network 517 enables the electronic processor 550 to control the operation of the motor 505. The switching network 517 includes a plurality of electronic switches (e.g., FETs, bipolar transistors, and the like) connected together to form a network that controls the activation of the motor 505 using a pulse-width modulated (PWM) signal. For instance, the switching network 217 may include a six-FET bridge that receives pulse-width modulated (PWM) signals from the electronic processor 550 to drive the motor 505. Generally, when the trigger 510 is depressed as indicated by an output of the trigger switch 555, electrical current is supplied from the power interface 515 to the motor 505 via the switching network 517. When the trigger 510 is not depressed, electrical current is not supplied from the power interface 515 to the motor 505. As discussed in more detail below, in some embodiments, the amount of trigger pull detected by the trigger switch 555 is related to or corresponds to a desired speed of rotation of the motor 505. In other embodiments, the amount of trigger pull corresponds to a desired torque.

In response to the electronic processor 550 receiving the activation signal from the trigger switch 555, the electronic processor 550 activates the switching network 517 to provide power to the motor 505. The switching network 517 controls the amount of current available to the motor 505 and thereby controls the speed and torque output of the motor 505. The mode pad 527 allows a user to select a mode of the power tool 500 and indicates to the user the currently selected mode of the power tool 500. In some embodiments, the mode pad 527 includes a single actuator. In such embodiments, a user may select an operating mode for the power tool 500 based on, for example, a number of actuations of the mode pad 527. For example, when the user activates the actuator three times, the power tool 500 may operate in a third operating mode. In other embodiments, the mode pad 527 includes a plurality of actuators, each actuator corresponding to a different operating mode. For example, the mode pad 527 may include four actuators, when the user activates one of the four actuators, the power tool 500 may operate in a first operating mode. The electronic processor 550 receives a user selection of an operating mode via the mode pad 527, and controls the switching network 517 such that the motor 505 is operated according to the selected operating mode. In some embodiments, the power tool 500 does not include a mode pad 527. In such embodiments, the power tool 500 may operate in a single mode, or may include a different selection mechanism for selecting an operation mode for the power tool 500. In some embodiments, as described in more detail below, the power tool 500 (e.g., the electronic control assembly 536) automatically selects an operating mode for the power tool 500 using, for example, the machine learning controller 540.

The sensors 530 are coupled to the electronic processor 550 and communicate to the electronic processor 550 various output signals indicative of different parameters of the power tool 500 or the motor 505. The sensors 530 include, for example, Hall Effect sensors, motor current sensors, motor voltage sensors, temperature sensors, torque sensors, position or movement sensors such as accelerometers or gyroscopes, and the like. The Hall Effect sensors output motor feedback information to the electronic processor 550 such as an indication (e.g., a pulse) related to the motor's position, velocity, and acceleration of the rotor of the motor 505. In some embodiments, the electronic processor 550 uses the motor feedback information from the Hall Effect sensors to control the switching network 517 to drive the motor 505. For example, by selectively enabling and disabling the switching network 517, power is selectively provided to the motor 505 to cause rotation of the motor at a specific speed, a specific torque, or a combination thereof. The electronic processor 550 may also control the operation of the switching network 517 and the motor 505 based on other sensors included in the power tool 500. For example, in some embodiments, the electronic processor 550 changes the control signals based on a sensor output signal indicating a number of impacts delivered by the power tool 500, a sensor output signal indicating a speed of the anvil of the power tool 500, and the like. The output signals from the sensors are used to ensure proper timing of control signals to the switching network 517 and, in some instances, to provide closed-loop feedback to control the speed of the motor 505 to be within a target range or at a target level.

The indicators 535 are also coupled to the electronic processor 550. The indicators 535 receive control signals from the electronic processor 500 to generate a visual signal to convey information regarding the operation or state of the power tool 500 to the user. The indicators 535 may include, for example, LEDs or a display screen and may generate various signals indicative of, for example, an operational state or mode of the power tool 500, an abnormal condition or event detected during the operation of the power tool 500, and the like. For example, the indicators 530 may indicate measured electrical characteristics of the power tool 500, the state or status of the power tool 500, an operating mode of the power tool 500 (discussed in further detail below), and the like. In some embodiments, the indicators 535 include elements to convey information to a user through audible or tactile outputs. In some embodiments, the power tool 500 does not include the indicators 535. In some embodiments, the operation of the power tool 500 alerts the user regarding a power tool condition. For example, a fast deceleration of the motor 505 may indicate that an abnormal condition is present. In some embodiments, the power tool 500 communicates with the external device 107, and the external device 107 generates a graphical user interface that conveys information to the user without the need for indictors 535 on the power tool 500 itself.

The power interface 515 is coupled to the power input control 520. The power interface 515 transmits the power received from the external power source to the power input control 520. The power input control 520 includes active and/or passive components (e.g., voltage step-down controllers, voltage converters, rectifiers, filters, etc.) to regulate or control the power received through the power interface 515 to the electronic processor 550 and other components of the power tool 500 such as the wireless communication device 525.

The wireless communication device 525 is coupled to the electronic processor 550. In the example power tools 105, 205, 305, 405 of FIGS. 1-4A and 4C, the wireless communication device 525 is located near the foot of the power tool 105, 205, 305, 405 (see FIGS. 1-4) to save space and ensure that the magnetic activity of the motor 505 does not affect the wireless communication between the power tool 500 and the server 110, 210, 310, 410 or with an external device 107. In a particular example, the wireless communication device 525 is positioned under the mode pad 527. The wireless communication device 525 may include, for example, a radio transceiver and antenna, a memory, a processor, and a real-time clock. The radio transceiver and antenna operate together to send and receive wireless messages to and from the external device 107, a second power tool 500, or the server 110, 210, 310, 410 and the processor. The memory of the wireless communication device 525 stores instructions to be implemented by the processor and/or may store data related to communications between the power tool 500 and the external device 107, a second power tool 500, or the server 110, 210, 310, 410. The processor for the wireless communication device 525 controls wireless communications between the power tool 500 and the external device 107, a second power tool 500, or the server 110, 210, 310, 410. For example, the processor of the wireless communication device 525 buffers incoming and/or outgoing data, communicates with the electronic processor 550, and determines the communication protocol and/or settings to use in wireless communications.

In some embodiments, the wireless communication device 525 is a Bluetooth® controller. The Bluetooth® controller communicates with the external device 107, a second power tool 500, or server 110, 210, 310, 410 employing the Bluetooth® protocol. In such embodiments, therefore, the external device 107, a second power tool 500, or server 110, 210, 310, 410 and the power tool 500 are within a communication range (i.e., in proximity) of each other while they exchange data. In other embodiments, the wireless communication device 525 communicates using other protocols (e.g., Wi-Fi, cellular protocols, a proprietary protocol, etc.) over a different type of wireless network. For example, the wireless communication device 525 may be configured to communicate via Wi-Fi through a wide area network such as the Internet or a local area network, or to communicate through a piconet (e.g., using infrared or NFC communications). The communication via the wireless communication device 525 may be encrypted to protect the data exchanged between the power tool 500 and the external device 107, a second power tool 500, or server 110, 210, 310, 410 from third parties.

In some embodiments, the wireless communication device 525 includes a real-time clock (RTC). The RTC increments and keeps time independently of the other power tool components. The RTC receives power from the power interface 515 when an external power source is connected to the power tool 500, and may receive power from a back-up power source when the external power source is not connected to the power tool 500. The RTC may time stamp the operational data from the power tool 500. Additionally, the RTC may enable a security feature in which the power tool 500 is disabled (e.g., locked-out and made inoperable) when the time of the RTC exceeds a lockout time determined by the user.

The wireless communication device 525, in some embodiments, exports tool usage data, maintenance data, mode information, drive device information, and the like from the power tool 500 (e.g., from the power tool electronic processor 550). The exported data may indicate, for example, when work was accomplished and that work was accomplished to specification. The exported data can also provide a chronological record of work that was performed, track duration of tool usage, and the like. The server 110, 210, 310, 410 receives the exported information, either directly from the wireless communication device 525 or through an external device 107, and logs the data received from the power tool 500. As discussed in more detail below, the exported data can be used by the power tool 500, the external device 107, or the server 110, 210, 310, 410 to train or adapt a machine learning controller relevant to similar power tools. The wireless communication device 525 may also receive information from the server 110, 210, 310, 410, the external device 107, or a second power tool 500, such as configuration data, operation threshold, maintenance threshold, mode configurations, programming for the power tool 500, updated machine learning controllers for the power tool 500, and the like. For example, the wireless communication device 525 may exchange information with a second power tool 500 directly, or via an external device 107.

In some embodiments, the power tool 500 does not communicate with the external device 107 or with the server 110, 210, 310, 410 (e.g., power tool 405 in FIG. 4B). Accordingly, in some embodiments, the power tool 500 does not include the wireless communication device 525 described above. In some embodiments, the power tool 500 includes a wired communication interface to communicate with, for example, the external device 107 or a different device (e.g., another power tool 500). The wired communication interface may provide a faster communication route than the wireless communication device 525.

In some embodiments, the power tool 500 includes a data sharing setting. The data sharing setting indicates what data, if any, is exported from the power tool 500 to the server 110, 210, 310, 410. In one embodiment, the power tool 500 receives (e.g., via a graphical user interface generated by the external device 107) an indication of the type of data to be exported from the power tool 500. In one embodiment, the external device 107 may display various options or levels of data sharing for the power tool 500, and the external device 107 receives the user's selection via its generated graphical user interface. For example, the power tool 500 may receive an indication that only usage data (e.g., motor current and voltage, number of impacts delivered, torque associated with each impact, and the like) is to be exported from the power tool 500, but may not export information regarding, for example, the modes implemented by the power tool 500, the location of the power tool 500, and the like. In some embodiments, the data sharing setting may be a binary indication of whether or not data regarding the operation of the power tool 500 (e.g., usage data) is transmitted to the server 110, 210, 310, 410. The power tool 500 receives the user's selection for the data sharing setting and stores the data sharing setting in memory to control the communication of the wireless communication device 525 according to the selected data sharing setting.

The electronic control assembly 536 is electrically and/or communicatively connected to a variety of modules or components of the power tool 500. The electronic assembly 536 controls the motor 505 based on the outputs and determinations from the machine learning controller 540. In particular, the electronic control assembly 136 includes the electronic processor 550 (also referred to as an electronic controller), the machine learning controller 540, and the corresponding activation switch 545. In some embodiments, the electronic processor 550 includes a plurality of electrical and electronic components that provide power, operational control, and protection to the components and modules within the electronic processor 550 and/or power tool 500. For example, the electronic processor 550 includes, among other things, a processing unit 557 (e.g., a microprocessor, a microcontroller, or another suitable programmable device), a memory 560, input units 565, and output units 570. The processing unit 557 includes, among other things, a control unit 572, an arithmetic logic unit ("ALU") 574, and a plurality of registers 576. In some embodiments, the electronic processor 550 is implemented partially or entirely on a semiconductor (e.g., a field-programmable gate array ["FPGA"] semiconductor) chip or an Application Specific Integrated Circuit ("ASIC"), such as a chip developed through a register transfer level ("RTL") design process.

The memory 560 includes, for example, a program storage area 580 and a data storage area 582. The program storage area 580 and the data storage area 582 can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 230 is connected to the memory 560 and executes software instructions that are capable of being stored in a RAM of the memory 560 (e.g., during execution), a ROM of the memory 560 (e.g., on a generally permanent basis), or another non-transitory computer readable medium such as another memory or a disc. Software included in the implementation of the power tool 500 can be stored in the memory 560 of the electronic processor 550. The software includes, for example, firmware, one or more applications, program data, filters, rules, one or more program modules, and other executable instructions. In some embodiments, the machine learning controller 540 may be stored in the memory 560 of the electronic processor 550 and are executed by the processing unit 557.

The electronic processor 550 is configured to retrieve from memory 560 and execute, among other things, instructions related to the control processes and methods described herein. The electronic processor 550 is also configured to store power tool information on the memory 560 including tool usage information, information identifying the type of tool, a unique identifier for the particular tool, user characteristics (e.g., identity, trade type, skill level), and other information relevant to operating or maintaining the power tool 500 (e.g., received from an external source, such as the external device 107 or pre-programed at the time of manufacture). The tool usage information, such as current levels, motor speed, motor acceleration, motor direction, number of impacts, may be captured or inferred from data output by the sensors 530. More particularly, Table 3 shows example types of tool usage information which may be captured or inferred by the electronic processor 550. In other constructions, the electronic processor 550 includes additional, fewer, or different components.

TABLE 3

| Type of data | Time-series data | Non-time-series data |
|---|---|---|
| Raw data | Trigger, current, voltage, speed, torque, temperature, motion, timing between events (ex: impacts) etc. | Duration, date, time, time, time since last use, mode, clutch setting, direction, battery type, presence of side-handle, errors, history of past applications and switching rate, user input, external inputs, gear etc. |

TABLE 3-continued

| Type of data | Time-series data | Non-time-series data |
| --- | --- | --- |
| Derived features | Filtered values of raw data, fast Fourier transforms (FFTs), subsampled/pooled data, fitted parameters (ex: polynomial fits), PCA, features generated by encoder networks, derived features (ex: estimated energy, momentum, inertia of system), derivatives/ integrals/ functions/ accumulators of parameters, padded data, sliding window of data, etc. | Principal component analysis (PCA), features generated by encoder networks, likelihood matrix of application/history, functions of inputs, etc. |

The machine learning controller 540 is coupled to the electronic processor 550 and to the activation switch 545. The activation switch 545 switches between an activated state and a deactivated state. When the activation switch 545 is in the activated state, the electronic processor 550 is in communication with the machine learning controller 540 and receives decision outputs from the machine learning controller 540. When the activation switch 545 is in the deactivated state, the electronic processor 550 is not in communication with the machine learning controller 540. In other words, the activation switch 545 selectively enables and disables the machine learning controller 540. As described above with respect to FIGS. 1-4D, the machine learning controller 540 includes a trained machine learning controller that utilizes previously collected power tool usage data to analyze and classify new usage data from the power tool 500. As explained in more detail below, the machine learning controller 540 can identify conditions, applications, and states of the power tool. In one embodiment, the activation switch 545 switches between an activated state and a deactivated state. In such embodiments, while the activation switch 545 is in the activated state, the electronic processor 550 controls the operation of the power tool 500 (e.g., changes the operation of the motor 505) based on the determinations from the machine learning controller 540. Otherwise, when the activation switch 545 is in the deactivated state, the machine learning controller 540 is disabled and the machine learning controller 540 does not affect the operation of the power tool 500. In some embodiments, however, the activation switch 545 switches between an activated state and a background state. In such embodiments, when the activation switch 545 is in the activated state, the electronic processor 550 controls the operation of the power tool 500 based on the determinations or outputs from the machine learning controller 540. However, when the activation switch 545 is in the background state, the machine learning controller 540 continues to generate output based on the usage data of the power tool 500 and may calculate (e.g., determine) thresholds or other operational levels, but the electronic processor 550 does not change the operation of the power tool 500 based on the determinations and/or outputs from the machine learning controller 540. In other words, in such embodiments, the machine learning controller 540 operates in the background without affecting the operation of the power tool 500. In some embodiments, the activation switch 545 is not included on the power tool 500 and the machine learning controller 540 is maintained in the enabled state or is controlled to be enabled and disabled via, for example, wireless signals from the server (e.g., servers 110, 210, 310, 410) or from the external device 107.

Figure 5B:
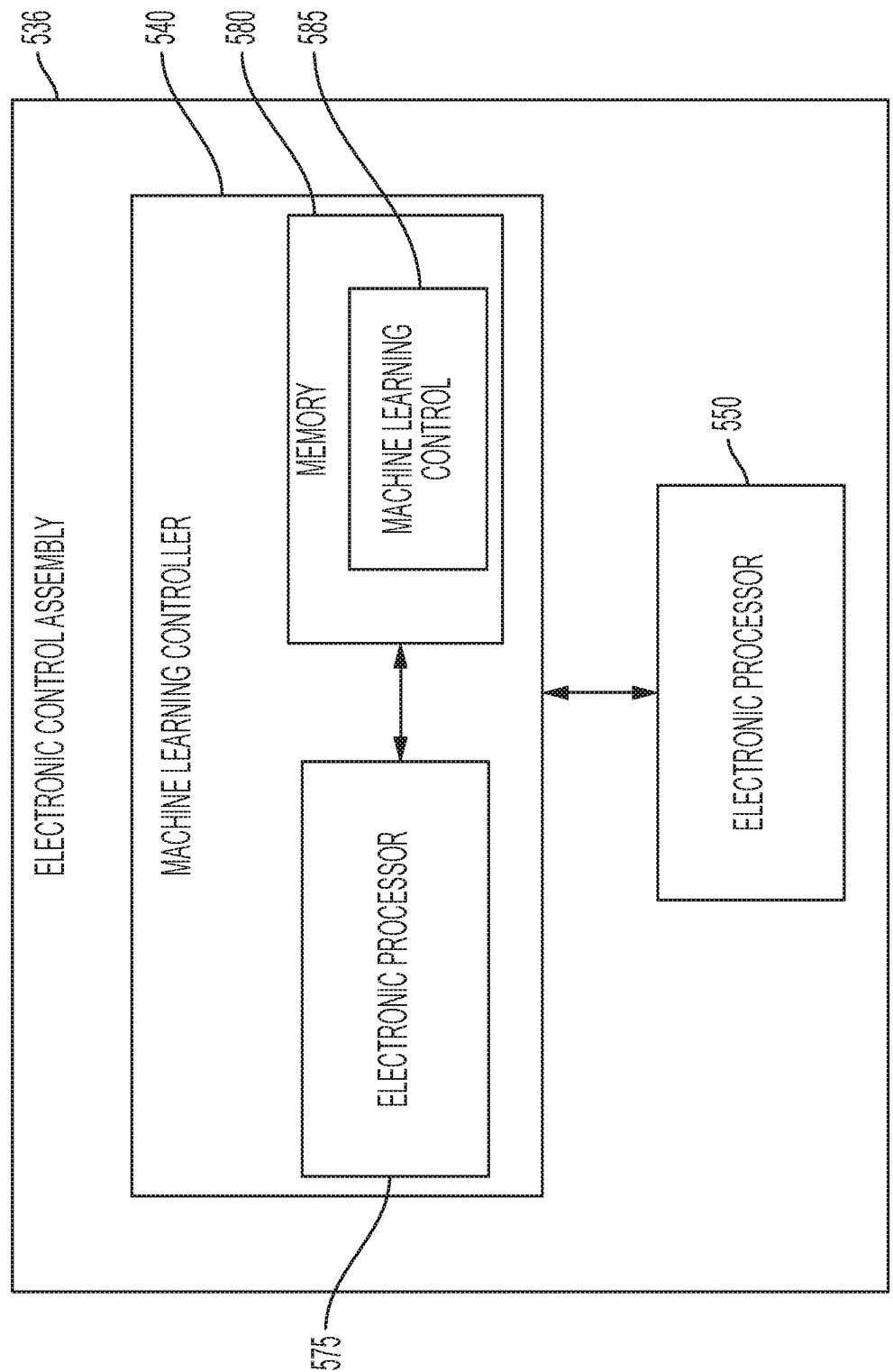
FIG. 5B is a block diagram of a machine learning controller of the power tool of FIG. 5A.

As shown in FIG. 5B, the machine learning controller 540 includes an electronic processor 575 and a memory 580. The memory 580 stores a machine learning control 585. The machine learning control 585 may include a trained machine learning program as described above with respect to FIGS. 1-4D. In the illustrated embodiment, the electronic processor 575 includes a graphics processing unit. In the embodiment of FIG. 5B, the machine learning controller 540 is positioned on a separate printed circuit board (PCB) as the electronic processor 550 of the power tool 500. The PCB of the electronic processor 550 and the machine learning controller 540 are coupled with, for example, wires or cables to enable the electronic processor 550 of the power tool 500 to control the motor 505 based on the outputs and determinations from the machine learning controller 540. In other embodiments, however, the machine learning control 585 may be stored in memory 560 of the electronic processor 550 and may be implemented by the processing unit 557. In such embodiments, the electronic control assembly 536 includes a single electronic processor 550. In yet other embodiments, the machine learning controller 540 is implemented in the separate electronic processor 575, but is positioned on the same PCB as the electronic processor 550 of the power tool 500. Embodiments with the machine learning controller 540 implemented as a separate processing unit from the electronic processor 550, whether on the same or different PCBs, allows selecting a processing unit to implement each of the machine learning controller 540 and the electronic processor 550 that has its capabilities (e.g., processing power and memory capacity) tailored to the particular demands of each unit. Such tailoring can reduce costs and improve efficiencies of the power tools. In some embodiments, as illustrated in FIG. 4C, for example, the external device 107 includes the machine learning controller 540 and the power tool 500 communicates with the external device 107 to receive the estimations or classifications from the machine learning controller 540. In some embodiments, the machine learning controller 540 is implemented in a plug-in chip or controller that is easily added to the power tool 500. For example, the machine learning controller 540 may include a plug-in chip that is received within a cavity of the power tool 500 and connects to the electronic processor 550. For example, in some embodiments, the power tool 500 includes a lockable compartment including electrical contacts that is configured to receive and electrically connect to the plug-in machine learning controller 540. The electrical contacts enable bidirectional communication between the plug-in machine learning controller 540 and the electronic processor 550, and enable the plug-in machine learning controller 540 to receive power from the power tool 500.

Figure 6:
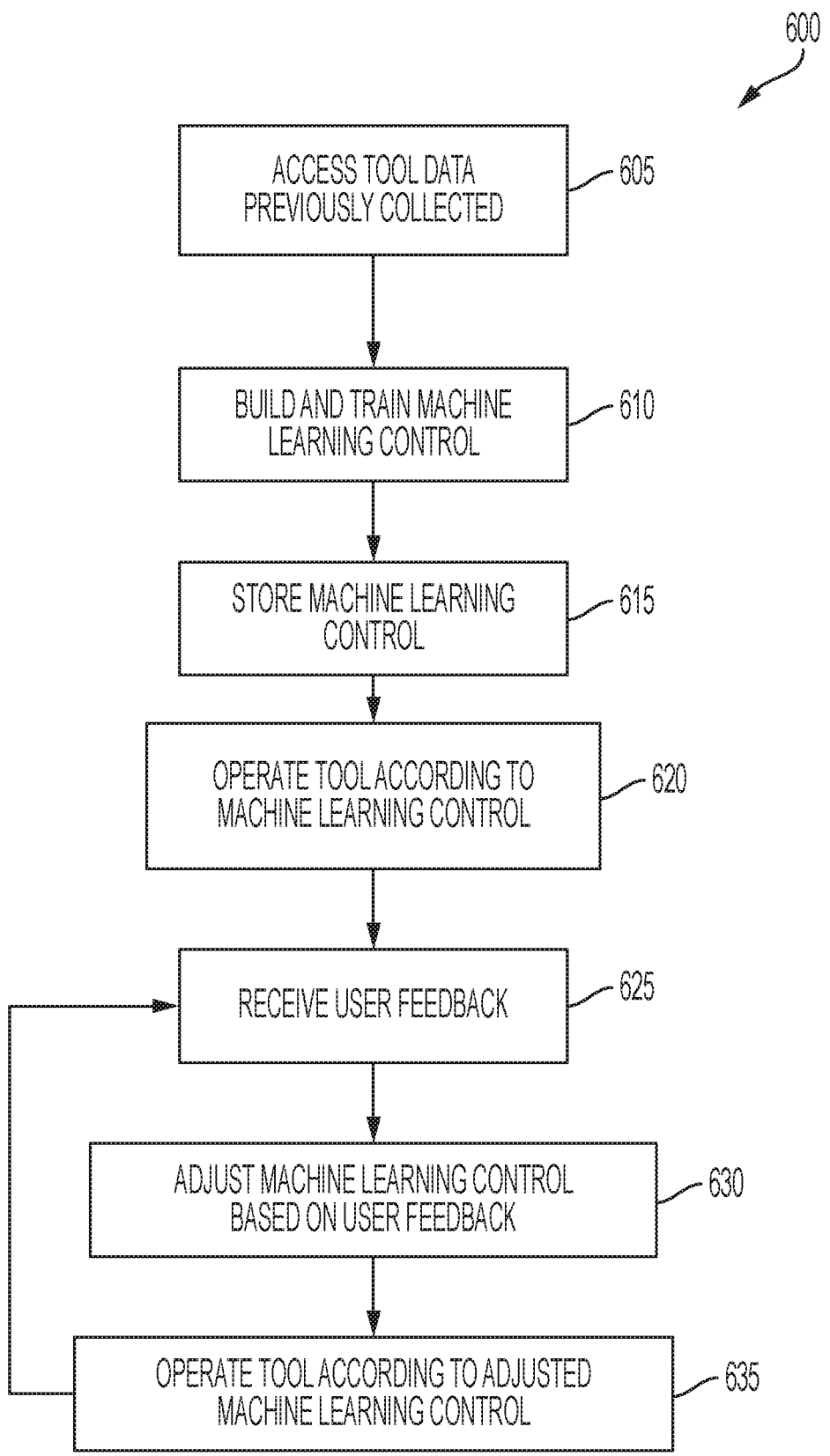
FIG. 6 is a flowchart illustrating a method of building and implementing a machine learning controller for the power tool of FIG. 5A.

As discussed above with respect to FIG. 1, the machine learning control 585 may be built and operated by the server 110. In other embodiments, the machine learning control 585 may be built by the server 110, but implemented by the power tool 500 (similar to FIGS. 2 and 3), and in yet other embodiments, the power tool 500 (e.g., the electronic processor 550, electronic processor 575, or a combination thereof) builds and implements the machine learning control 585 (similar to FIG. 4B). FIG. 6 illustrates a method 600 of building and implementing the machine learning control 585. The method 600 is described with respect to power tool 500, but, as previously described with respect to FIG. 5, the power tool 500 is representative of the power tools 105, 205, 305, 405 described in the respective systems of FIGS. 1-4C. Accordingly, a similar method may be implemented by the power tool 105, 205, 305, 405 of the respective systems of FIGS. 1-4D. In step 605, the server electronic processor 425 accesses tool usage information previously collected from similar power tools. Additionally, the server electronic processor 425 accesses user characteristic information, such as characteristic information of a user using a respective power tool at a time the power tool is collecting tool usage information. For example, to build the machine learning control 585 for the impact drivers of FIGS. 1-4C and 5A, the server electronic processor 425 accesses tool usage data previously collected from other impact drivers (e.g., via the network 115). The tool usage data includes, for example, motor current, motor voltage, motor position and/or velocity, usage time, battery state of charge, position of the power tool, position or velocity of the output shaft, number of impacts, and the like. Additionally, the server electronic processor 425 accesses user characteristic information previously collected (e.g., via the network 115). The server electronic processor 425 then proceeds to build and train the machine learning control 585 based on the tool usage data, the user characteristic information, or both (step 610).

Building and training the machine learning control 585 may include, for example, determining the machine learning architecture (e.g., using a support vector machine, a decision tree, a neural network, or a different architecture). In the case of building and training a neural network, for example, building the neural network may also include determining the number of input nodes, the number of hidden layers, the activation function for each node, the number of nodes of each hidden layer, the number of output nodes, and the like. Training the machine learning control 585 includes providing training examples to the machine learning control 585 and using one or more algorithms to set the various weights, margins, or other parameters of the machine learning control 585 to make reliable estimations or classifications.

In some embodiments, building and training the machine learning control 585 includes building and training a recurrent neural network. Recurrent neural networks allow analysis of sequences of inputs instead of treating every input individually. That is, recurrent neural networks can base their determination or output for a given input not only on the information for that particular input, but also on the previous inputs. For example, when the machine learning control 585 is configured to identify a type of fastener used with the power tool 500, the machine learning control 585 may determine that since the last three operations used lug nuts, the fourth operation is also likely to use a lug nut. Using recurrent neural networks helps compensate for some of the misclassifications the machine learning control 585 would make by providing and taking account the context around a particular operation. Accordingly, when implementing a recurrent neural network, the learning rate affects not only how each training example affects the overall recurrent neural network (e.g., adjusting weights, biases, and the like), but also affects how each input affects the output of the next input.

The server electronic processor 425 builds and trains the machine learning control 585 to perform a particular task. For example, in some embodiments, the machine learning control 585 is trained to identify an application for which the power tool 500 is used (e.g., for installing drywall). In other embodiments, the machine learning control 585 is trained to detect when a detrimental condition is present or eminent (e.g., detecting kickback). The task for which the machine learning control 585 is trained may vary based on, for example, the type of power tool 500, a selection from a user, typical applications for which the power tool is used, user characteristic information, and the like. FIGS. 13-26 expand on examples of particular tasks for which the machine learning control 585 is built and trained. The server electronic processor 425 uses different tool usage data to train the machine learning control 585 based on the particular task.

In some embodiments, the particular task for the machine learning controller 540 (e.g., for the machine learning control 585) also defines the particular architecture for the machine learning control 585. For example, for a first set of tasks, the server electronic processor 425 may build a support vector machine, while, for a second set of tasks, the server electronic processor 425 may build a neural network. In some embodiments, each task or type of task is associated with a particular architecture. In such embodiments, the server electronic processor 425 determines the architecture for the machine learning control 585 based on the task and the machine learning architecture associated with the particular task.

After the server electronic processor builds and trains the machine learning control 585, the server electronic processor 425 stores the machine learning control 585 in, for example, the memory 430 of the server 110 (step 615). The server electronic processor 425, additionally or alternatively, transmits the trained machine learning control 585 to the power tool 500. In such embodiments, the power tool 500 stores the machine learning control 585 in the memory 580 of the machine learning controller 540. In some embodiments, for example, when the machine learning control 585 is implemented by the electronic processor 550 of the power tool 500, the power tool 500 stores the machine learning control 585 in the memory 560 of the electronic control assembly 536.

Once the machine learning control 585 is stored, the power tool 500 operates the motor 505 according to (or based on) the outputs and determinations from the machine learning controller 540 (step 620). In embodiments in which the machine learning controller 540 (including the machine learning control 585) is implemented in the server 110, 210, the server 110, 210 may determine operational thresholds from the outputs and determinations from the machine learning controller 540. The server 110, 210 then transmits the determined operational thresholds to the power tool 500 to control the motor 505.

The performance of the machine learning controller 540 depends on the amount and quality of the data used to train the machine learning controller 540. Accordingly, if insufficient data is used (e.g., by the server 110, 210, 310, 410) to train the machine learning controller 540, the performance of the machine learning controller 540 may be reduced. Alternatively, different users may have different preferences and may operate the power tool 500 for different applications and in a slightly different manner (e.g., some users may press the power tool 500 against the work surface with a greater force, some may prefer a faster finishing speed, and the like). These differences in usage of the power tool 500 may also compromise some of the performance of the machine learning controller 540 from the perspective of a user.

Optionally, to improve the performance of the machine learning controller 540, in some embodiments, the server electronic processor 425 receives feedback from the power tool 500 (or the external device 107) regarding the performance of the machine learning controller 540 (step 625). In other words, at least in some embodiments, the feedback is with regard to the control of the motor from the earlier step 620. In other embodiments, however, the power tool 500 does not receive user feedback regarding the performance of the machine learning controller 540 and instead continues to operate the power tool 500 by executing the machine learning control 585. As explained in further detail below, in some embodiments, the power tool 500 includes specific feedback mechanism for providing feedback on the performance of the machine learning controller 540. In some embodiments, the external device 107 may also provide a graphical user interface that receives feedback from a user regarding the operation of the machine learning controller 540. The external device 107 then transmits the feedback indications to the server electronic processor 425. In some embodiments, the power tool 500 may only provide negative feedback to the server 110, 210, 310, 410 (e.g., when the machine learning controller 540 performs poorly). In some embodiments, the server 110, 210, 310, 410 may consider the lack of feedback from the power tool 500 (or the external device 107) to be positive feedback indicating an adequate performance of the machine learning controller 540. In some embodiments, the power tool 500 receives, and provides to the server electronic processor 425, both positive and negative feedback. In some embodiments, in addition or instead of user feedback (e.g., directly input to the power tool 500), the power tool 500 senses one or more power tool characteristics via one or more sensors 530, and the feedback is based on the sensed power tool characteristic(s). For example, on a torque wrench embodiment of the power tool 500, the torque wrench includes a torque sensor to sense output torque during a fastener operation, and the sensed output torque is provided as feedback. The sensed output torque may be evaluated locally on the power tool 500, or externally on the external device 107 or the server electronic processor 425, to determine whether the feedback is positive or negative (e.g., the feedback may be positive when the sensed output torque is within an acceptable torque range, and negative when outside of the acceptable torque range). As discussed above, in some embodiments, the power tool 500 may send the feedback or other information directly to the server 110, 210, 310, 410 while in other embodiments, an external device 107 may serve as a bridge for communications between the power tool 500 and the server 110, 210, 310 410 and may send the feedback to the server 110, 210, 310, 410.

The server electronic processor 425 then adjusts the machine learning control 585 based on the received user feedback (step 630). In some embodiments, the server electronic processor 425 adjusts the machine learning control 585 after receiving a predetermined number of feedback indications (e.g., after receiving 100 feedback indications). In other embodiments, the server electronic processor 425 adjusts the machine learning control 585 after a predetermined period of time has elapsed (e.g., every two months). In yet other embodiments, the server electronic processor 425 adjusts the machine learning control 585 continuously (e.g., after receiving each feedback indication). Adjusting the machine learning control 585 may include, for example, retraining the machine learning controller 540 using the additional feedback as a new set of training data or adjusting some of the parameters (e.g., weights, support vectors, and the like) of the machine learning controller 540. Because the machine learning controller 540 has already been trained for the particular task, re-training the machine learning controller 540 with the smaller set of newer data requires less computing resources (e.g., time, memory, computing power, etc.) than the original training of the machine learning controller 540.

In some embodiments, the machine learning control 585 includes a reinforcement learning control that allows the machine learning control 585 to continually integrate the feedback received by the user to optimize the performance of the machine learning control 585. In some embodiment, the reinforcement learning control periodically evaluates a reward function based on the performance of the machine learning control 585. In such embodiments, training the machine learning control 585 includes increasing the operation time of the power tool 500 such that the reinforcement learning control 585 receives sufficient feedback to optimize the execution of the machine learning control 585. In some embodiments, when reinforcement learning is implemented by the machine learning control 585, a first stage of operation (e.g., training) is performed during manufacturing or before such that when a user operates the power tool 500, the machine learning control 585 can achieve a predetermined minimum performance (e.g., accuracy). The machine learning control 585, once the user operates his/her power tool 500, may continue learning and evaluating the reward function to further improve its performance. Accordingly, a power tool may be initially provided with a stable and predictable algorithm, which may be adapted over time. In some embodiments, reinforcement learning is limited to portions of the machine learning control 585. For example, in some embodiments, instead of potentially updating weights/biases of the entire or a substantial portion of the machine learning control 585, which can take significant processing power and memory, the actual model remains frozen or mostly frozen (e.g., all but last layer(s) or outputs), and only one or a few output parameters or output characteristics of the machine learning control 585 are updated based on feedback.

In some embodiments, the machine learning controller 540 interprets the operation of the power tool 500 by the user as feedback regarding the performance of the machine learning controller 540. For example, if the user presses the trigger harder during execution of a particular mode, the machine learning controller 540 may determine that the motor speed selected by the machine learning controller 540 is not sufficiently high, and may increase the motor speed directly, use the received feedback to re-train or modify the machine learning controller, or a combination thereof. Accordingly, operation of the power tool 500 may vary between two identical consecutive pulls of the trigger 510 of the power tool 500. In some embodiments, the amount of variance is based on user feedback, a learning rate, or both. Table 4 below, for example, indicates some control of the power tool 500 by the user and how the various types of control are interpreted as feedback regarding the machine learning controller 540 by the machine learning controller 540. This type of feedback may allow the machine learning controller 540 to determine appropriate motor control thresholds and parameters when, for example, the machine learning controller 540 lacks some information regarding the operation of the power tool 500. For example, these feedback mechanisms make it possible for the machine learning controller 540 to alter an operating mode to fasten a self-drilling screw of unknown length.

TABLE 4

| Control Action (by user) | Interpreted Feedback by the Machine Learning Controller |
| --- | --- |
| Trigger is pulled harder | Machine learning controller interprets as a desired increase in power, speed, torque, ramp, a combination thereof, and the like |
| Power tool is rotated with the fastener (e.g., clockwise) | Machine learning controller interprets as a desired increase in power, speed, torque, ramp, a combination thereof, and the like |
| Trigger is slightly released (pulled less) | Machine learning controller interprets as a desired decrease in power, speed, torque, ramp, a combination thereof, and the like |
| Power tool is rotated against the fastener (e.g., counterclockwise) | Machine learning controller interprets as a desired decrease in power, speed, torque, ramp, a combination thereof, and the like |
| Reach maximum peak torque | Machine learning controller interprets as a necessary adjustment to a mechanical or electronic clutch setting |
| Identify unseated fastener with second pull | Machine learning controller interprets as a necessary adjustment to a mechanical or electronic clutch setting |
| Trigger is released and additional information regarding tool and/or motor motion | Machine learning controller interprets as a necessary adjustment to the kickback detection settings, and the auto-shutoff settings (for saws, for example) |
| Detect Kickback | Machine learning controller interprets as a necessary adjustment to the kickback detection settings |

In some embodiments, the server 110, 210, 310, 410 receives tool usage data from a variety of different power tools in, for example, block 625. Accordingly, when the server electronic processor 425 adjusts the machine learning control 585 based on the user feedback (block 630), the server electronic processor 425 may be adjusting the machine learning control 585 based on feedback from various users. In embodiments in which the machine learning controller 540 is fully implemented on the power tool 500 (e.g., such as discussed above with respect to FIGS. 4A-B), the electronic processor 550 may use the feedback indications from only the power tool 405 to adjust the machine learning controller 420 of the same power tool 405. In other words, some power tools 500 may use only the feedback information from particular users to adjust the machine learning control 585. Using the feedback information from particular users may help customize the operation of the power tool 500 for the user of that particular tool.

After the server electronic processor 425 adjusts the machine learning controller 540 based on the user feedback, the power tool 500 operates according to the outputs and determinations from the adjusted machine learning controller 540 (step 635). In some embodiments, such as the power tool system 300 of FIG. 3, the server 310 transmits the adjusted machine learning control 585 to the power tool 500. The power tool 500 then stores the adjusted machine learning control 585 in the memory 580 of the machine learning controller 540 (or in the memory 560 of the power tool 500), and operates the motor 505 according to the adjusted machine learning controller 540. The adjusted machine learning controller 540 improves its performance by using a larger and more varied dataset (e.g., by receiving feedback indications from various users) for the training of the machine learning controller 540.

In some embodiments, the user may also select a learning rate for the machine learning controller 540. Adjusting the learning rate for the machine learning controller 540 impacts the speed of adjustment of the machine learning controller 540 based on the received user feedback. For example, when the learning rate is high, even a small number of feedback indications from the user (or users) will impact the performance of the machine learning controller 540. On the other hand, when the learning rate is lower, more feedback indications from the user are used to create the same change in performance of the machine learning controller 540. Using a learning rate that is too high may cause the machine learning controller 540 to change unnecessarily due to an anomaly operation of the power tool 500. On the other hand, using a learning rate that is too low may cause the machine learning controller 540 to remain unchanged until a large number of feedback indications are received requesting a similar change. In some embodiments, the power tool 500 includes a dedicated actuator to adjust the learning rate of the machine learning controller 540. In another embodiment, the activation switch 545 used to enable or disable the machine learning controller 540 may also be used to adjust the learning rate of the machine learning controller 540. For example, the activation switch 545 may include a rotary dial. When the rotary dial is positioned at a first end, the machine learning controller 540 may be disabled, as the rotary dial moves toward a second end opposite the first end, the machine learning controller 540 is enabled and the learning rate increases. When the rotary dial reaches the second end, the learning rate may be at a maximum learning rate. In other embodiments, an external device 107 (e.g., smartphone, tablet, laptop computer, an ASIC, and the like), may communicatively couple with the power tool 500 and provide a user interface to, for example, select the learning rate. In some embodiments, the selection of a learning rate may include a selection of a low, medium, or high learning rate. In other embodiments, more or less options are available to set the learning rate, and may include the ability to turn off learning (i.e., setting the learning rate to zero).

As discussed above, when the machine learning controller 540 implements a recurrent neural network, the learning rate (or sometimes referred to as a "switching rate") affect how previous inputs or training examples affect the output of the current input or training example. For example, when the switching rate is high the previous inputs have minimal effect on the output associated with the current input. That is, when the switching rate is high, each input is treated more as an independent input. On the other hand, when the switching rate is low, previous inputs have a high correlation with the output of the current input. That is, the output of the current input is highly dependent on the outputs determined for previous inputs. In some embodiments, the user may select the switching rate in correlation (e.g., with the same actuator) with the learning rate. In other embodiments, however, a separate actuator (or graphical user interface element) is generated to alter the switching rate independently from the learning rate. The methods or components to set the switching rate are similar to those described above with respect to setting the learning rate.

The description of FIG. 6 focuses on the server electronic processor 425 training, storing, and adjusting the machine learning control 585. In some embodiments, however, the electronic processor 550 of the power tool 500 may perform some or all of the steps described above with respect to FIG. 6. For example, FIG. 4 illustrates an example power tool system 400 in which the power tool 405 stores and adjusts the machine learning controller 540. Accordingly, in this system 400, the electronic processor 550 performs some or all of the steps described above with respect to FIG. 6. Analogously, in some embodiments, the electronic processor 575 of the machine learning controller 540 or the external device 107 performs some or all of the steps described above with respect to FIG. 6.

Figure 7:
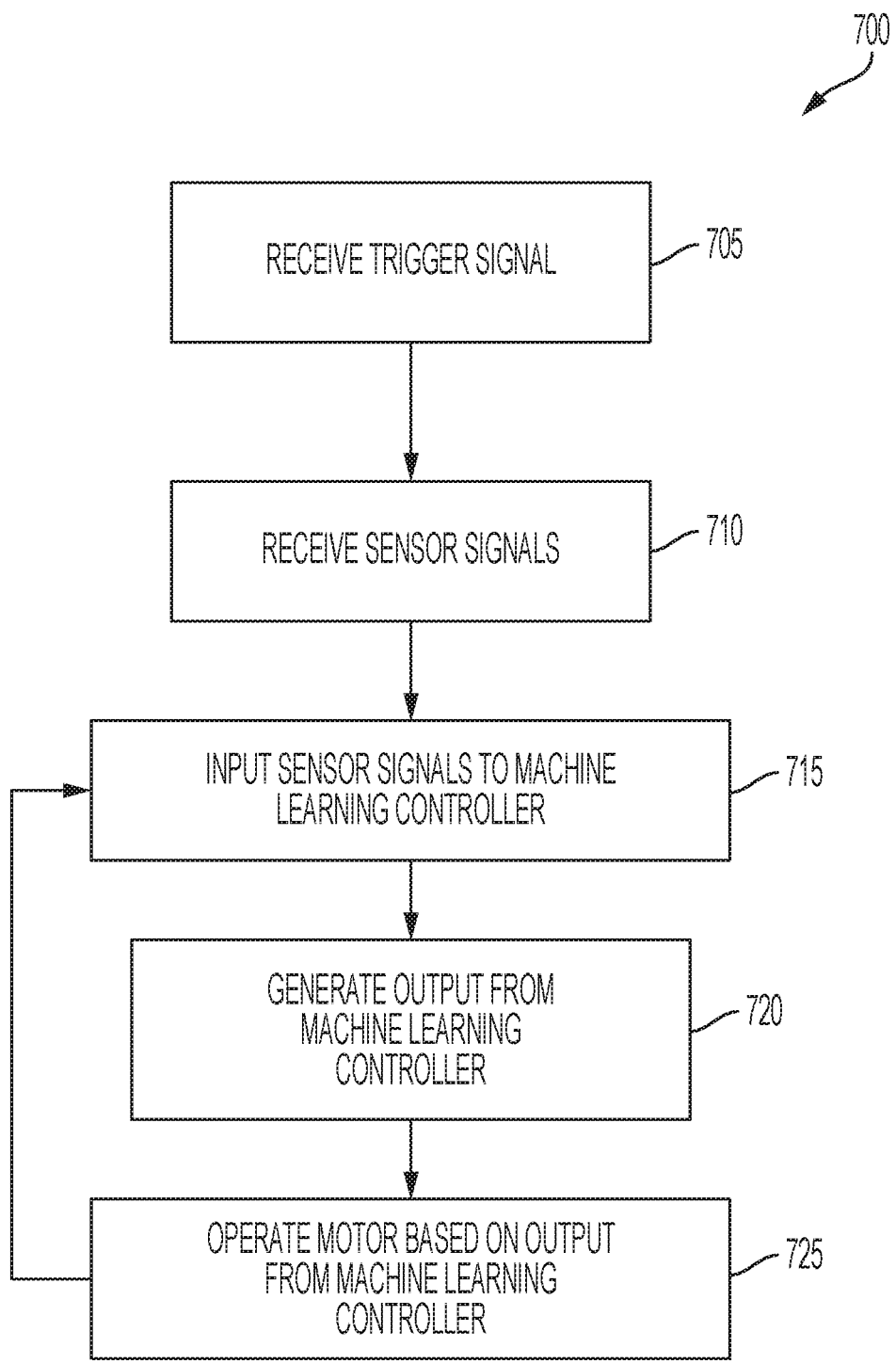
FIG. 7 is a flowchart illustrating a method of operating the power tool of FIG. 5A according to the machine learning controller.

FIG. 7 is a flowchart illustrating a method 700 of operating the power tool 500 according to the machine learning controller 540 as referenced in step 620 of FIG. 6. In step 705, the power tool 500 receives a trigger signal from the trigger 510 indicating that the power tool 500 is to begin an operation. During operation of the power tool 500, the electronic processor 550 receives output sensor data (step 710) from the sensors 530. As discussed above, the output sensor data provide varying information regarding the operation of the power tool 500 (referred to as operational parameters) including, for example, motor position, motor speed, spindle position, spindle speed, output torque, position of the power tool 500, battery pack state of charge, date, time, time, time since last use, mode, clutch setting, direction, battery type, presence of side-handle, errors, history of past applications and switching rate, user input, external inputs, gear and the like, see again Table 3. The electronic processor 550 then provides at least some of the sensor data to the machine learning controller 540 (step 715). In embodiments in which the electronic processor 550 implements the machine learning control 585, the electronic processor 550 bypasses step 715. When the power tool 500 does not store a local copy of the machine learning controller 540, such as in the power tool system 100 of FIG. 1, the electronic processor 550 transmits some or all of the sensor information to the server 110 where the machine learning controller 540 analyzes the received information in real-time, approximately real-time, at a later time, or not at all.

The sensor information transmitted to the machine learning controller 540 varies based on, for example, the particular task for the machine learning controller 540. As discussed above, the task for the machine learning controller may vary based on, for example, the type of power tool 500. For example, in the context of an impact driver, the machine learning controller 540 for the power tool 500 may be configured to identify a type of application of the power tool 500 and may use specific operational thresholds for each type of application. In such embodiments, the electronic processor 550 may transmit, for example, the rotating speed of the motor 505, the rotating speed of the spindle, the operating mode of the power tool, but may not send the battery pack state of charge. The machine learning controller 540 then generates an output based on the received sensor information and the particular task associated with the machine learning block 540 (step 720). For example, the machine learning program executing on the machine learning controller 540 processes (e.g., classifies according to one of the aforementioned machine learning algorithms) the received sensor information and generates an output. In the example above, the output of the machine learning controller 540 may indicate a type of application for which the power tool 500 is being used. The electronic processor 550 then operates the motor 505 based on the output from the machine learning controller 540 (step 725). For example, the electronic processor 550 may use the output from the machine learning controller 540 to determine whether any operational thresholds (e.g., starting speed, maximum speed, finishing speed, rotating direction, number of impacts, and the like) are to be changed to increase the efficacy of the operation of the power tool 500. The electronic processor 550 then utilizes the updated operational thresholds or ranges to operate the motor 505. In another example, the output may indicate a condition of the tool and the electronic processor 550 controls the motor dependent on the condition. For example, and as described in further detail below, the condition may indicate an output torque value of the motor, an obstacle that is detected, an abnormal accessory condition that is detected, a kickback that is detected, or an operation that is finished (e.g., a fastening operation is completed). The motor, in turn, may be controlled to stop, to increase speed, or decrease speed based on the condition, or may be controlled in other ways based on the condition. Although the particular task of the machine learning controller 540 may change as described in more detail below, the electronic processor 550 uses the output of the machine learning controller 540 to, for example, better operate the power tool 500 and achieve a greater operating efficiency.

In some embodiments, the machine learning controller 540 receives user characteristics of the current user of the power tool 500 in step 715, in addition to or instead of sensor data, and then generates an output in step 720 based on the user characteristics or based on the user characteristics and the sensor data received in step 715. In some embodiments, in addition to or instead of controlling the motor in step 725, another electronically controllable element is controlled. For example, in some embodiments, one or more of an LED of the power tool is enabled, disabled, has its color changed, or has its brightness changed; a gear ratio of the power tool is changed (e.g., the gear ratio is increased or decreased, or a gear ratio from a plurality of gear ratios is selected), a solenoid of the power tool is enabled or disabled, or an electronic filtering rate is adjusted for a faulting or noisy sensor.

In some embodiments, the server 110, 210, 310, 410 may store a selection of various machine learning controls 585 in which each machine learning control 585 is specifically trained to perform a different task. In such embodiments, the user may select which of the machine learning controls 585 to implement with the power tool 500. For example, an external device 107 (see FIG. 15) may provide a graphical interface that allows the user to select a type of machine learning control 585. A user may select the machine learning control 585 based on, for example, applications for which the user utilizes the power tool 500 often (e.g., if the user often installs drywall), or commonly used power tools (e.g., a user often uses an impact driver). In such embodiments, the graphical user interface receives a selection of a type of machine learning control 585. The external device 107 may then send the user's selection to the server 110, 210, 310, 410. The server 110, 210, 310, 410 would then transmit a corresponding machine learning control 585 to the power tool 500, or may transmit updated operational thresholds based on the outputs from the machine learning control 585 selected by the user. Accordingly, the user can select which functions to be implemented with the machine learning control 585 and can change which type of machine learning control 585 is implemented by the server 110, 210, 310, 410 or the power tool 500 during the operation of the power tool 500.

As discussed above, a user may provide feedback indications regarding the operation of the machine learning controller 540. In a first embodiment, the electronic processor 550 detects patterns (e.g., "rapid fire" patterns) in the activations of the trigger 15. FIG. 8 illustrates two example patterns detected by the electronic processor 550. In such embodiments, the electronic processor 550 is programmed to identify specific trigger activation patterns and associate them with a particular type of feedback. For example, the patterns may be defined as a series of thresholds (e.g., duration, percentage of depression, and the like), and the electronic processor 550 compares sensed trigger activations to the thresholds to determine whether a trigger activation pattern was received. The trigger patterns may be defined by, for example, a number of trigger activations, a length of each trigger activation (e.g., maintaining the trigger 510 depressed for a 10 ms instead of 50 ms), the relative intensity of activation (e.g., a percent depression of the trigger 15), or a combination thereof. For example, a first pattern 805 shown in the top portion of FIG. 8 illustrates three short activations 810, 815, 820 of equal intensity, while the second pattern shown 825 in the bottom portion of FIG. 8 illustrates a short activation 830, followed by two longer activations 835, 840, and ending with a short activation 845. In such embodiments, each of the illustrated patterns 805, 825 indicates a different type of feedback from the user. For example, in one embodiment, the first trigger pattern 805 may be associated with positive feedback regarding the operation of the machine learning controller 540 and the second trigger pattern 825 may be associated with negative feedback regarding the operation of the machine learning controller 540. In other embodiments, the first trigger pattern 805 illustrated in the top portion of FIG. 8 is indicative of a desired increase in rotational speed of the motor 505, while the second trigger pattern 825 illustrated in the bottom portion of FIG. 8 is indicative of a desired decrease in rotational speed of the motor 505. When the electronic processor 550 detects the feedback trigger patterns, the electronic processor 550 uses the feedback to adjust the machine learning controller 540 as discussed above with respect to FIG. 6.

Figure 9A:
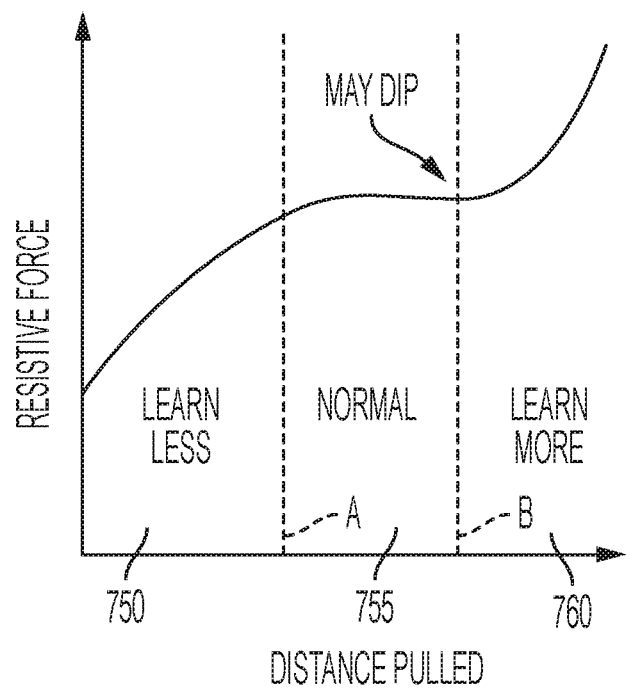
FIG. 9A illustrates a graph for the operation of a multi-stage trigger.

In another embodiment, the power tool 500 includes a multi-stage trigger that is used by the user to provide feedback regarding the operation of the power tool 500 and, in some embodiments, regarding the operation of the machine learning controller 540. FIG. 9A illustrates a graph showing the operation of a multi-stage trigger. In the illustrated embodiment, the trigger depression is divided into three different stages: an initial activation stage 750, an intermediary activation stage 755, and a final activation stage 760. In the illustrated embodiment, the resistive force changes in each activation stage 750, 755, 760 to indicate to the user which activation stage the trigger 510 is currently in. The use of additional springs may be used to change the resistive force (see, for example, FIG. 9B). In the example illustrated in FIG. 9A, the trigger 510 experiences a lower resistive force in the initial activation stage 750. In other words, the trigger 510 is easier to activate and move during the initial activation stage. When the distance that the trigger 510 is depressed reaches a first predetermined distance A, the trigger 510 enters the intermediary activation stage 755. In the intermediary activation stage 755, the resistive force remains relatively constant. The trigger 510 remains in the intermediary stage 755 until the distance that the trigger 510 is depressed reaches a second predetermined distance B. When the trigger 510 reaches the second predetermined distance B, the trigger 510 enters the final activation stage 760. During the final activation stage 760, the trigger 510 experiences a higher and increasing resistive force than the initial activation stage 750 and the intermediary stage 755.

Entering each activation stage 750, 755, 760 provides a different feedback indication to the electronic processor 550. In the illustrated embodiment, for example, each activation stage corresponds to a different magnitude of the learning rate. That is, the electronic processor 550 maintains the learning rate below a predetermined threshold when the trigger 510 remains in the initial activation stage 750. When the trigger 510 enters the intermediary stage 755, however, the electronic processor 550 increases the learning rate to an "average" level, but maintains the learning rate below a second predetermined level. The second predetermined level is higher than the first predetermined level. When the electronic processor 550 detects that the trigger 510 is in the final activation stage 760, the electronic processor 550 increases the learning rate to a level higher than the second predetermined level. Accordingly, the user may indicate a desired learning rate by controlling the current activation stage of the trigger 510.

In other embodiments, the different activation stages of the trigger 510 may provide different types of feedback to the electronic processor 550. For example, each activation stage of the trigger 510 may indicate a different desired speed for the motor 505, a different output torque, and the like. In some embodiments, instead of associating a higher resistive force in the final activation stage 760, the trigger 510 experiences a temporary (or momentary) decrease in resistive force to more clearly mark the switch between the intermediary activation stage 755 and the final activation stage 760. In other embodiments, the resistive force of the trigger 510 remains relatively constant throughout the different activation stages 750, 755, 760 of the trigger 510, but other aspects of the trigger 510 change to indicate to the user the current activation stage of the trigger 510.

Figure 9B:
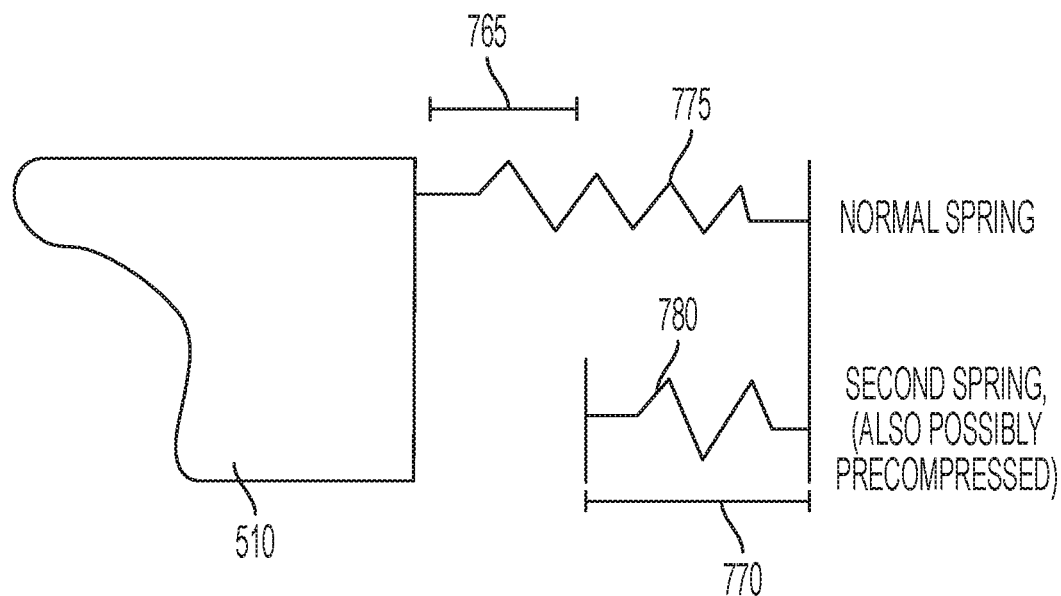
FIG. 9B illustrates a schematic diagram of another multi-stage trigger.

FIG. 9B illustrates a second embodiment in which the trigger 510 includes a first activation stage 765 and a second activation stage 770. The embodiment illustrated in FIG. 9B includes both a first spring 775 and a second spring 780 coupled to the trigger 510. During the first activation stage 765, only the first spring 775 engages the trigger 510. On the other hand, once the trigger 510 enters the second activation stage 770, both the first spring 775 and the second spring 780 engage the trigger 510. Accordingly, the resistive force of the trigger 510 increases when the trigger 510 enters the second activation stage 770. In other embodiments, other methods may be used to change the resistive force of the trigger 510. Additionally, in other embodiments, different types of multi-stage triggers may be utilized to enable the user to provide feedback to the power tool 500 regarding, for example, the operation of the machine learning controller 540.

In some embodiments, the trigger switch 555 may be activated by, for example, a position sensor (e.g., a Hall- Effect sensor) that relays information about the relative position of the trigger 510 to the tool housing or electrical trigger switch 555. The trigger switch 555 outputs a signal indicative of the position of the trigger 510. In some instances, the trigger switch 555 may output an analog signal that various from 0 to 5 volts depending on the extent that the trigger 510 is depressed. For example, 0 V output indicates that the trigger 510 is released, 1 V output indicates that the trigger 510 is 20% depressed, 2 V output indicates that the trigger 510 is 40% depressed, 3 V output indicates that the trigger 510 is 60% depressed 4 V output indicates that the trigger 510 is 80% depressed, and 5 V indicates that the trigger 510 is 100% depressed. In some embodiments, the power tool 500 may include an indicator to indicate to the user the current activation stage of the trigger 510. As described above with respect to FIGS. 9A and 9B, entering a different activation stage may provide the electronic processor 550 with a feedback indication from the user. The feedback mechanisms described above with respect to FIGS. 8-9B may also be applied to providing an indication or a selection of a switching rate when, for example, the machine learning controller 540 implements a recurrent neural network.

Figure 10:
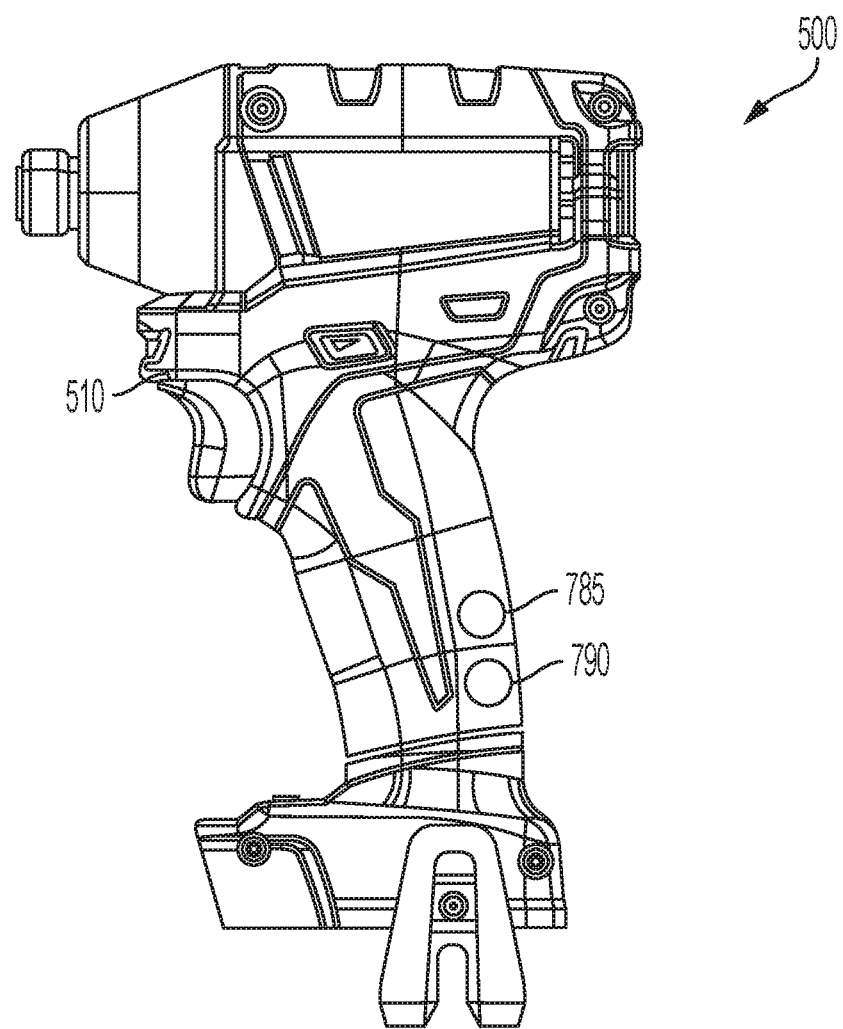
FIG. 10 illustrates a power tool including feedback actuators.

FIG. 10 illustrates yet another embodiment of providing actuators to receive user feedback regarding the operation of the power tool 500 and regarding the operation of the machine learning controller 540, in particular. In the illustrated embodiment, the power tool 500 includes a first actuator 785 and a second actuator 790. In some embodiments, each actuator 785, 790 may be associated with a different type of feedback. For example, the activation of the first actuator 785 may indicate that the operation of the machine learning controller 540 is adequate (e.g., positive feedback), while the activation of the second actuator 790 may indicate that the operation of the machine learning controller 540 is inadequate (e.g., negative feedback). For example, a user may indicate that changes made to the finishing speed are undesirable when the electronic processor 550 implemented a different finishing speed due to a determination by the machine learning controller 540 that the power tool 500 is being utilized for a particular application. In other embodiments, the first actuator 785 and the second actuator 790 (or an additional pair of buttons) are associated with increasing and decreasing the learning rate of the machine learning controller 540, respectively. For example, when the user wants to increase the learning rate of the machine learning controller 540, the user may activate the first actuator 785. FIG. 10 illustrates the first and second actuators 785, 790 on the handle of the power tool 500. In other embodiments, however, the first and second actuators may be positioned on the foot of the power tool 500, below the handle, or on the motor housing portion above the handle.

Figure 11:
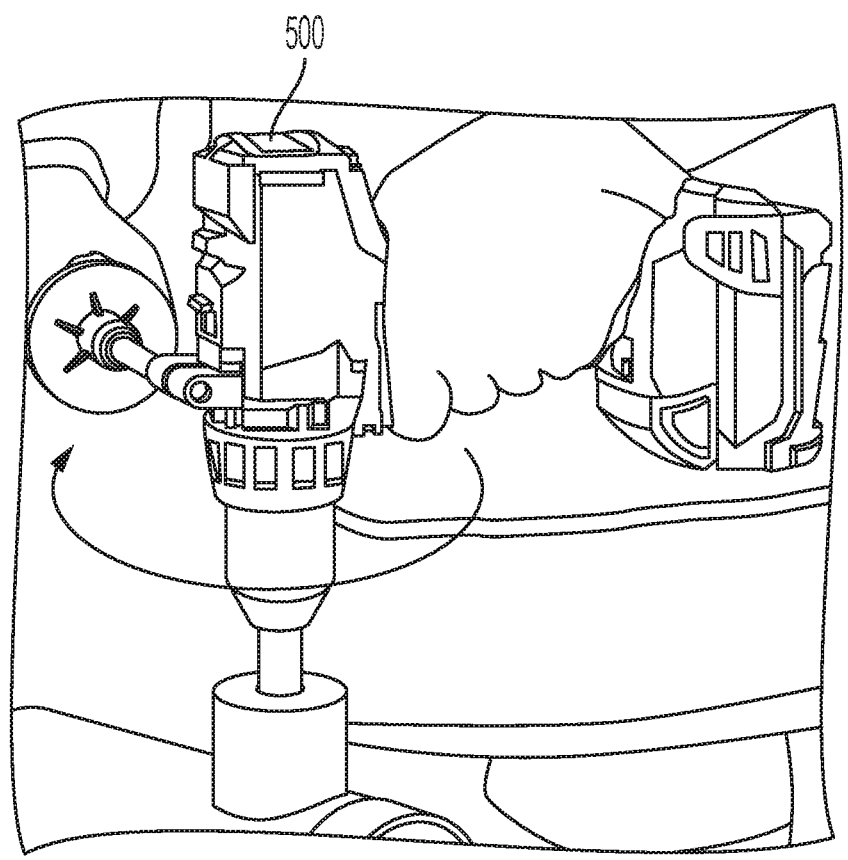
FIG. 11 is an illustration of a rotation of the power tool to provide feedback information.

In another embodiment, the user may provide feedback to the electronic processor 550 by moving the power tool 500 itself. For example, the power tool 500 may include an accelerometer and/or a magnetometer (e.g., as a sensor 530) that provides an output signal to the electronic processor 550 indicative of a position, orientation, or combination thereof of the power tool 500. In such embodiments, clockwise or counterclockwise rotation of the power tool as illustrated in FIG. 11 may provide feedback information to the electronic processor 550. For example, rotating the power tool clockwise may correspond to a request for the electronic processor 550 to increase the speed of the motor 505, while rotating the power tool 500 counter-clockwise may correspond to a request for the electronic processor 550 to decrease the speed of the motor 505. In some embodiments, the electronic processor 550 may detect a shaking motion of the power tool 500 using similar sensors. Shaking the power tool 500 may indicate that the power tool 500 is not operating as expected by the user to provide negative feedback. For example, the user may shake the power tool 500 when the machine learning controller 500 determines the incorrect application for the current task of the power tool 500. As discussed above, providing such feedback allows the machine learning controller 540 to update its parameters to improve its performance.

Figure 12:
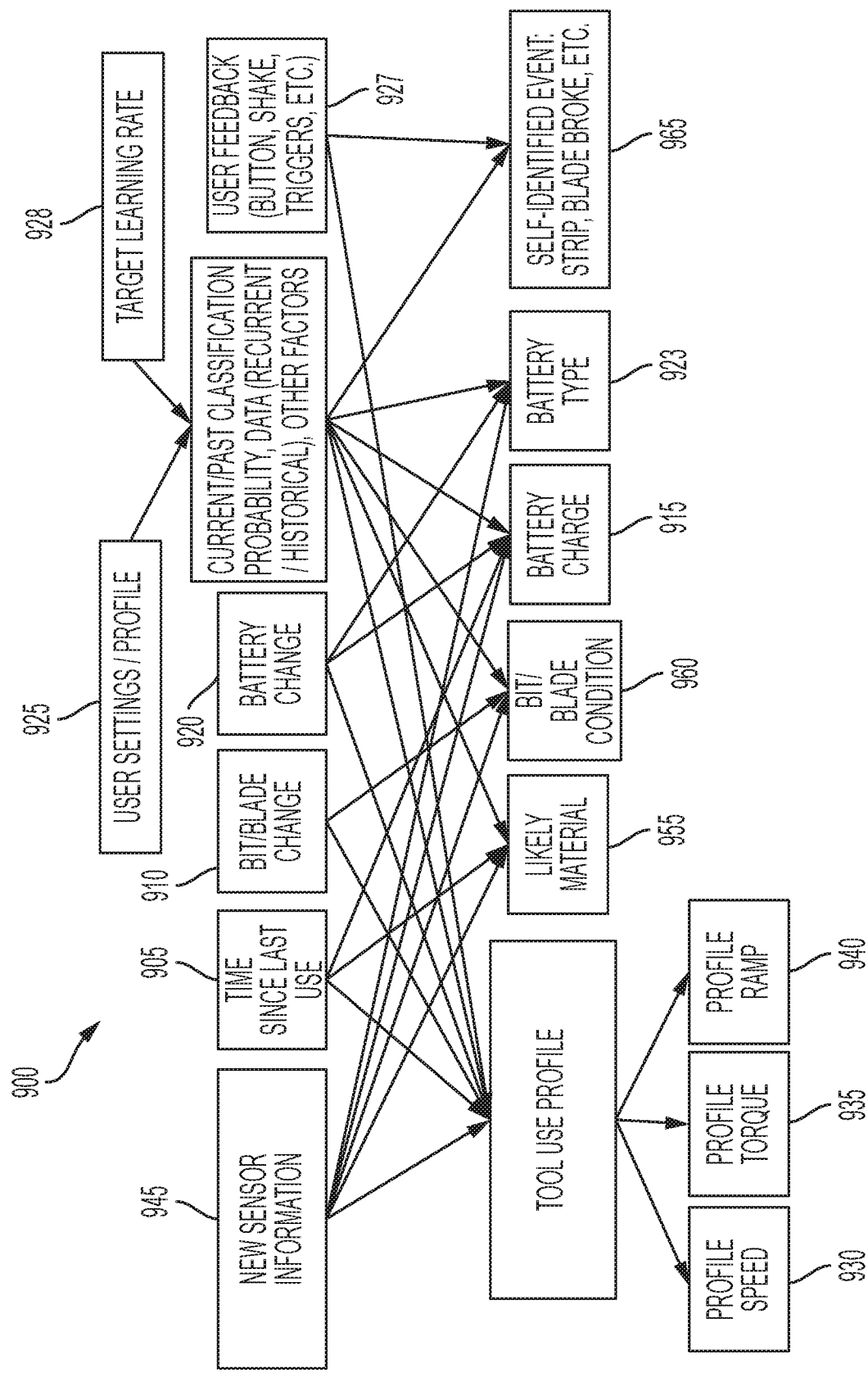
FIG. 12 is a schematic diagram of various types of information that may be utilized by the machine learning controller.

As discussed above, the machine learning controller 540 is associated with one or more particular tasks. The machine learning controller 540 receives various types of information from the power tool 500 and the electronic processor 550 based on the particular task for which the machine learning controller 540 is configured. For example, FIG. 12 illustrates a schematic diagram 900 of the various types of information that may be utilized by the machine learning controller 540 to generate outputs, make determinations and predictions, and the like. In the illustrated diagram, the machine learning controller 540 may receive, for example, an indication of the operation time of the power tool 500 (e.g., how long the power tool 500 is used in each session, the amount of time between sessions of power tool usage, and the like) 905, information regarding changes in bits, blades, or other accessory devices 910 for the power tool 500, the state of charge of the battery pack 915, the amount of time the battery pack has been in use, whether the battery pack was recently changed 920, and the like. The machine learning controller 540 may also receive information regarding the battery pack type 923 used with the power tool 500 (e.g., an 18V battery pack).

As discussed above, the mode pad 527 selects an operating mode for the power tool. The operating mode may specify operation parameters and thresholds for the power tool 500 during operation in that mode. For example, each operation mode may define a maximum torque, minimum torque, average torque, starting speed, finishing speed, non-impacting speed, impacting speed, a speed ramp (e.g., how fast the motor 505 reaches the target speed), a target number of impacts, a rotation direction, a speed for each rotation direction, and a combination thereof. The combination of two or more operation parameters or thresholds define a tool use profile or mode. When the mode is selected by the user, the electronic processor 550 controls the motor 505 according to the operation parameters or thresholds specified by the selected mode, which may be stored in the memory 560. The machine learning controller 540 also receives information regarding the operating mode 925 of the power tool 500 such as, for example, the speed(s) associated with the mode, the mode torque, the mode ramp, and the like. The machine learning controller also receives sensor information 945 indicative of an operational parameter of the power tool 500 such as, for example, motor current, motor voltage, trigger activations or feedback from the trigger, motion of the power tool, motor speed, output shaft speed, and the like.

Figure 15:
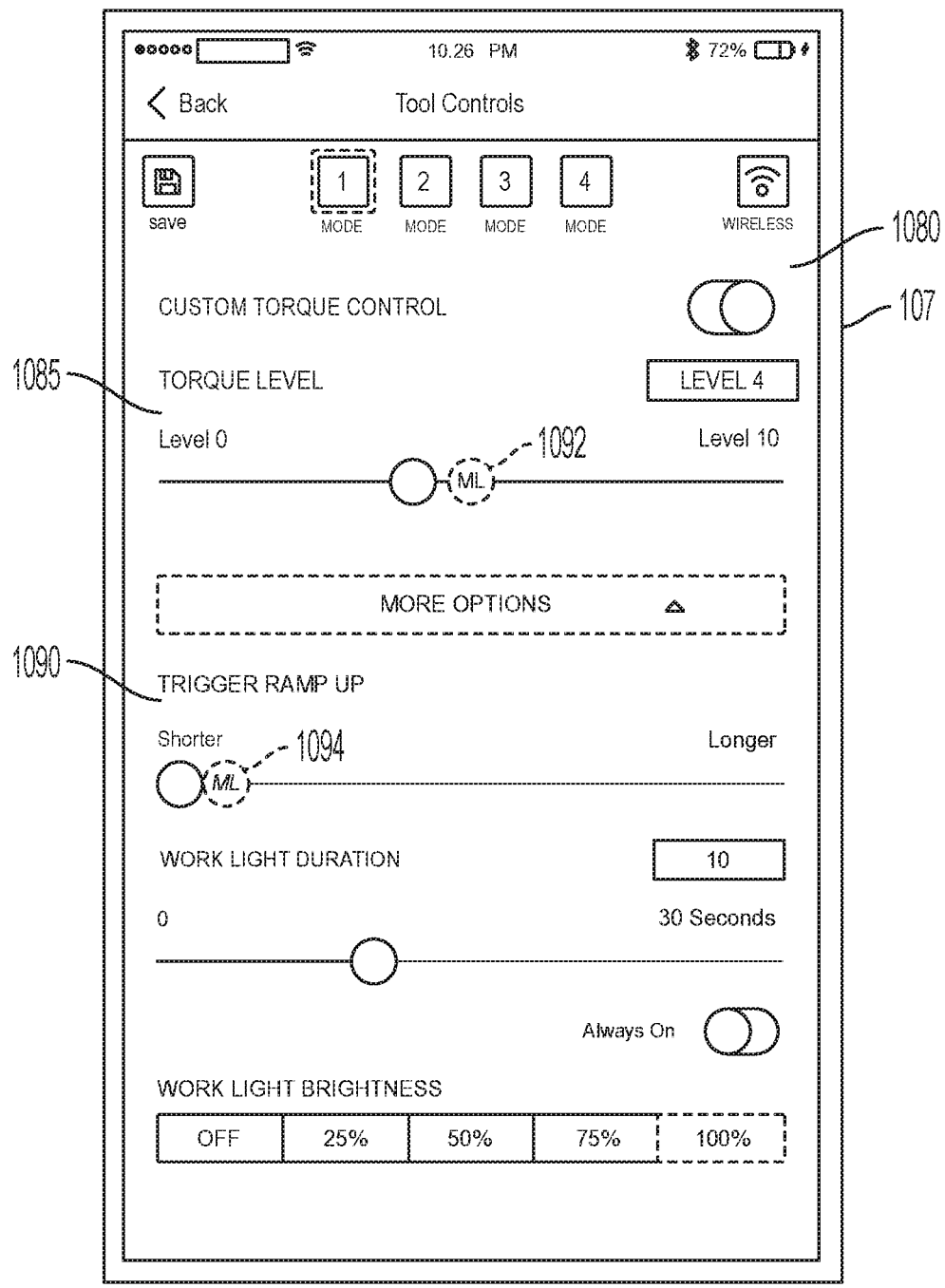
FIG. 15 illustrates an example graphical user interface illustrating a parameter suggested by the machine learning controller.

As discussed above, the machine learning controller 540 may also receive feedback from the user 927 as well as an indication of a target learning rate 928. The machine learning controller 540 using various types and combinations of the information described above to generate various outputs based on the particular task associated with the machine learning controller 540. For example, in some embodiments, the machine learning controller 540 generates suggested parameters for a particular mode. The machine learning controller 540 may generate a suggested starting or finishing speed 930, a suggested mode torque(s) 935, and a suggested mode ramp 940. FIG. 15 illustrates an example graphical user interface 1080 illustrating a suggested torque level and a suggested trigger ramp for a particular operating mode. Additionally, the machine learning controller 540 may determine a likely workpiece material (e.g., whether a power tool 500 is used on wood or drywall) 955. In some embodiments, the machine learning controller 540 may determine the condition of the bit or blade 960 attached to the power tool 500. In some embodiments, the machine learning controller 540 can also identify particular events such as a stripped fastener, a broken blade, kickback, and the like. The power tool 500 may then generate an indication to the user that such an event or condition has been detected such that corrective action may be taken. In some embodiments, for example, when the machine learning controller 540 implements a recurrent neural network, the identification of a particular event is input (e.g., sent) to the machine learning controller 540 to help identify other events and/or other aspects of the operation of the power tool 500. For example, when the machine learning controller 540 determines that a first fastener has been stripped, the machine learning controller 540 may then alter the finishing speed when securing the next fastener to inhibit stripping the second fastener.

As discussed above, the architecture for the machine learning controller 540 may vary based on, for example, the particular task associated with the machine learning controller 540. In some embodiments, the machine learning controller 540 may include a neural network, a support vector machine, decision trees, logistic regression, and other machine learning architectures. The machine learning controller 540 may further utilize kernel methods or ensemble methods to extend the base structure of the machine learning controller 540. In some embodiments, the machine learning controller 540 implements reinforcement learning to update the machine learning controller 540 based on received feedback indications from the user.

Figure 13:
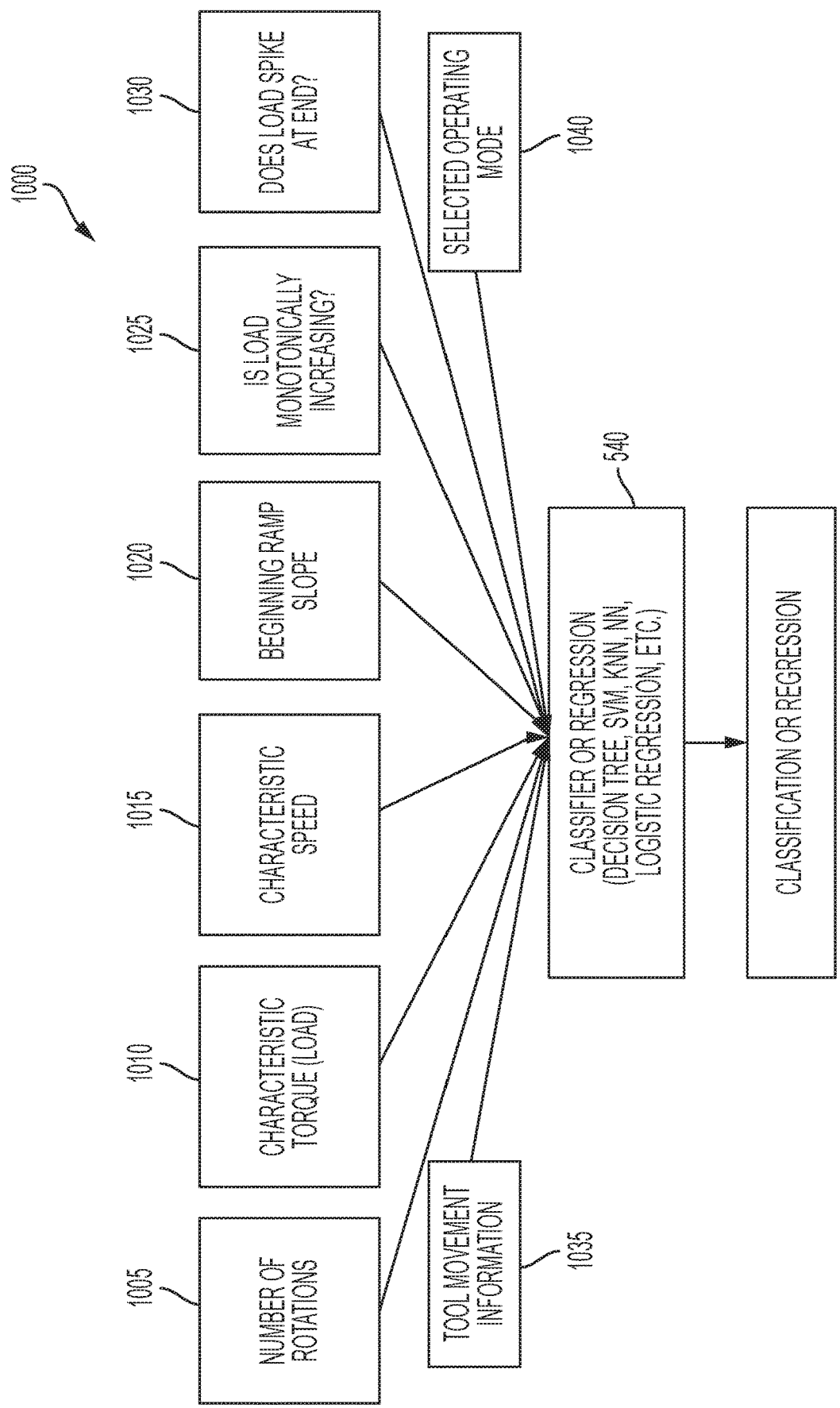
FIG. 13 illustrates a schematic diagram of a machine learning controller configured to identify a type of fastener used.

FIG. 13 illustrates a diagram 1000 for an example use of the machine learning controller 540. In the illustrated embodiment, the machine learning controller 540 is configured to identify a type of fastener being worked on by the power tool 500. In such an embodiment, the machine learning controller 540 receives, for example, a number of rotations 1005, a load torque 1010, a motor speed 1015, a torque or speed ramp slope 1020, information regarding whether the load increases monotonically 1025, information regarding whether the load increases rapidly toward the end of the operation 1030, information regarding the tool movement 1035 (e.g., rotation of the power tool 500, output signals from an accelerometer), and a selected operating mode 1040 for the power tool 500. In one embodiment, the information (operational parameters) described above is generated by the electronic processor 550 based on sensor data from the sensors 530, arithmetic operations using the sensor data (e.g., to calculate slope), and comparisons of the sensor data or calculated values with threshold (e.g., defining whether an increase is rapid). The generated information is then received by the machine learning controller 540 after each operation by the power tool 500 is completed (e.g., after each fastener is fully installed or removed). Based on the received information, the machine learning controller 540 determines the type of fastener used in the operation of the power tool 500. In the illustrated embodiment, the machine learning controller 540 may utilize, for example, a neural network with multiple outputs such that each output corresponds to a different type of fastener. In some embodiments, the machine learning controller 540 may also generate an output indicating that the fastener was unable to be identified.

In one example, the machine learning controller 540 may identify a fastener type of a fastener from various potential fastener types. For example, the machine learning controller 540 differentiates between a self-drilling screw, a sheet metal screw, a drywall screw, among others. Accordingly, in the illustrated embodiment, the training examples for the machine learning controller 540 include an input vector indicating the number of rotations 1005, the load torque 1010, the motor speed 1015, the torque or speed ramp slope 1020, an indication of whether the load increases monotonically 1025, an indication indicating whether the load increases rapidly toward the end of the operation 1030, an indication regarding the tool movement 1035, the selected mode of operation 1040, and an output label indicating the type of fastener. In the illustrated embodiment, the machine learning controller 540 implements an artificial neural network to perform this classification. The artificial neural network includes, for example, six input nodes, and, for example, one hundred output nodes. Each output node, for example, corresponds to a different type of fastener identifiable by the machine learning controller 540, and an additional output to indicate to the power tool 500 when the fastener does not correspond to any of the identifiable type of fasteners. The artificial neural network may include more or less output nodes based on the number of fasteners able to be differentiated. In some embodiments, the neural network includes an additional layer including a single node. This additional layer may determine which output node has the highest values (which may correspond to the probability that the type of fastener is identified as the type of fastener corresponding to that output node), and outputs a value (e.g., one, two, three, or four) associated with the output node. The value of the output node may correspond to a type of fastener identified by the machine learning controller 540.

During training of the machine learning controller 540 to identify the type of fastener, the machine learning controller 540 adjusts the weights associated with each node connection of the neural network to achieve a set of weights that reliably classify the different types of fasteners. As discussed above with respect to FIG. 1, each node of a neural network may have a different activation network, so adjusting the weights of the neural network may also be affected by the activation functions associated with each layer or each node. Once the neural network is trained, the machine learning controller 540 receives the input variables (e.g., the values associated with each input variable), and applies the weights and connections through each layer of the neural network. The output or outputs from the trained neural network correspond to a particular type of fastener identifiable by the machine learning controller 540.

Figure 14:
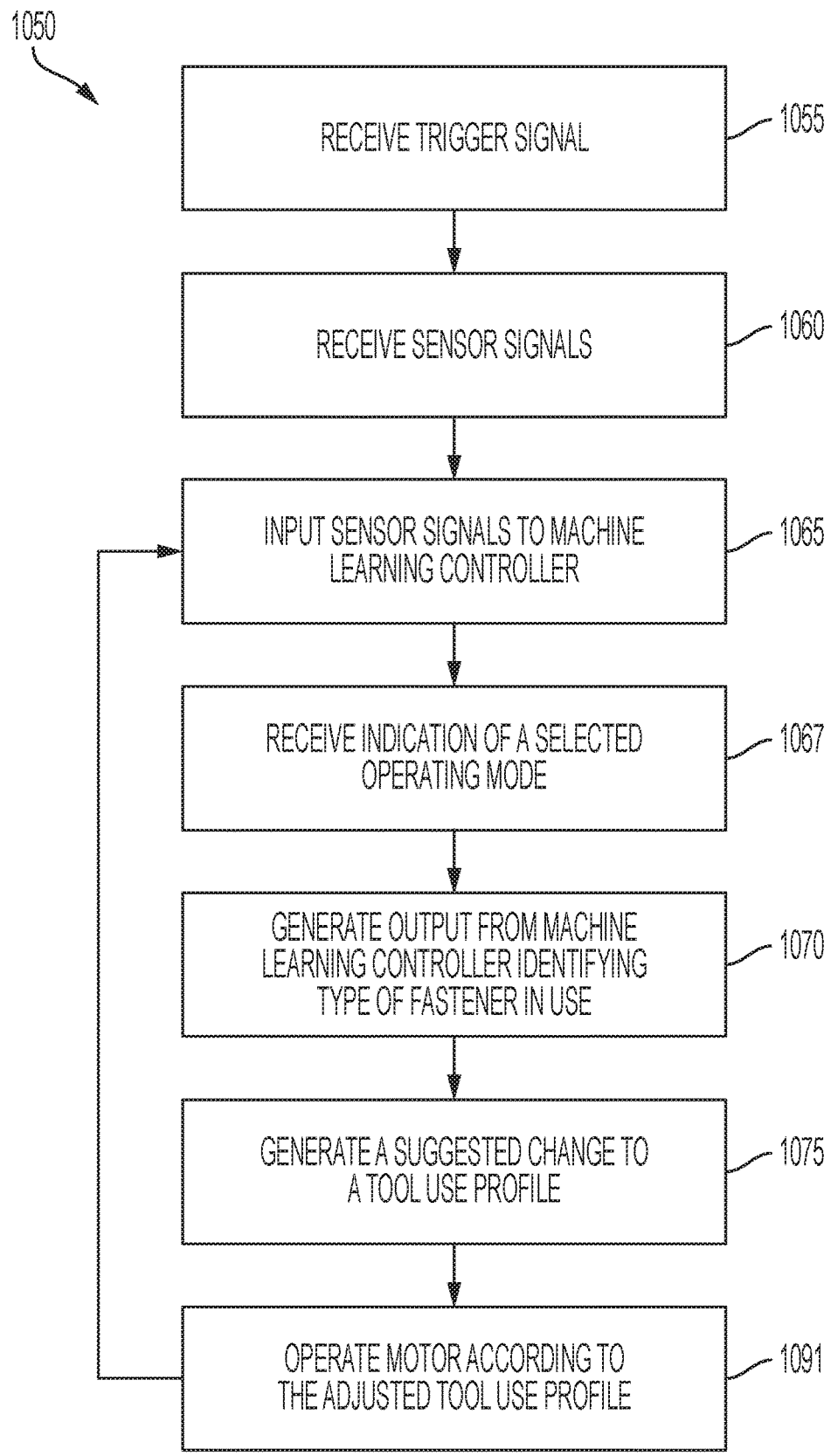
FIG. 14 is a flowchart illustrating a method of identifying type of fastener using the machine learning controller.

FIG. 14 is a flowchart illustrating a method 1050 of identifying a type of fastener using the machine learning controller 540. At step 1055, the electronic processor 550 receives a signal from the trigger 510 indicating that the user is operating the power tool 500. The electronic processor 550 begins to operate the power tool 500 and receiving sensor data from the sensors 530 (step 1060). As discussed above, sensor data is indicative of one or more operational parameters of the power tool and may include, for example, motor speed and/or position information, torque information, impact information, tool movement information, information regarding the selected mode, and the like. The electronic processor 550 then sends at least a subset of the sensor data to the machine learning controller 540 (step 1065). As discussed above with respect to FIG. 13, the machine learning controller 540 of the illustrated embodiment receives the motor speed, the torque and torque ramp, and the number of rotations performed. Some of the signals received by the machine learning controller 540 may be calculated by the electronic processor 550 rather than directly received from the sensors 530. For example, the electronic processor 550 may determine whether the load on the power tool 500 increases monotonically or if the load increases rapidly (e.g., spikes) toward the completion of the operation. The electronic processor 550 also sends these intermediary inputs (e.g., calculated or determined by the electronic processor 550 based on signals from the sensors 530) to the machine learning controller 540 as sensor data in step 1065. In step 1067, the machine learning controller 540 also receives an indication of a selected operating mode for the power tool 500.

The machine learning controller 540 then generates an output identifying the type of fastener in use by the power tool 500 (step 1070). As discussed above with respect to FIG. 13, the machine learning controller 540 generates the output identifying the type of fastener by using an artificial neural network. In other embodiments, the machine learning controller 540 may implement a different architecture to identify the type of fastener used by the power tool 500. In particular, the machine learning controller 540 receives the values for the input variables and uses these values to progress across the layers of the neural networks using the node connection weights and the activation functions for each node. As described above, the output layer may include one or more output nodes indicating the type of fastener used by the power tool 500, or indicating that the type of fastener was not identifiable by the machine learning controller 540.

In step 1075, a suggested change to an operating mode of the power tool is generated based on the identified type of fastener. The suggested change generated is then stored in a tool profile of the memory 560 by the electronic processor 550 as an operation parameter or threshold. The suggested change is generated by an electronic processor that receives the identified type of fastener from the machine learning controller 540, such as the electronic processor implementing the machine learning controller 540 or another electronic processor that is not implementing the machine learning controller 540, which, depending on the embodiment may be the electronic processor 550, an electronic processor of the external device 107 (FIG. 15), or the server electronic processor 425. The suggested change may be generated using the identified type of fastener as an input to a lookup table (stored in memory associated with the particular electronic processor) that maps fastener types to suggested operation parameters of the power tool 500.

FIG. 15 illustrates an example graphical user interface 1080 that displays the suggested change to the tool use profile in step 1075. The graphical user interface 1080 is generated by the external device 107, which may be in communication with the power tool 500, the server 110, 210, 310, 410, and the network 115, 215, 315, 415. The external device 107 includes an electronic processor, input/output interface (e.g., touch screen display), wireless communication circuit for the aforementioned power tool, server, and network communications, and a memory storing instructions that are retrieved and executed by the electronic processor to implement the functionality of the external device 107 described herein.

As shown in FIG. 15, the operating mode defines a torque level 1085 to which the fastener is applied on the workpiece, and a trigger ramp up 1090 indicating how fast the motor 505 is to reach the torque level 1085. As shown in the graphical user interface 1080, the operating mode may also indicate other parameters such as, a duration and a brightness for the work light, and the like. In this example, the suggested change generated in step 1075 is to slightly increase the torque and lengthen the trigger ramp up, which may allow the power tool 500 to more efficiently fasten or remove the type of fastener determined by the machine learning controller 540. For example, when the machine learning controller 540 determines that the power tool 500 fastens a wood screw, the suggested change may suggest an increase to the torque level and a longer trigger ramp up such that the wood screw may be set faster and more efficiently.

The electronic processor 550 then controls the motor 505 according to the suggested change by the machine learning controller 540 (step 1091). For example, in response to receiving the trigger signal from actuation of the trigger 510, the electronic processor 550 controls the switching network 517 (and, in some cases, other controllable elements) in accordance with the tool profile stored in the memory 560 as modified with the suggested change in step 1070.

In some embodiments, the electronic processor 550 waits for confirmation from a user before updating a tool profile in the memory 560 with the suggested changes in step 1070. For example, the external device 107 may receive input via the graphical user interface 1080 that indicates the user confirms the suggested change (e.g., via a touch input on a graphical "save" button on the graphical user interface 1080), and, in response, the external device 107 transmits a confirmation signal to the electronic processor 550 via the wireless communication device 525. Upon receipt of the confirmation signal, the electronic processor 550 stores the suggested change in a tool profile in the memory 560. In some embodiments, the electronic processor 550 implements the change suggested by the machine learning controller 540 without waiting for user confirmation. In such embodiments, the external device 107 may receive and display the implemented change to inform the user that the operational parameter for the operating mode has been changed.

In some embodiments, a method is provided similar to the method 1050 to generate a suggested change to a tool use profile, but the suggested change is based on user feedback, rather than sensor data alone or in combination with user feedback. For example, the machine learning controller 540, implementing a genetic algorithm, receives a current tool profile of the power tool 500 from the electronic processor 550 (e.g., including values for particular tool parameters) and receives user feedback after a tool operation (similar to step 625). Then, the machine learning controller 540 processes the user feedback and generates an output that indicates a suggested change to the current tool profile (similar to step 1075). Thereafter, the current tool profile is adjusted based on the suggested change, and the motor is operated according to the adjusted tool use profile (similar to step 1091).

Figure 16:
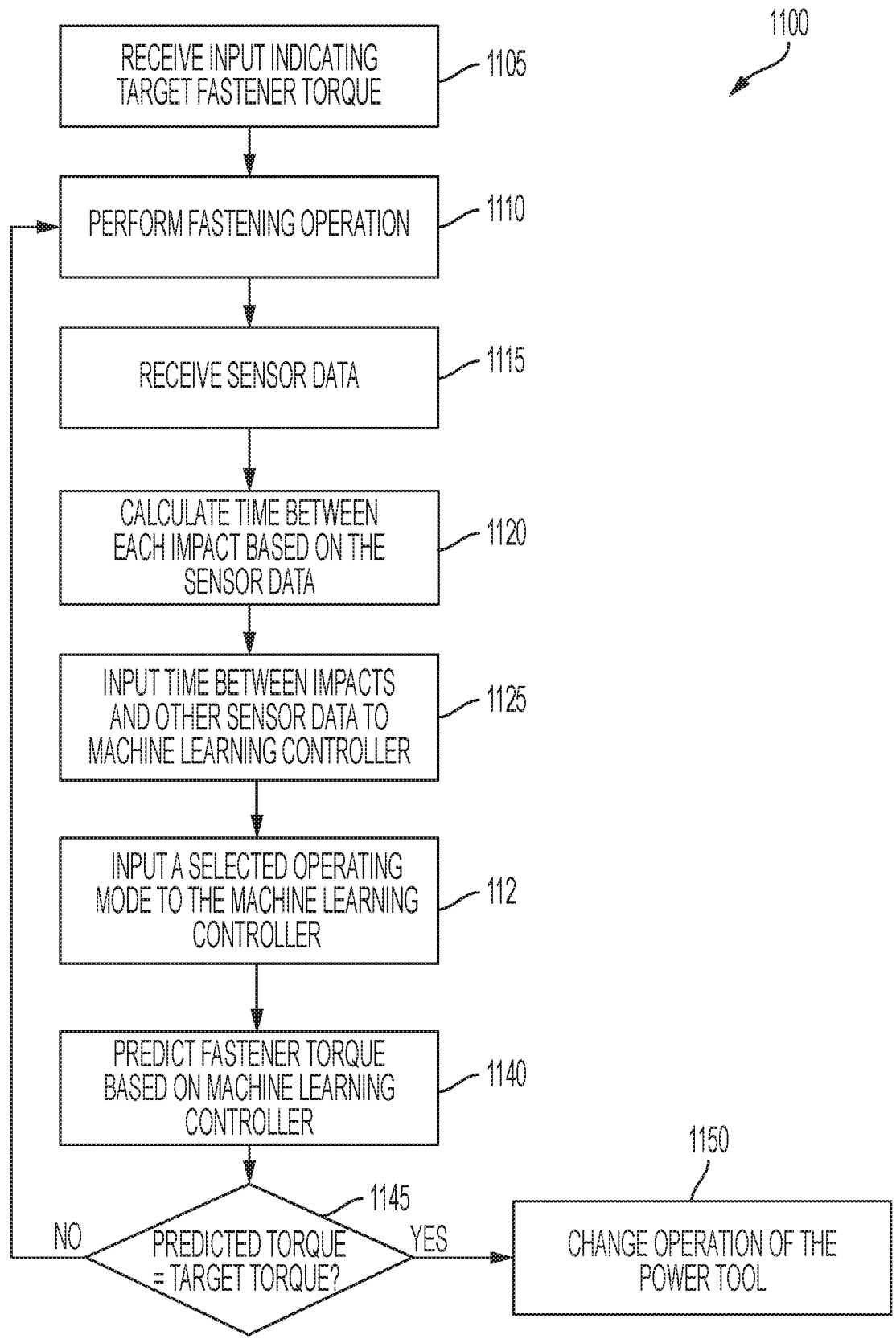
FIG. 16 is a flowchart illustrating a method of using the machine learning controller to predict a fastener torque.
Figure 17:
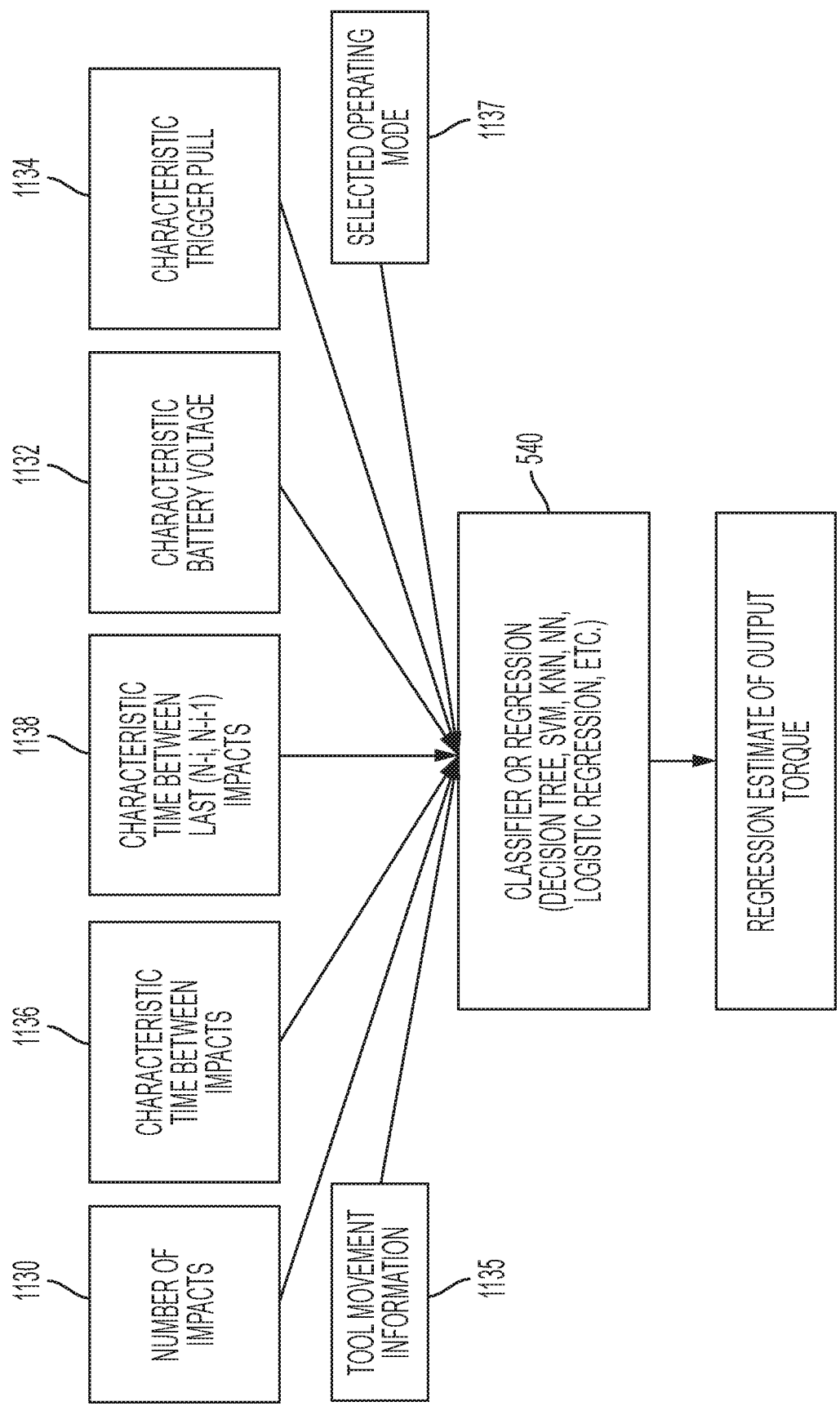
FIG. 17 is a schematic diagram for the implementation of the machine learning controller to predict the fastener torque.

FIG. 16 is a flowchart illustrating a method 1100 of using the machine learning controller 540 to predict the fastener torque. FIG. 17 illustrates a schematic diagram for the implementation of the machine learning controller 540 to predict the fastener torque. In step 1105, the electronic processor 550 receives an input indicating a target fastener torque. The electronic processor 550 may receive the target fastener torque from an actuator on the power tool 500 (e.g., a dial or push buttons). The user may select a torque using the torque actuator. In other embodiments, the electronic processor 550 may receive the target fastener torque from the external device 107. The external device 107 may generate a graphical user interface with a torque selector. The torque selector may be, for example, a slider, a numerical value, or a separate application launched by, for example, the external device 107. The external device 107 then transmits the user selected torque to the electronic processor 550. The power tool 500 then performs the fastening operation (step 1110). In other words, the electronic processor 550 begins to operate the motor 505 to fasten the fastener in response to a trigger signal from the trigger 510. During the fastening operation, the electronic processor 550 receives sensor output signals (step 1115). The sensor data is described above and may include a variety of power tool information indicative of one or more operational parameters of the power tool such as, for example, motor speed, motor current, state of charge of the battery, output shaft speed, rotation or movement of the power tool 500 itself, and the like. In particular, the electronic processor 550 receives an indication of each impact delivered by the hammer of the impact driver, an indication of the number of impacts delivered by the hammer, or a combination thereof. The electronic processor 550 may calculate a time between each impact based on the received sensor data (step 1120). For example, the electronic processor 550 may receive an indication that 6 impacts were delivered in approximately 30 ms. The electronic processor 550 may then estimate that approximately 5 ms elapse between each impact. In some embodiments, the electronic processor 550 calculates the time between each impact using different methods.

The electronic processor 550 then inputs the calculated time between each impact to the machine learning controller 540 (step 1125). The electronic processor 550 also inputs the selected operating mode to the machine learning controller 540 (step 1127). As shown in FIG. 17, the machine learning controller 540 may also receive other inputs from the electronic processor 550 and/or directly from the sensors 530. In particular, in some embodiments, in step 1125, the machine learning controller 540 also receives information regarding the number of impacts delivered by the hammer of the impact driver 1130, the battery voltage 1132, trigger activation information (e.g., whether the trigger 510 was pulled or whether the trigger 510 was pulled in a particular manner) 1134, tool movement information 1135. As discussed above, the machine learning controller 540 also receives the calculated time between impacts 1136 and the selected operating mode 1137. In the illustrated embodiment, the electronic processor 550 also calculates a time between the two most recently delivered impacts. The electronic processor 550 then provides the calculated time between the last two impacts 1138 to the machine learning controller 540.

The machine learning controller 540 of FIG. 17 may implement, for example, an artificial neural network. Similar to the neural network described with respect to FIG. 13, the neural network includes an input layer, at least one hidden layer, and an output layer. The neural network of the machine learning controller 540 of FIG. 17 may include, for example, five input nodes, each node corresponding to a different input variable that helps estimate the output torque. Each training example may include a value for each of the input variables and an actual value for the output torque as measured, for example, by a torque sensor of the power tool 500 after the operation was completed. During training of the neural network of FIG. 17, the node connection weights are adjusted with each additional training example until, for example, an acceptable average error is achieved between the actual measured torque and the estimated torque from the machine learning controller 540. Once the neural network has been trained, the machine learning controller 540 receives the values for the input variables, and applies the node connection weights according to the activation function of each node of the neural network. The output layer of the trained machine learning controller 540 indicates, for example, an estimated value of the output torque. In other embodiments, other architectures (such as a regression estimation) are used instead of the neural network described above.

The machine learning controller 540 then, implementing the trained machine learning control 585, predicts the fastener torque (step 1140). As shown in FIG. 17, the machine learning controller 540 implements a regression algorithm to predict the fastener torque based on the various inputs provided to the machine learning controller 540. The electronic processor 550 then determines whether the predicted torque is at the target torque for the particular operating mode (step 1145). As discussed above, the target torque may vary based on the particular operating mode and may be set using, for example, a dedicated actuator on the power tool 500 or a graphical user interface provided by an external device 107 in communication with the power tool 500. When the predicted torque from the machine learning controller 540 remains below the target torque, the electronic processor 550 continues to operate the motor 550 to increase the torque on the fastener by returning to step 1110. On the other hand, when the predicted torque from the machine learning controller 540 reaches the target torque, the electronic processor 550 changes operation of the power tool 500 (step 1150). For example, the electronic processor 550 may stop operation of the motor 505, reverse direction of the motor rotation, or slow the motor speed by changing a PWM signal to the power switching network 517. The electronic processor 550 changes the operation of the motor 505 based on the selected operating mode. For example, operation parameters of a tool profile may indicate that the motor 505 is to rotate at a first speed until the fastener torque reaches a target torque, and the motor 505 is to rotate 720 degrees after reaching the target torque. Accordingly, the electronic processor 550 changes the way in which the motor 505 is controlled based on the selected operating mode.

Figure 18A:
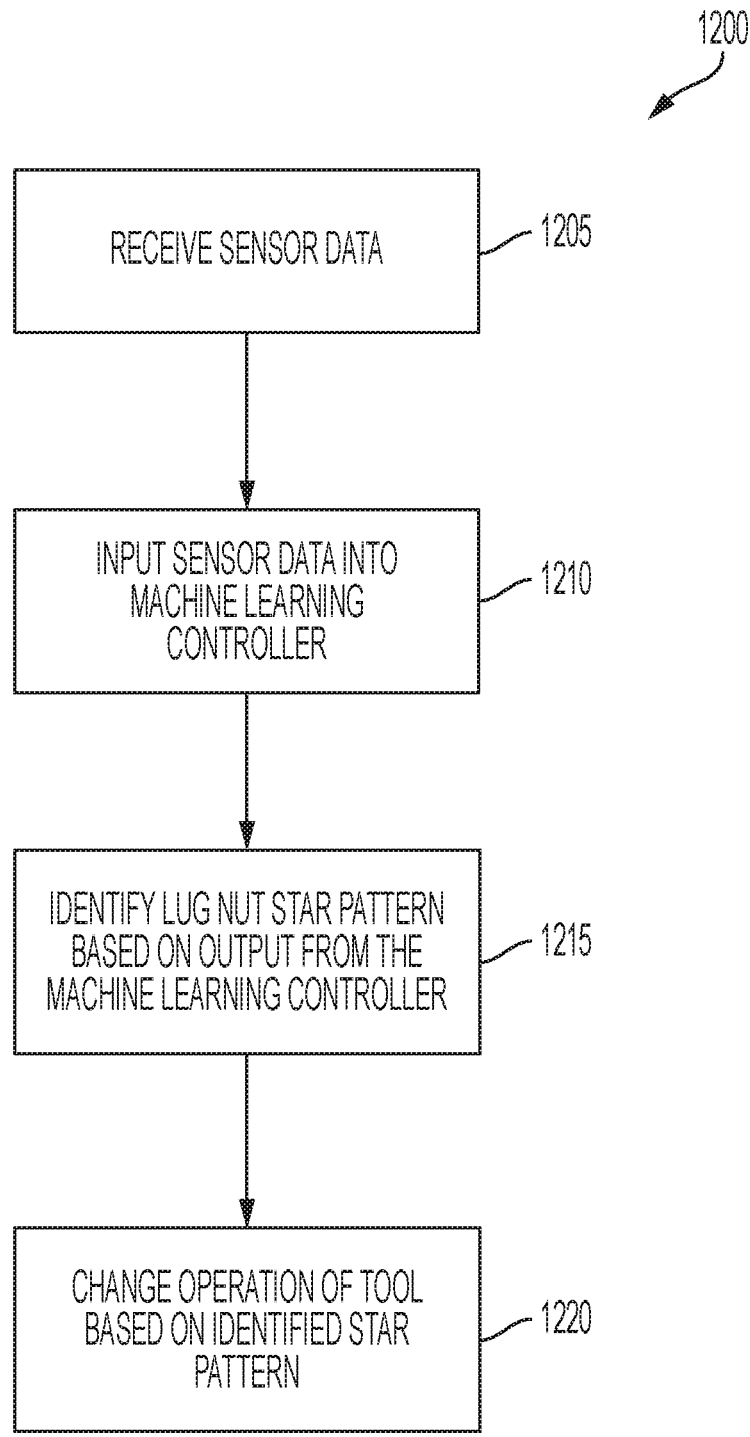
FIG. 18A is a flowchart illustrating a method in which the machine learning controller is configured to identify a lug nut star pattern performed by the power tool of FIG. 5A.
Figure 18B:
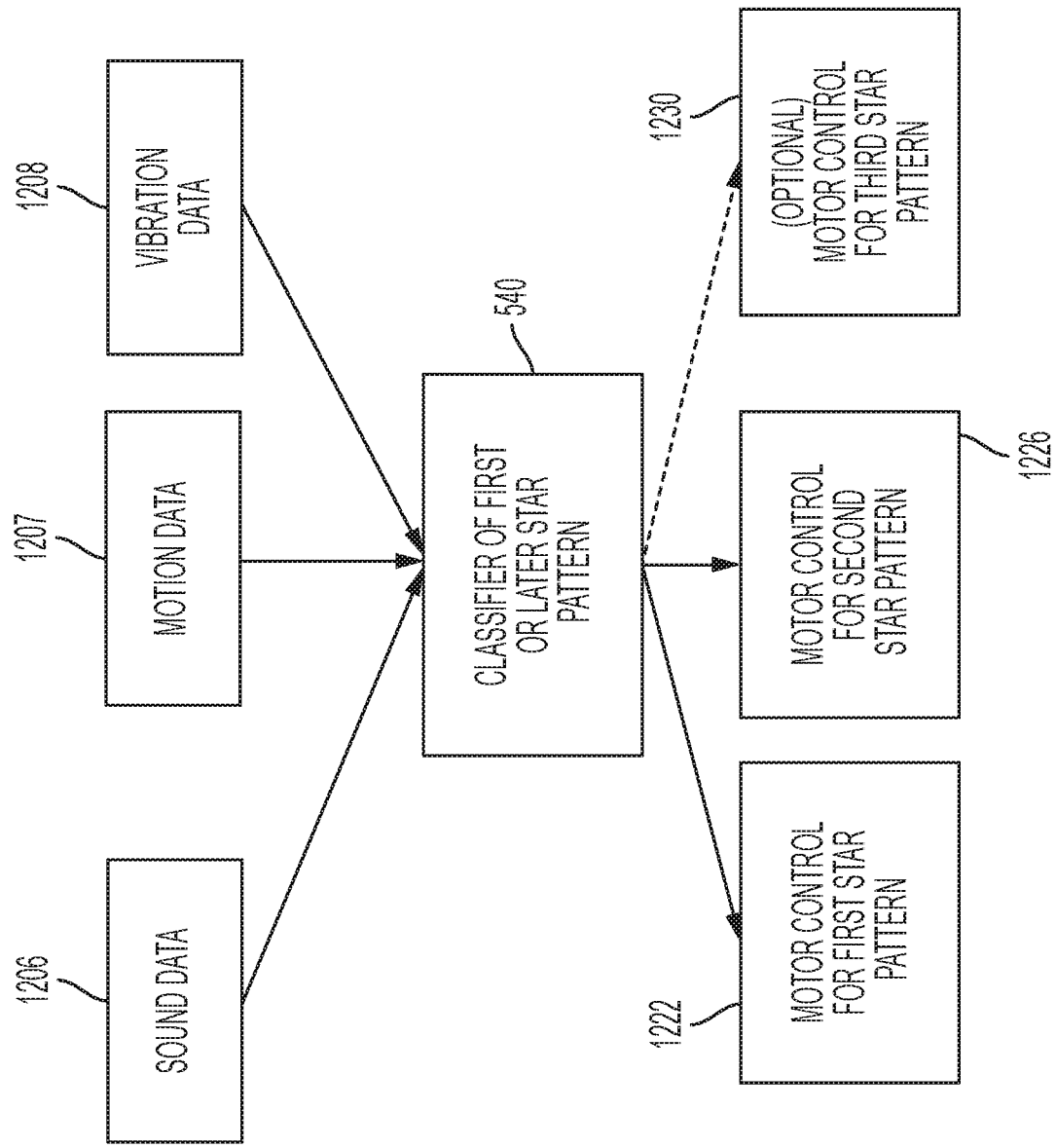
FIG. 18B illustrates a schematic diagram for the implementation of the machine learning controller to identify a lug nut star pattern.

FIG. 18A is a flowchart illustrating another method 1200 in which the machine learning controller 540 identifies a lug nut star pattern when the power tool 500 is used to secure lug nuts. FIG. 18B illustrates a schematic diagram for the implementation of the machine learning controller 540 to identify a lug nut star pattern. In step 1205, the electronic processor 550 receives sensor data. As discussed above, the sensor data is indicative of one or more operational parameters of the power tool and includes, for example, an indication of when an impact occurs (detected with, for example, an impact sensor or sound sensor), the number of impacts delivered by the hammer of the impact driver, the motor speed, the output shaft speed, the output shaft position, the position or movement of the power tool 500 (detected with, for example, an accelerometer or a gyroscope), and the like. In one embodiment, the machine learning controller 540 implements a recurrent neural network to identify the lug nut star pattern. In particular, the machine learning controller 540 implements a long-short-term-memory (LSTM) recurrent neural network. The LSTM recurrent neural network includes parameters that determine which previously received information (or inputs) are to be used to generate the output for the current input, and which previously received information (or inputs) are not to be used or are to be weighted less than other previously received information. A recurrent neural network is particularly useful in identifying the lug nut star pattern because the recurrent neural network can take into account previously generated outputs. For example, if the machine learning controller 540 determines that five lug nuts have been fastened, the machine learning controller 540 is more likely to determine that the sixth lug nut is part of the second star pattern.

The recurrent neural network implemented by the machine learning controller 540 to identify the lug nut star pattern may receive for example, the output signals from the impact sensor for a predetermined duration (e.g., thirty seconds). Based on the pattern generated by the output signals from the impact sensor, the recurrent neural network is able to differentiate between various lug nut star patterns. As shown in FIG. 18B, the training examples for the machine learning controller 540 in this embodiment may include, for example, a thirty second (or different duration) of data from the impact sensor (block 1206), and an indication of the corresponding lug nut star pattern. In the embodiment illustrated in FIG. 18B, the machine learning controller 540 may also include the data from, for example, an accelerometer (block 1207) during the same thirty seconds for which the data from the impact sensor is collected. As shown in FIG. 18B, the machine learning controller 540 may also use the motor control implemented to control the motor during the previous operation (block 1208) to identify the lug nut star pattern. The recurrent neural network is trained similarly to the neural networks described above. That is, the node connections weights of the neural network (and the bias values of the nodes) are changed as more training examples are used. When the neural network is trained, the machine learning controller 540 can receive new input data and generate an output indicative of the lug nut star pattern corresponding to the input data, as described in more detail below.

In step 1210, the electronic processor 550 then sends at least a portion of the sensor data to the machine learning controller 540. As discussed above, the machine learning controller 540 may receive, for example, a thirty second sample of data from an impact sensor of the power tool 500. In the other embodiments, the electronic processor 550 sends the motor speed, the number of impacts delivered by the hammer, the output shaft position and speed information, and information regarding the position of the power tool 500 (e.g., from an accelerometer) to the machine learning controller 540, as well as the motor control used in the last operation. The machine learning controller 540 then identifies and outputs the identified lug nut star pattern (step 1215). The machine learning controller 540 is able to identify the lug nut star pattern due to the combination of the position of the power tool (e.g., based on an accelerometer output from the sensors 530) and the number of impacts delivered on each operation of the power tool 500.

The electronic processor 550 receives the output from the machine learning controller 540 indicating the identified lug nut star pattern, and operates the power tool 500 (i.e., the motor 505) according to the identified lug nut pattern (step 1220). For example, as shown in FIG. 18B, when the machine learning controller 540 determines that the first star pattern is being performed, a first type of motor control (block 1222) is implemented by the electronic processor 550. When, on the other hand, the machine learning controller 540 determines that the second star pattern is being performed (or about to be performed), the electronic processor 550 implements a second type of motor control (block 1226). In some embodiments, as shown in FIG. 18B, the machine learning controller 540 can also differentiate a third star pattern. When the machine learning controller 540 determines that a third star pattern is being performed (or about to be performed), the electronic processor 550 implements a third type of motor control (block 1230). Each type of motor control is different, and each type of motor control is specifically configured to optimize the implementation of its associated star pattern. For example, the first type of motor control may control the motor 505 to operate at a first PWM duty cycle and to stop after ten impacts (impacts may be detected by monitoring current or motor dips and peaks). The second type of motor control may control the motor 505 to operate at a higher PWM duty cycle and to stop after five impacts. Using the recurrent neural network, the electronic processor 550 will continue to operate the motor 505 with the same type of motor control until the machine learning controller 540 determines that the operation has switched to another star pattern (e.g., the second star pattern). For example, the machine learning controller 540 identifies the lug nut pattern while a user is installing a first wheel on a vehicle. The electronic processor 550 then operate the motor 505 to reach the same torque on each lug nut in the same lug nut pattern while the user installs the subsequent wheels on the vehicle. Such an operation by the electronic processor 550 makes it easier for the user to replicate the lug nut pattern on the remaining wheels with less precise user-control of the trigger 510. In some embodiments, a spiking neural network or other types of networks may be used that can process time-varying signals from the impact sensor, the accelerometer, among others.

Figure 19:
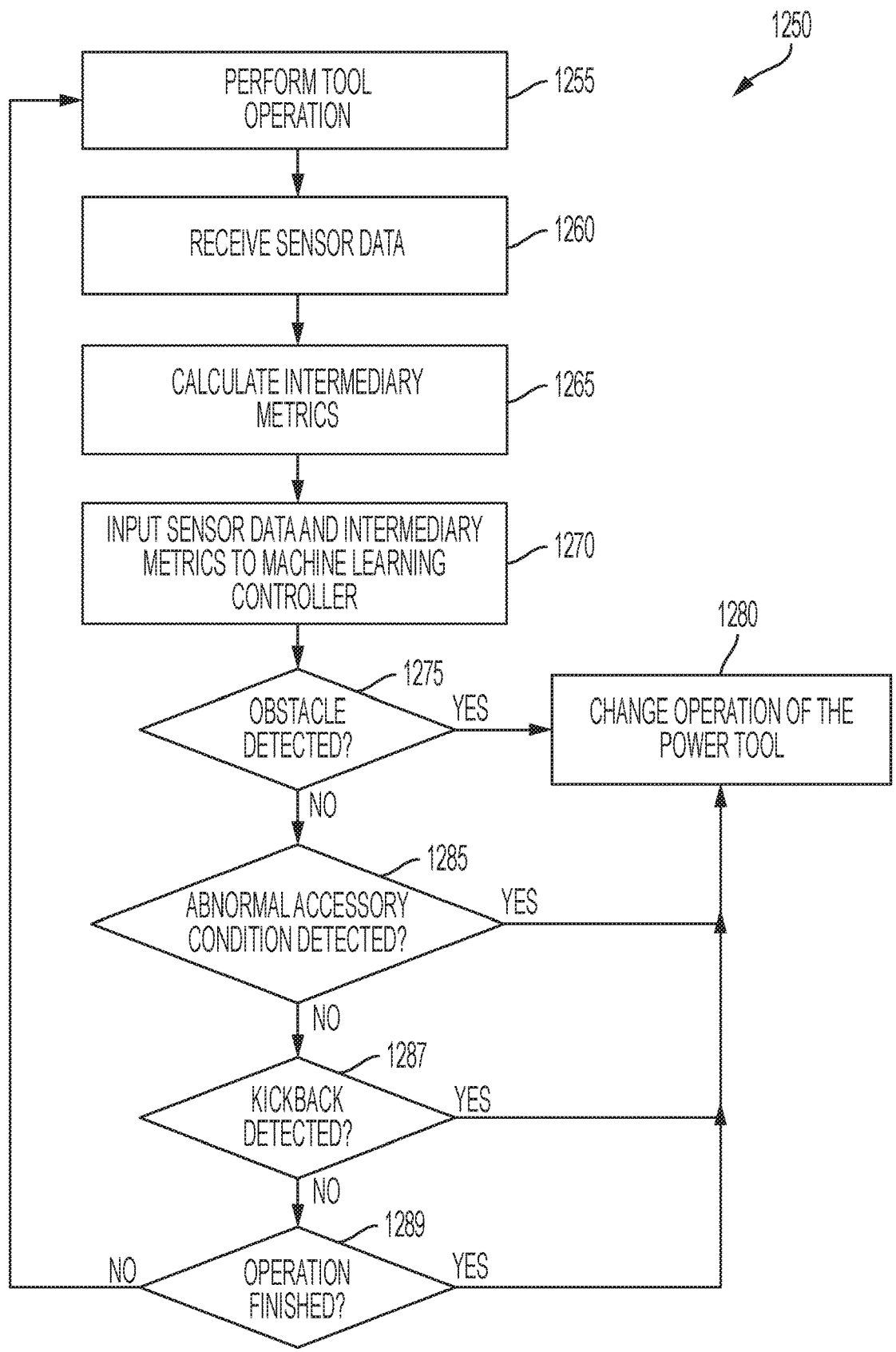
FIG. 19 is a flowchart illustrating a method of using the machine learning controller to detect an abnormal condition of the power tool of FIG. 5A.

FIG. 19 is a flowchart illustrating a method 1250 of using the machine learning controller 540 to identify (or detect) abnormal conditions of the power tool 500. As shown in FIG. 19, at step 1255, the electronic processor 550 performs a power tool operation. The power tool operation may change on each operation of the power tool 500 and may change based on which accessory (e.g., a different type of tool bit) is attached to the power tool 500. For example, in some instances the power tool operation may include attaching a fastener to a workpiece while in other instances, the power tool operation may include removing the fastener from the workpiece. During operation of the power tool 500, the electronic processor 550 receives sensor data, which is indicative of one or more operational parameters of the power tool (step 1260). In the illustrated embodiment, the sensor data includes, for example, the motor speed and position, output shaft speed and position, motor current and voltage, motor temperature, state of charge of the battery pack, position or orientation of the power tool 500, and the like provided by the sensors 530. The electronic processor 550 also calculates intermediary metrics based on the sensor data (step 1265). The intermediary metrics correspond to metrics that may not be directly observed or detected by the sensors 530, but can be calculated based on time or other sensor data. For example, while a sensor may generate an output signal indicating an output torque of the power tool 500, the electronic processor 550 may then calculate a rate of change of the output torque and determine whether the load on the power tool 500 is increasing monotonically, decreasing, or remaining relatively constant.

The electronic processor 550 then transmits at least a portion of the sensor data and the intermediary metrics to the machine learning controller 540 (step 1270). The trained machine learning controller 540 receives the sensor data and the intermediary metrics and detects abnormal conditions based on combinations of the sensor data and the intermediary metrics. The machine learning controller 540 has been trained with a plurality of training examples. Each example corresponds to either one of the abnormal conditions detectable by the machine learning controller 540 or to a normally operating power tool. Each example also includes the sensor data and intermediary metrics. Accordingly, after being trained with a plurality of each of these examples, the machine learning controller 540 becomes able to correctly identify and detect when different abnormal conditions are present. In the illustrated embodiment, the machine learning controller 540 can detect obstacles (e.g., wood knots, screws, nails, and the like) during the operation of the power tool 500, whether the accessory (e.g., a drill bit, a blade, and the like) has been compromised, whether the power tool 500 is experiencing kickback, and whether the operation has been completed. The output from the machine learning controller 540 indicates which, if any, of the above noted abnormal conditions was detected. The machine learning controller 540 transmits its output to the electronic processor 550 such that the electronic processor 550 may change the operation of the power tool 500, if necessary.

In step 1275, the electronic processor 550 determines whether an obstacle is detected by the machine learning controller 540. When the machine learning controller 540 detects an obstacle, the electronic processor 550 changes the operation of the power tool 500 to adapt to the obstacle (step 1280). For example, in some embodiments, when the machine learning controller 540 encounters an obstacle, the electronic processor 550 increases the motor speed such that the obstacle may be overcome by the motor's increasing speed. In some embodiments, for example when the motor 505 is already operating at a maximum speed, the electronic processor 500 may stop the motor 505 to inhibit any damage to the power tool 500 or the motor 505 in particular. When the machine learning controller 540 does not detect an obstacle, the electronic processor 550 determines whether an abnormal accessory condition is detected by the machine learning controller 540 (step 1285). The abnormal accessory condition may correspond to, for example, the stripping of a fastener, overheating of a blade, or another condition that compromises the integrity of the accessory. When the electronic processor 550 determines that an abnormal accessory condition is detected by the machine learning controller, the electronic processor 550 changes operation of the power tool 500 to inhibit further damage to the power tool accessory or to the power tool 500 (step 1280). For example, when the machine learning controller 540 detects that a fastener is stripping, the electronic processor 550 may quickly reduce motor speed, power, or torque to reduce the fastener from further stripping. In another example when the machine learning controller 540 detects that the accessory is hot, the electronic processor 550 stops the motor 505 to allow the tool accessory to cool.

When the electronic processor 550 determines that the machine learning controller 540 does not detect an abnormal accessory condition, the electronic processor 550 determines whether kickback is detected by the machine learning controller 540 (step 1287). Some power tools detect kickback based on a series of rules or thresholds for the motor current and motor voltage. These techniques, however, often generate false positives causing the motor 505 to stop unnecessarily. Kickback is difficult to detect with manually set rules and thresholds because it manifests differently in different operations of the power tool and in different power tools. Using the machine learning controller 540 to detect kickback in a power tool is particularly beneficial because the machine learning controller 540 is trained with thousands (or even more) training examples of different manifestations of kickback in the same type of power tool. Based on the large number of training examples, the machine learning controller 540 provides more accurate kickback detection in power tools than manually set rules or thresholds. When the electronic processor 550 determines that the machine learning controller 540 detects kickback, the electronic processor 550 controls the power switching network 517 to stop the motor 505, or reduce the motor speed to reduce the kickback force (step 1280).

When the electronic processor 550 determines that kickback is not detected, the electronic processor 550 proceeds to determine whether machine learning controller 540 indicates that the power tool 500 has finished an operation (step 1289). In some embodiments, the machine learning controller 540 determines that an operation is finished when, for example, the machine learning controller 540 detects that a power tool accessory is through the workpiece or a fastener is seated in a workpiece. When the electronic processor 550 determines that the power tool has completed an operation, the electronic processor 550 changes the operation of the power tool 500 (step 1280) to stop the motor 505. On the other hand, when the electronic processor 550 determines that none of these abnormal conditions are detected by the machine learning controller 540, the electronic processor 550 continues to operate the motor 505 according to the selected operating mode for the power tool 500 while the machine learning controller 540 continues to receive the sensor data and the intermediary metrics to detect abnormal conditions of the power tool 500.

Figure 20:
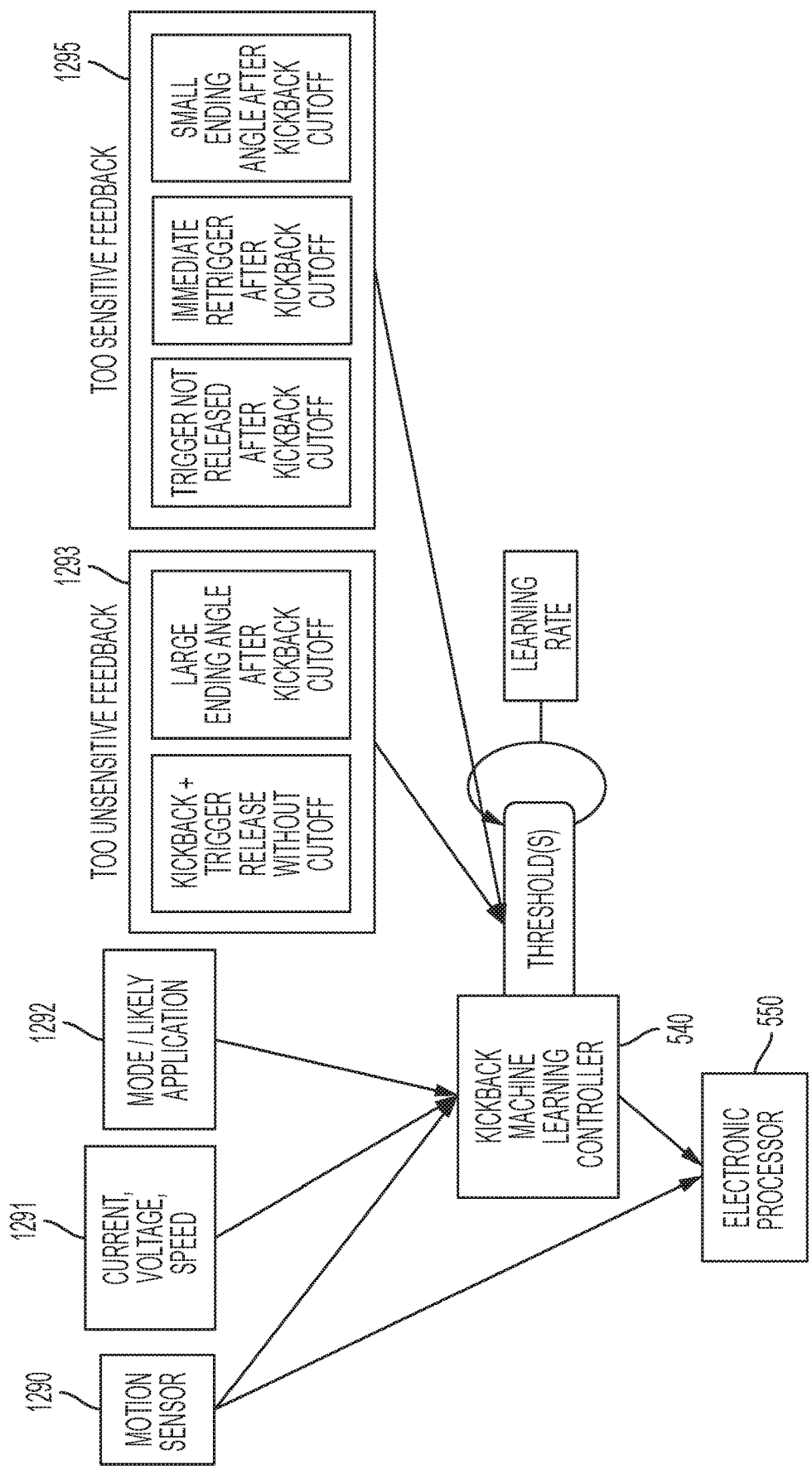
FIG. 20 illustrates a schematic diagram for the implementation of the machine learning controller to detect kickback.

FIG. 19 describes the machine learning controller 540 being able to detect different types of abnormal conditions or tool behaviors. In some embodiments, the machine learning controller 540 implements more than one machine learning control. For example, in some embodiments, the machine learning controller 540 implements a first machine learning control to detect kickback, a second machine learning control to detect an abnormal accessory condition, and a third machine learning control to detect whether there is an obstacle. FIG. 20 illustrates a schematic diagram for the implementation of the machine learning controller 540 to detect kickback. As shown in FIG. 20, the machine learning controller 540 receives sensor signals (e.g., as described above with respect to step 1260) indicating, for example, movement of the power tool (block 1290), motor parameters such as motor current, motor voltage, motor speed, and the like (block 1291), a selected mode of operation or a likely application of the power tool 500 (block 1292). The machine learning controller 540 then uses these sensor signals to detect or predict when kickback is occurring. As discussed above, the machine learning controller 540 may implement a neural network (e.g., a feed-forward neural network, a recurrent neural network, and the like) to detect when kickback is occurring. In the illustrated embodiment, the machine learning controller 540 generates and/or utilizes various thresholds to detect when kickback is occurring. For example, when the current consistently increases by more than a predetermined amount, the machine learning controller 540 may be more likely to detect kickback.

During the operation of the power tool 500, the machine learning controller 540 controls the electronic processor 550 to shut down the motor when the machine learning controller 540 detects that kickback is occurring. The user can provide feedback to the machine learning controller 540 regarding how accurately the machine learning controller 540 detects feedback. For example, as shown in FIG. 20, the machine learning controller 540 may receive a first type of negative feedback (block 1293) indicating that the machine learning controller 540 is not detecting all instances of kickback or is not detecting kickback early enough. The machine learning controller 540 also receives a second type of negative feedback (block 1295) indicating that the machine learning controller is overly sensitive in detecting kickback. For example, a user can provide feedback to the machine learning controller 540 by, for example, abruptly releasing the trigger. The machine learning controller 540 may detect the release of the trigger as negative feedback when, for example, kickback is detected soon after the release of the trigger. Such a release of the trigger may indicate that the user felt uncomfortable operating the power tool 500 and released the trigger due to kickback before the motor 505 was shut off by the machine learning controller 540. The machine learning controller 540 may also receive negative feedback when the machine learning controller 540 detects a large ending angle soon after the motor 505 was deactivated due to the machine learning controller 540 detecting kickback. A large ending angle may indicate that the movement of the tool during kickback may have caused a greater angle than normal to be delivered by the output shaft. Accordingly, both of these sequences of events indicate to the machine learning controller 540 that kickback was not detected fast enough.

In another example, the machine learning controller 540 also receives negative feedback when the user continues to press the trigger even after the motor 505 has been deactivated because kickback. Such a continued activation of the trigger may indicate, for example, that the motor 505 was prematurely deactivated by the machine learning controller 540 because, for example, the amount of kickback generated by the power tool 500 was tolerable or there was no kickback at all. Similarly, the machine learning controller 540 receives negative feedback when a user presses the trigger immediately (e.g., within 0.5 seconds or within 1.0 second) after the motor 505 has been interrupted due to kickback being detected. The user's quick press of the trigger may indicate a desire for the power tool 500 to operate and may indicate the lack of kickback. Additionally, the machine learning controller 540 may also receive negative feedback when the machine learning controller 540 detects a small ending angle (e.g., below a threshold) after the motor 505 has been deactivated. A small ending angle may be indicative of a lack of force and may therefore indicate that no kickback was present. The machine learning controller 540 may be configured to interpret other sequences of events as negative feedback. The machine learning controller 540 may also receive positive feedback when, for example, the motor 505 does not become deactivated and the motor 505 returns to a neutral ("home") position with a minimal angular rotation.

The machine learning controller 540 may adjust the thresholds generated or used by the machine learning controller 540 in response to the received feedback, or may adjust the machine learning control 585 itself. For example, the machine learning controller may decrease some of the thresholds currently used to detect kickback when the machine learning controller 540 receives the first type of feedback. Decreasing the thresholds may cause the machine learning controller 540 to be more sensitive to kickback and detect kickback faster. On the other hand, the machine learning controller 540 may increase some of the thresholds currently used to detect kickback when the machine learning controller 540 receives the second type of feedback. Increasing the thresholds may cause a delay in the detection of kickback in the power tool 500. In other embodiments, the feedback does not directly change the thresholds generated or used by the machine learning controller 540, but allows the machine learning control to be retrained based on the feedback received. As discussed above, the learning rate may affect both how the new information with feedback is used to retrain the machine learning control and how the feedback is used to more directly adjust the thresholds generated or used by the machine learning controller 540.

FIGS. 19 and 20 illustrate how the machine learning controller 540 can detect various abnormal conditions. Other than the abnormal conditions explicitly discussed above with respect to FIG. 19, the machine learning controller 540 may be able to detect, for example, a broken bit, binding, accessory state, chuck use, chuck loosening, likely material, likely application, likely accessory, mechanical or electrical malfunction, an accessory being through the material, encountering a knot, burr, or other obstacle, temperature outside of temperature ranges, among others.

Figure 21:
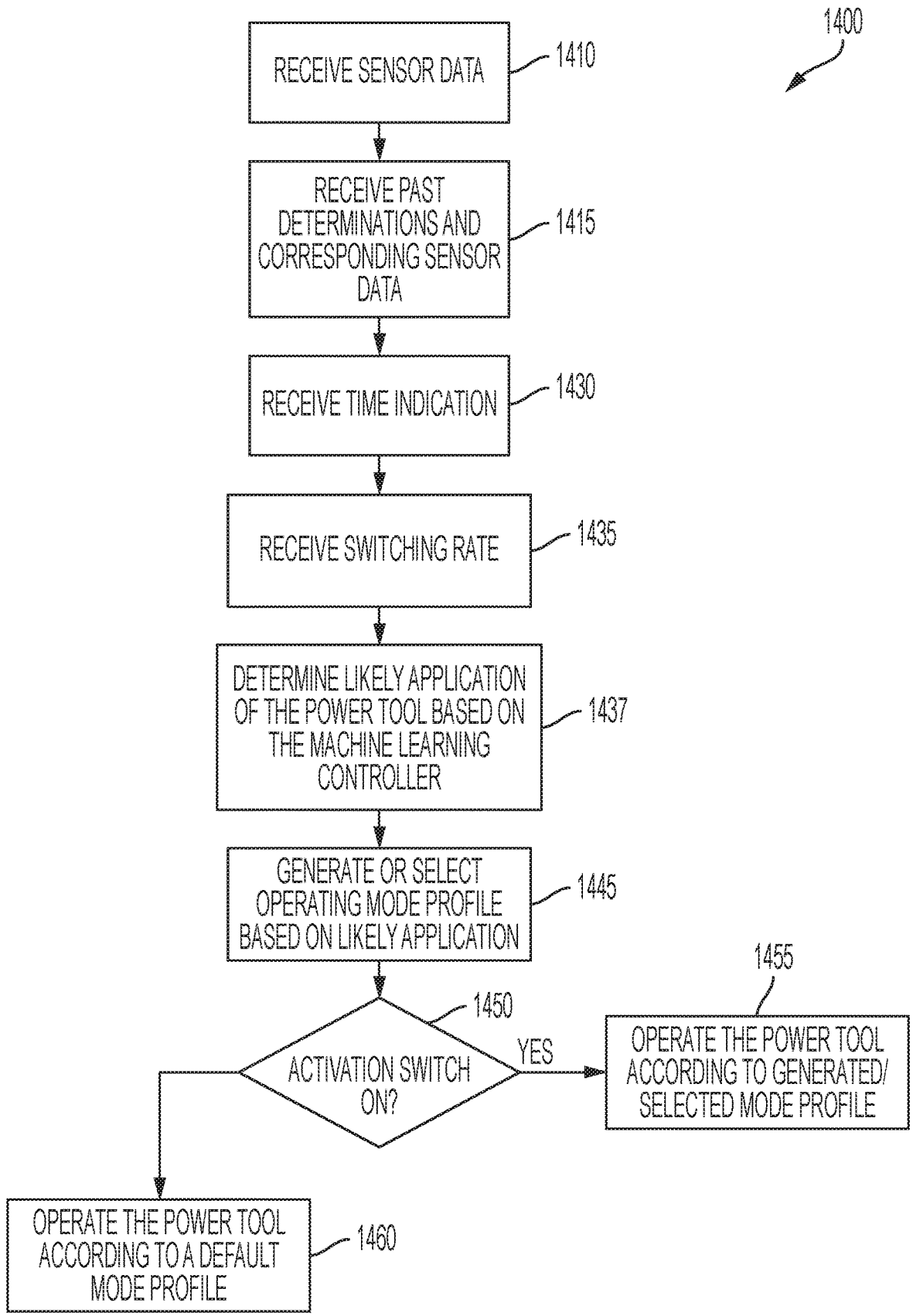
FIG. 21 is a flowchart illustrating a method of using the machine learning controller to automatically identify the application of the power tool and generate or select an operating mode profile.
Figure 22:
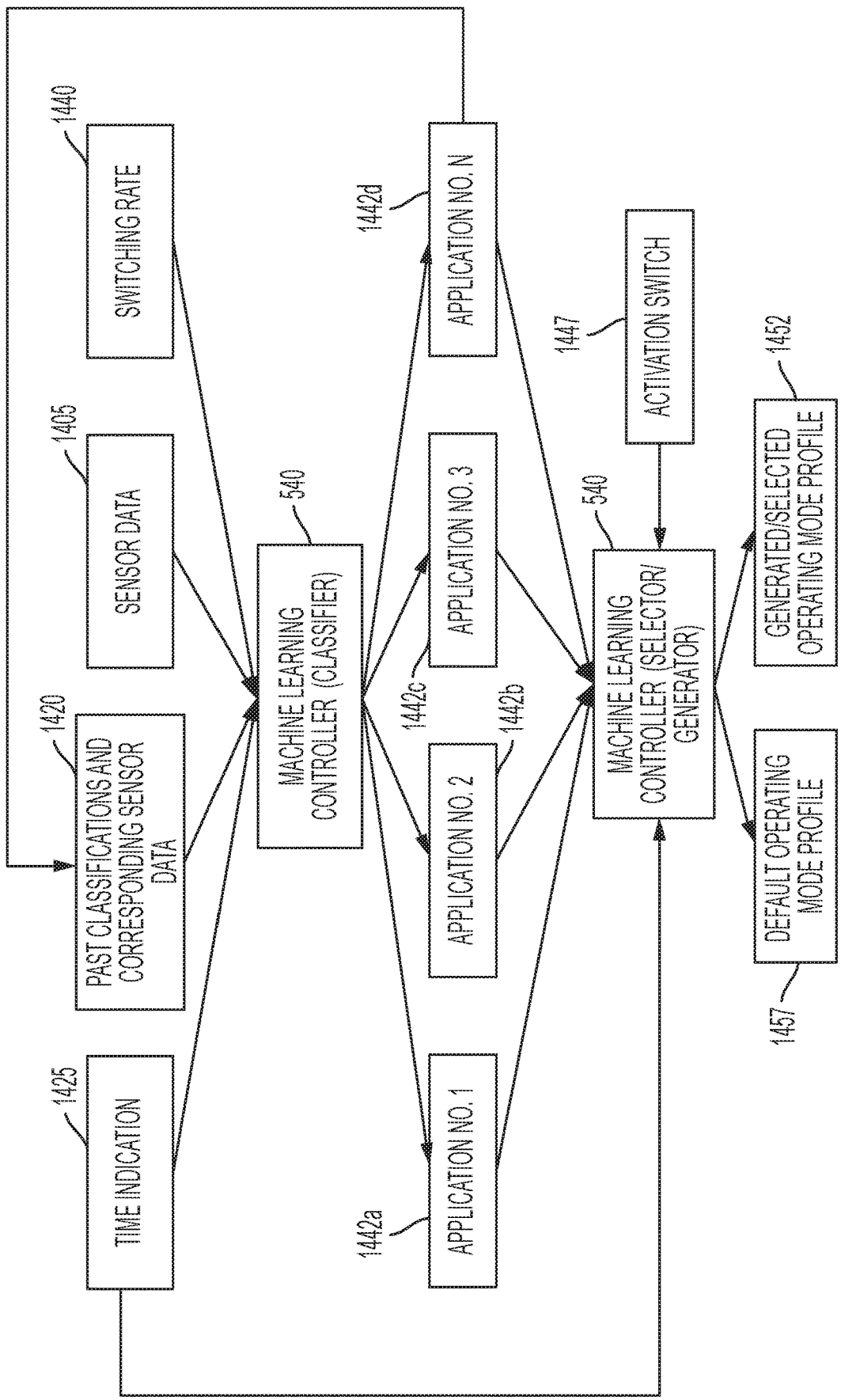
FIG. 22 is a schematic diagram for the implementation of a gated architecture of the machine learning controller that automatically identifies the application of the power tool.

FIG. 21 is a flowchart illustrating a method 1400 of using the machine learning controller 540 to automatically identify the application of the power tool 500 and generate or select an adequate operating mode profile to optimize the operation of the power tool 500 for that particular application. FIG. 22 is a schematic diagram for the implementation of a gated architecture of the machine learning controller 540 that automatically identifies the application of the power tool 500. In the embodiment illustrated in FIGS. 21 and 22, the machine learning controller 540 implements a recurrent neural network, although other machine learning techniques may be used in other embodiments. During an operation of the power tool 500, the electronic processor 550 receives sensor output signals as sensor data. As described above, the sensor data may include a variety of power tool information such as, for example, motor speed, motor current, motor position, state of charge of the battery, output shaft speed, rotation or movement of the power tool 500 itself, and the like. The electronic processor 550 sends at least some of the sensor data (see block 1405 in FIG. 21) to the machine learning controller 540 to use the sensor data to determine a current application for which the power tool 500 is used. In step 1410, the machine learning controller 540 receives at least some of the sensor data from the electronic processor 550, which is indicative of one or more operational parameters of the power tool. As discussed above with respect to, for example, FIG. 16, the electronic processor 550 may also calculate intermediary measurements that are then transmitted to the machine learning controller 540 as sensor data. Because the machine learning controller 540 implements a recurrent neural network, in step 1415, the machine learning controller 540 also receives information regarding previous determinations from the machine learning controller 540 as well as the sensor data corresponding to the previous determinations (see block 1420 in FIG. 22). Additionally, the machine learning controller 540 receives a time indication (see block 1425 in FIG. 22) in step 1430. The time indication may include an elapsed time since the power tool 500 has been in operation, an elapsed time since the last operation of the power tool 500, the current time, an elapsed time or remaining time before a security lock of the power tool 500, or the like. The elapsed time may provide the machine learning controller 540 with an indication of how relevant the previous classifications or determinations may be for the current set of sensor data.

Additionally, in step 1435, the machine learning controller 540 receives a switching rate (see block 1440 in FIG. 22). As discussed briefly above, the switching rate controls a weight associated with the past classifications or determinations made by the machine learning controller 540. Effectively, the switching rate affects how fast the output generated by the machine learning controller 540 will change based on new input data. For example, if the machine learning controller 540 has indicated that the last ten input sets have corresponded to a first application of the power tool 500 (e.g., one operating mode), the machine learning controller 540 may still determine that the eleventh input set corresponds to the first application of the power tool 500 even if the sensor data may be slightly different than expected for the first application of the power tool 500. When the switching rate is low, the machine learning controller 540 waits for a greater number of new input sets with different sensor data (e.g., sensor data more likely to correspond to another application of the power tool 500) before outputting a different application of the power tool 500. On the other hand, when the switching rate is high, a fewer number of input sets with different sensor data are necessary for the machine learning controller 540 to output a different application of the power tool 500. As discussed above, in some embodiments, a user may select a relative switching rate for the machine learning controller 540. For example, the machine learning controller 540 may receive a user input requesting an increase to the switching rate before the user switches from one type of use of the power tool 500 to another (e.g., from fastening wood screws to drilling a hole). The machine learning controller 540 will then rely less heavily on prior operations and more quickly adapt than if the switching rate had been maintained at the same level.

The application of the power tool 500 refers to the specific use of the power tool 500. For example, a drill may be used in some environments to fasten wood screws, in another environment, the same drill may be used to fasten drywall screws, and in yet another environment, the same drill may be used to create a hole (e.g., for a door handle). While the drill may operate in a default operating mode and use standard (e.g., default) thresholds regarding motor current, ramp (e.g., how fast the motor achieves its target speed), kickback thresholds, some applications (or uses) of the power tool 500 may benefit from using distinct thresholds. In the embodiment illustrated in FIG. 22, the machine learning controller 540 analyzes the sensor data, the past classifications or determinations for previous input sets, and the time indication, and, using the switching rate, generates an automatic determination of the most likely application of the power tool 500 (step 1437). In some embodiments, the machine learning controller 540 only selects the most likely application 1442a-d of the power tool 500 based on the sensor data and the previous classifications. For example, the machine learning controller 540 may determine that the power tool 500 is most likely fastening a self-drilling screw. In some embodiments, the machine learning controller 540 outputs multiple applications that are likely to correspond to the current use of the power tool 500. For example, the machine learning controller 540 may indicate that based on the sensor data, the previous classifications, and the time indication, there is approximately a 60% likelihood that the power tool 500 is currently being used to fasten a self-drilling screw, but there is also a 40% likelihood that the power tool 500 is currently being used to fasten a sheet metal screw. In some embodiments, the machine learning controller 540 does not assign specific percentages to the likely applications.

The machine learning controller 540 then, in step 1445, generates or selects an operating mode profile based on the determination of the most likely application of the power tool 500. In some embodiments, the memory 580 includes a database storing a plurality of operating mode profiles. Each operating mode profile includes various parameters and thresholds used to control the power tool 500. Each operating mode profile can be optimized for different applications or uses of the power tool 500. In such embodiments, the machine learning controller 540 may determine the most likely application of the power tool 500, select a corresponding operating mode profile from the database, and communicate with the electronic processor 550 to control the motor 15 according to the selected operating mode profile.

In other embodiments, the machine learning controller 540 generates an adequate operating mode profile based on, for example, multiple likely applications for the power tool 500. For example, when the machine learning controller 540 determines that the current use of the power tool 500 is likely to be one of two or three different applications, the machine learning controller 540 can combine the two or three operating mode profiles, each corresponding to the likely two or three applications. In one example, the machine learning controller 540 determines that there is a 60% likelihood that the current application includes fastening a self-drilling screw, and there is a 40% likelihood that the current application includes fastening a sheet metal screw. In such an example, the machine learning controller 540 may combine the operating mode profile for a self-drilling screw and the operating mode profile of a sheet metal screw. In one example, the machine learning controller 540 may generate a new operating mode profile including the ramp parameters of the self-drilling screw since the application is most likely to correspond to a fastening of a self-drilling screw. The machine learning controller 540, however, may utilize the kickback detection algorithm and thresholds associated with the sheet metal screw since the kickback detection used during fastening of the sheet metal screw is more sensitive than the kickback detection used when fastening a self-drilling screw. Accordingly, in some embodiments, the machine learning controller 540 can generate a new operating mode profile by combining aspects of more than one operating mode profile based on the uses of the power tool 500 that are most likely to correspond to the current use of the power tool 500.

In some embodiments, the power tool 500 also includes an activation switch 1447 for determining whether the machine learning controller 540 is to control the operation of the motor 505. In step 1450, the machine learning controller 540 determines whether the activation switch is in the on state. When the activation switch is in the on state, the machine learning controller 540 uses the generated or selected operating mode profile 1452 to control the motor 505 (step 1455). On the other hand, when the activation switch is in the off state, the machine learning controller 540 uses the default profile 1457 to operate the motor 505 (step 1460). The electronic processor 550 then operates the power tool 500 (e.g., the motor 505) according to either the default operating mode profile or a selected or generated operating mode profile. In other embodiments, step 1450 is bypassed and the machine learning controller 540 proceeds to step 1460.

FIGS. 13-22 (and FIGS. 27-28 below) describe various implementations of the machine learning controller 540 (e.g., where the machine learning controller 540 is associated with different tasks). In each of the example uses of FIGS. 13-22 and 27-28, the power tool 500 may provide feedback as discussed above with respect to step 625 of FIG. 6. When the machine learning controller 540 receives positive or negative feedback from the power tool 500, the machine learning controller 540 re-trains the machine learning control 585, and then proceeds to implementing the re-trained machine learning control 585. For example, with reference to FIGS. 13 and 14, a feedback indication from the power tool 500 may indicate that the fastener was identified incorrectly, and may, in some embodiments, include the correct type of fastener. The machine learning controller of FIG. 13 would then re-train the machine learning control 585 using the input data and the correct type of fastener. In some embodiments, the machine learning control 585 may be adjusted, but not necessarily re-trained, based on the feedback received regarding the operation of the power tool 500. For example, in some embodiments, the machine learning controller 540 utilizes the feedback to immediately correct an aspect of the operation of the power tool 500 (e.g., increases the motor speed during the operation of the power tool 500). Similarly, the machine learning control 585 may change an output (e.g., classifications) based on feedback, without retraining. With respect to FIGS. 16 and 17, the machine learning controller 540 may receive an indication that more power was requested by the user during the fastening operation, indicating that the estimated torque output was lower than the actual torque output. The machine learning controller 540 of FIG. 16 may then re-train the machine learning control 585 based on the received input signals and the received feedback, and also provide more power to the current operation of the power tool 500. Similar feedback indications may be received with respect to FIGS. 18-22. For example, the machine learning controller 540 may receive an indication that the lug nut star pattern was incorrectly identified and may, in some embodiments, include the correct identification for the lug nut star pattern. On the other hand, the machine learning controller 540 may receive an indication that a detected abnormal condition (e.g., abnormal accessory condition) was not actually present. Accordingly, the more the machine learning controller 540 is implemented, the more accurate its determinations and estimations can become.

Figure 23:
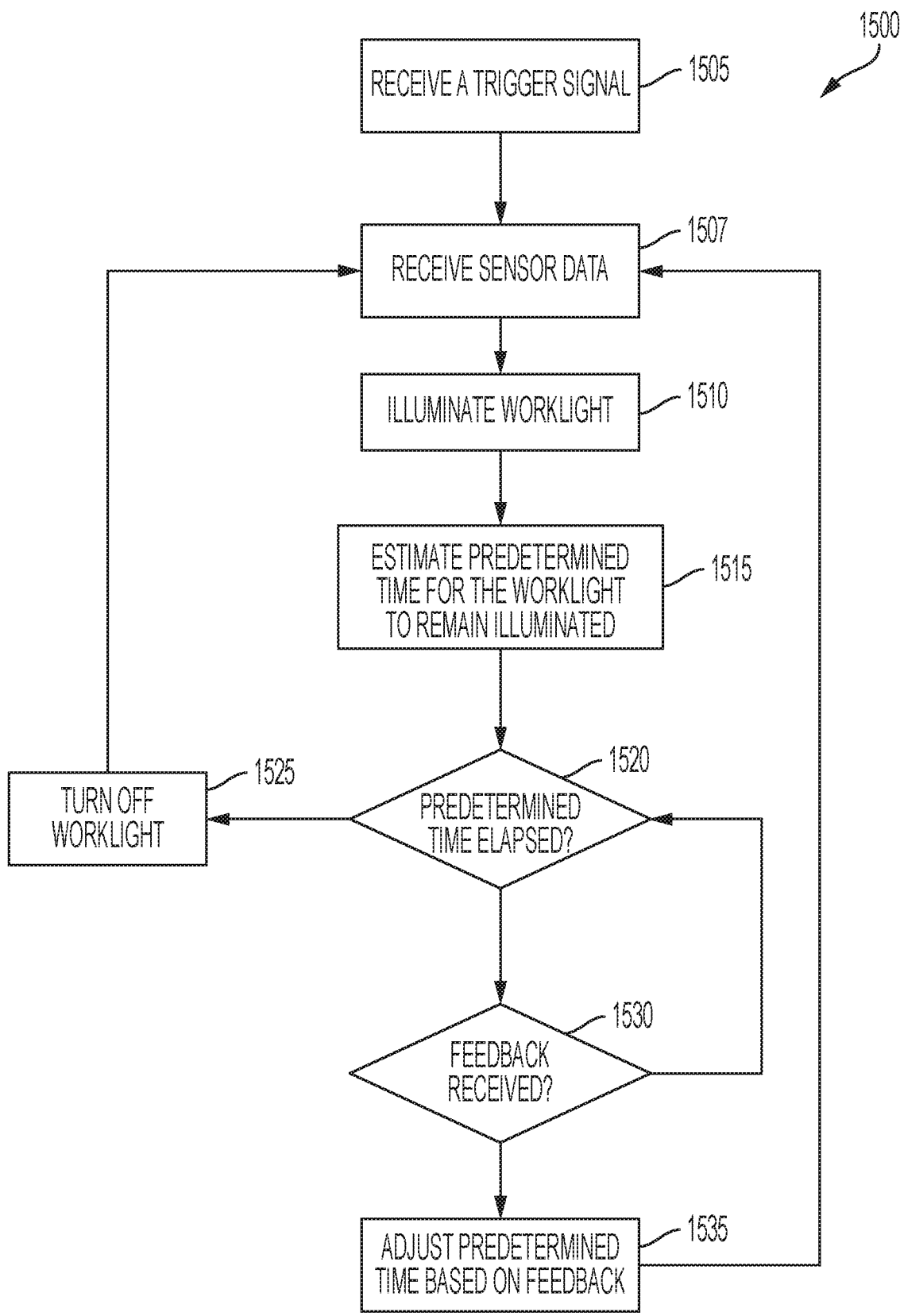
FIG. 23 is a flowchart of a method 1500 of estimating a worklight activation duration.
Figure 24:
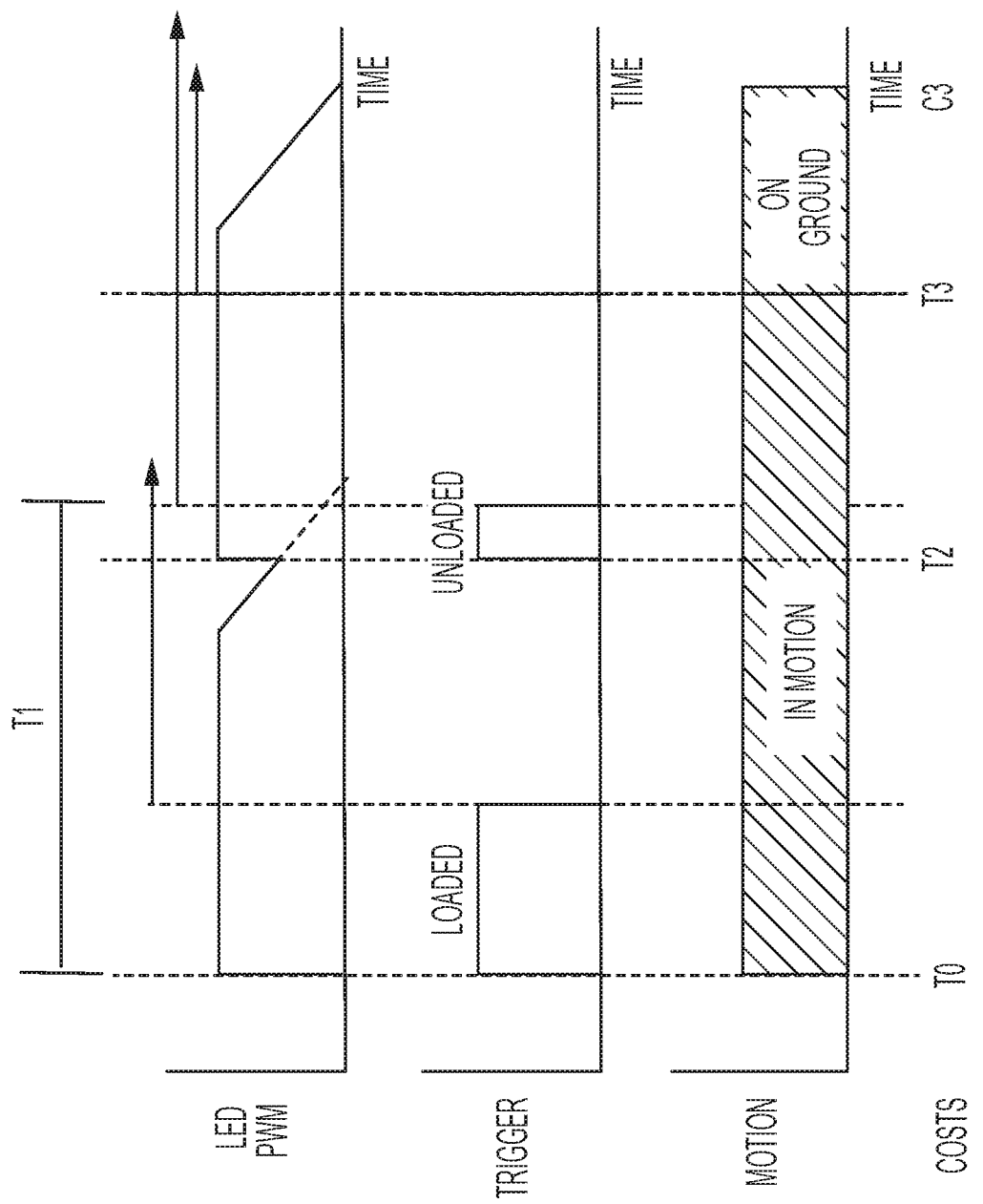
FIG. 24 is an example timing diagram illustrating an example operation of the worklight according to the flowchart of FIG. 23.

FIG. 23 is a flowchart of a method 1500 of estimating a worklight activation duration. FIG. 24 is an example timing diagram illustrating an example operation of the worklight according to method 1500. In some instances, a worklight 1502 on a power tool (see, e.g., FIGS. 5A and 4C) is illuminated while the power tool is in operation and for a predetermined amount of time after the operation of the power tool has stopped. For example, the worklight turns on when a user begins to fasten a screw and remains on for approximately thirty seconds after the user releases the trigger upon completing fastening of the screw. FIGS. 23 and 24 illustrate an implementation in which the machine learning controller 540 determines how long the worklight remains illuminated after the operation of the power tool 500 is finished. In step 1505, the electronic processor 550 receives a trigger signal. In response to receiving the trigger signal, the machine learning controller 540 also begins to receive sensor data (step 1507). As discussed above, the sensor data is indicative of one or more operational parameters of the power tool. In the illustrated embodiment, the sensor data includes information regarding the motion of the power tool 500, which may be obtained, for example, via an accelerometer, gyroscope, or other motion sensor. The trigger signal indicates a start of the motor operation.

In response to receiving the trigger signal, the electronic processor 550 also illuminates the worklight (step 1510). As shown in the timing diagram of FIG. 24, at time T0 the electronic processor 550 receives the trigger signal, operates the motor 505 of the power tool 500, and illuminates the worklight. As also shown in FIG. 24, the worklight typically remains illuminated for a predetermined amount of time T1. In the illustrated embodiment, the intensity of the worklight begins to decrease such that the worklight is entirely off when T1 elapses. Referring back to FIG. 23, the machine learning controller 540 estimates the predetermined amount of time for the worklight to remain illuminated (step 1515). In one embodiment, the machine learning controller 540 may use a regression algorithm in which a cost function associated with the predetermined amount of time increases as the predetermined amount of time increases. Such an increasing cost function helps the machine learning controller 540 determine, for example, the smallest predetermined amount of time that satisfies the user and his/her needs. The regression algorithm may also take other aspects of the operation of the power tool 500 into consideration when estimating the predetermined time. For example, the machine learning controller 540 may determine the predetermined time based on, for example, how long the trigger remains depressed, characteristic load during a trigger pull or operation of the power tool 500, elapsed time since the last trigger pull, orientation of the power tool 500 (e.g., whether the power tool 500 is facing a workpiece or the ground, among other orientations).

The electronic processor 550 then determines whether the predetermined time has elapsed (step 1520). When the predetermined time elapses, the electronic processor 550 turns off the worklight (step 1525). When the predetermined time has not yet elapsed, the machine learning controller 540 determines whether any feedback has been received regarding the operation of the worklight (step 1530). The feedback may include, for example, depressing the trigger while the power tool 500 is unloaded. Such an action may indicate that the worklight is to continue to be illuminated. Other types of feedback may also be included such as, for example, moving the power tool 500, setting the power tool 500 on the ground or another flat surface (e.g., which may be indicated by sensor data from the motion sensor). In some embodiments, the machine learning controller 540 may receive feedback via additional sensors in the power tool 500. When no feedback is received, the electronic processor 550 continues to monitor whether the predetermined time has elapsed to turn off the worklight. On the other hand, when feedback is received by the electronic processor 550 and the machine learning controller 540, the machine learning controller 540 adjusts the predetermined time previously calculated based on the received feedback (step 1535). For example, in the example of FIG. 24, the machine learning controller 540 receives a second trigger signal at time T2. In some embodiments, any activation of the trigger restarts the predetermined time T1. At time T2, however, the power tool 500 is unloaded. Accordingly, in some embodiments, the machine learning controller 540 estimates a different predetermined time for the second trigger pull since the load conditions on the power tool 500 are different. In the example of FIG. 24, at time T3, the power tool 500 is placed on the ground. Placing the power tool 500 on the ground may indicate that the power tool 500 is no longer needed and may initiate an early decrease in the intensity of the worklight. Over time, the machine learning controller 540 may be able to more accurately predict how long the user desires the worklight to remain illuminated after completion of an operation. As with other implementations of the machine learning controller 540, the learning rate affects how quickly the machine learning controller 540 can incorporate some of the feedback received from the user. Accordingly, the machine learning controller 540 may learn how long to keep the worklight illuminated under different circumstances and for different users.

In some embodiments, the power tool 500 includes a saw. In such embodiments, the machine learning controller 540 may have more specific implementations than, for example, the implementations discussed above with respect to FIGS. 12-24. For example, the machine learning controller 540, when implemented on a saw, may be able to detect and respond to binding of the saw and to identifying the work material. In some embodiments, the machine learning controller 540 may use vibration or sound signals to detect the work material of the saw (e.g. step 710). In some embodiments, after identifying the work material for the saw, the machine learning controller 540 generates or selects (e.g. step 720) a specific operating mode profile (e.g., specifying a particular motor speed) to most efficiently cut the identified work material. As discussed above with respect to FIGS. 12-24, other sensor information and feedback information may be used to help the machine learning controller 540 identify the work material, detect an abnormal condition (e.g., binding), and the like.

Figure 25:
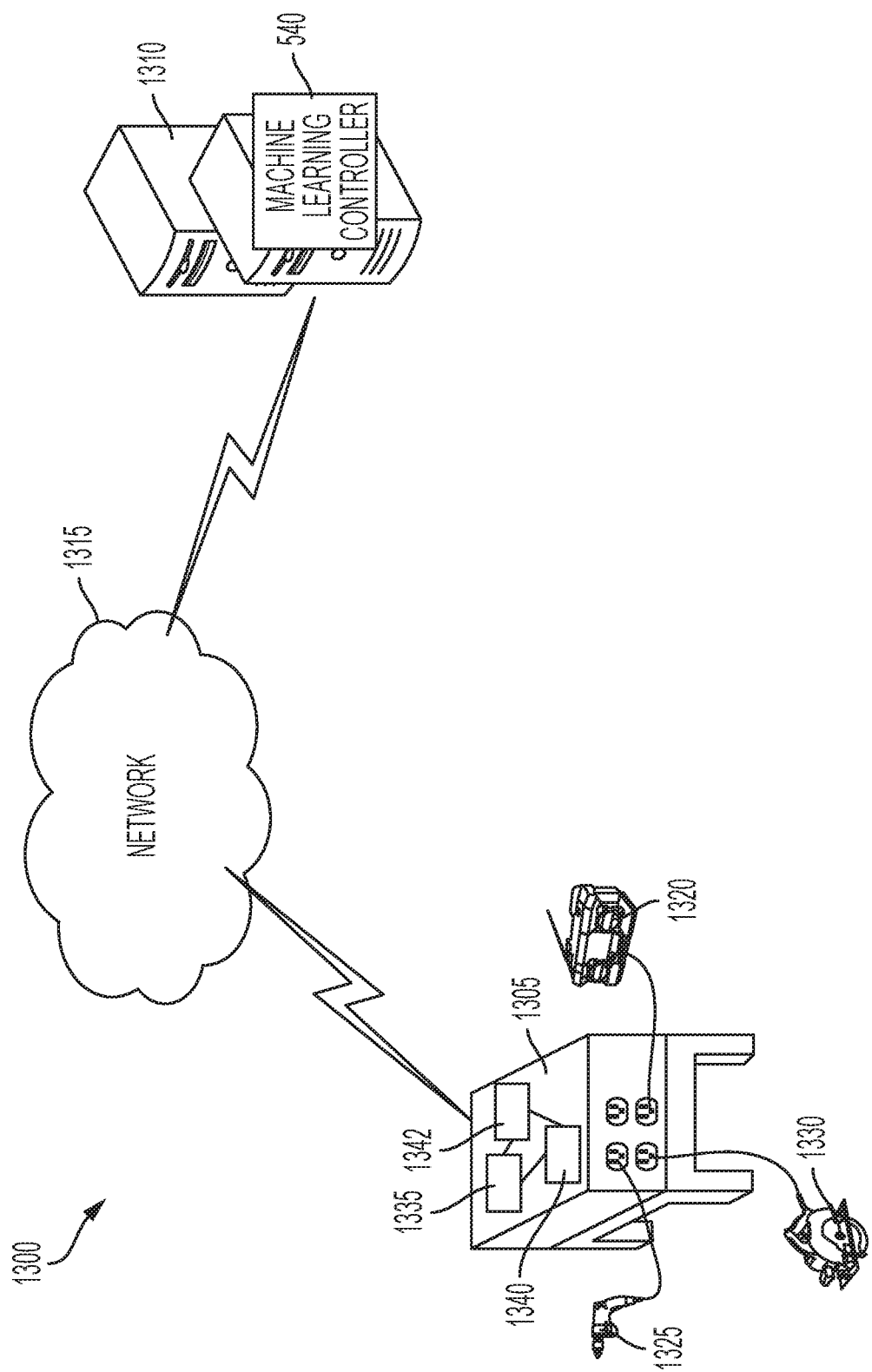
FIG. 25 is a diagram of a power system.

FIG. 25 is a diagram of a power system 1300. The power system 1300 includes a power box 1305 and a server 1310. The power box 1305 communicates with the server 1310 over the network 1315. As discussed above with the power tool systems of FIGS. 1-4A, in some embodiments, an external device 107 may bridge the communication between the power box 1305 and the server 1310. The external device 107 may, for example, communicate directly with the power box 1305 via a Bluetooth® connection and communicate with the server 1310 via the network 1315. The power box 1305 receives power from an external source such as, for example, an AC source, a generator, a battery, or the like. The power box 1305 then distributes the received power to power tools that are connected to the power box 1305. As shown in FIG. 25, the power box 1305 may be connected to a plurality of different power tools 1320, 1325, 1330. In the illustrated embodiment, the power box 1305 is connected to a portable radio 1320, a power drill 1325, and a saw 1330. The power box 1305 also includes an electronic processor 1335 (similar to electronic processor 550 of FIG. 5), a plurality of sensors 1340, and a wireless communication device 1342. The sensors 1340 may be coupled to, for example, each of the power outputs of the power box 1305 to detect various power characteristics of each power output of the power box 1305. For example, the sensors 1340 include current sensors, voltage sensors, a real time clock, and the like.

The sensors 1340 transmit output signals indicative of sensed characteristics to the electronic processor 1335 of the power box 1305. The electronic processor 1335 transmits at least a portion of the sensor output signals to the server 1310 via, for example, a transceiver of the wireless communication device 1342. The server 1310 includes the machine learning controller 540. In the illustrated embodiment, the machine learning controller 540 is configured to analyze the sensor output signals from the power box 1305. In some embodiments, the power box 1305 includes the machine learning controller 540. In such embodiments, the power box 1305 may communicate the determinations from the machine learning controller 540 to the server 1310 (or to an external device 107) to provide a graphical user interface to illustrate the analysis of the sensor output signals.

In one embodiment, the machine learning controller 540 of FIG. 25 implements a clustering algorithm that identifies different types of power tools connected to the power box 1305. In one example, the machine learning controller 540 implements an iterative K-means clustering machine learning control. The clustering algorithm is an unsupervised machine learning algorithm and instead of using training data to train the machine learning control 585, the machine learning controller 540 analyzes all the data available and provides information (e.g., the type of power tools connected to the power box 1305). Each data point received by the machine learning controller 540 of FIG. 26 includes an indication of the used power (e.g., median Watts) provided to a specific power output of the power box 1305, the corresponding usage time (e.g., the time for which power was provided) of the same power output of the power box 1305, and a label indicating the type of power tool. The machine learning controller 540 receives the input data (e.g., various points corresponding to a usage power value and a usage time value). The machine learning controller 540 then plots the input data and assigns each data point to a random cluster. The machine learning controller 540 then computes the centroid for each cluster (i.e., the arithmetic mean position of all the points in the cluster). The machine learning controller 540 then reassigns each data point to the closest centroid. The machine learning controller 540 continues to calculate centroids and reassign data points until a clustering condition is met. In the example of the power box 1305, the machine learning controller 540 may separate the input data into three separate clusters, one cluster for each type of power tool used with the power box 1305. As discussed above, the number of clusters may be changed and set, and provided to the machine learning controller 540. The clustering condition may include, for example, when two successive recalculations of the centroid do not cause any of the points to be reassigned. In some embodiments, the clustering condition may be different. When new input data is received (e.g., new sensor data for a power output of the power box 1305), the machine learning controller 540 repeats the process described above. In such embodiment, the machine learning controller 540 may assign the data points to the current clusters when a new set of input data is received. Finding the appropriate cluster for the new set of input data is expected to be faster since the other data points have already been clustered and not many re-assignments are expected. The machine learning controller 540 then associates a cluster label to each data point. That is, each data point is associated with a particular cluster.

In another embodiment, the machine learning controller 540 implements, for example, a hierarchical clustering algorithm. In such an example, the machine learning controller 540 starts by assigning each data point to a separate cluster. The machine learning controller 540 then gradually combines data points into a smaller set of clusters based on a distance between two data points. The distance may refer to, for example, a Euclidean distance, a squared Euclidean distance, a Manhattan distance, a maximum distance, and Mahalanobis distance, among others. In some embodiments, the machine learning controller 540 builds a dendrogram to illustrate the clustering processor of the machine learning controller 540. The dendrogram illustrates the combination of different data points into the same cluster. The optimum number of clusters for the training data set may be determined by, for example, the number of vertical lines that are traversed by a horizontal line on the dendrogram for a maximum vertical distance. Similar to the k-means clustering algorithm, the hierarchical clustering algorithm does not use training examples, but rather uses all the known data points to separate the data points into different clusters.

Figure 26:
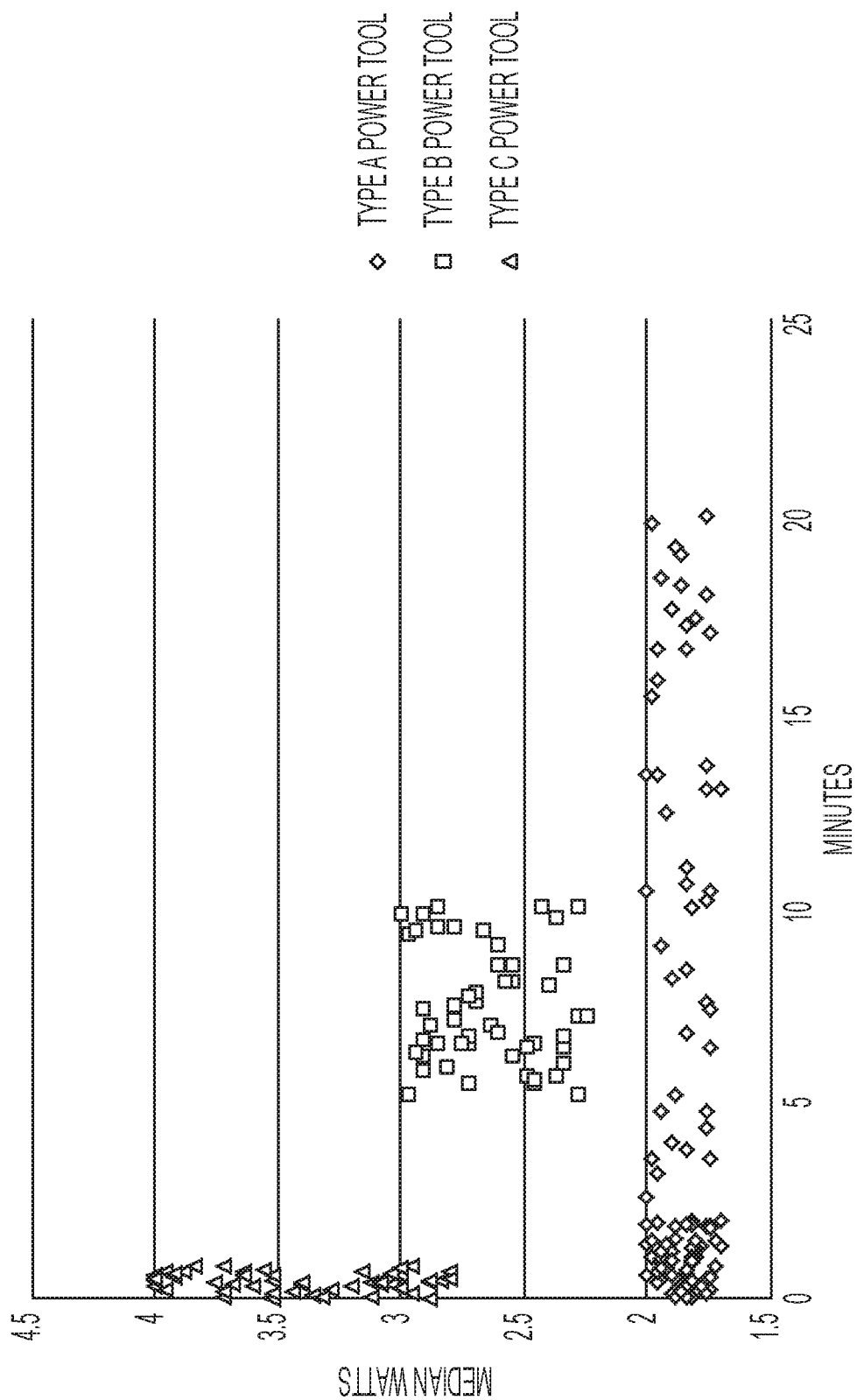
FIG. 26 is an example graphical user interface illustrating an analysis of the data from the power system of FIG. 25 by the machine learning controller.

After receiving the sensor output signals from the power box 1305, the machine learning controller 540 identifies the different power usage of different power tools (e.g., by implementing, for example, one of the clustering algorithms described above). As shown in FIG. 25, the machine learning controller 540 can categorize the power tools connected to the power box 1305 based on their power usage and usage time. For example, FIG. 26 illustrates that generally a first type of power tool (e.g., power tool A) is used for longer periods of time but have utilize less power, while a second type of power tools and a third type of power tools typically utilize greater amount of power for shorter periods of time. Providing a graphical user interface similar to that shown in FIG. 26 may provide a user with a better estimation of the overall power necessary for specific type of jobs or in a particular jobsite.

Figure 27:
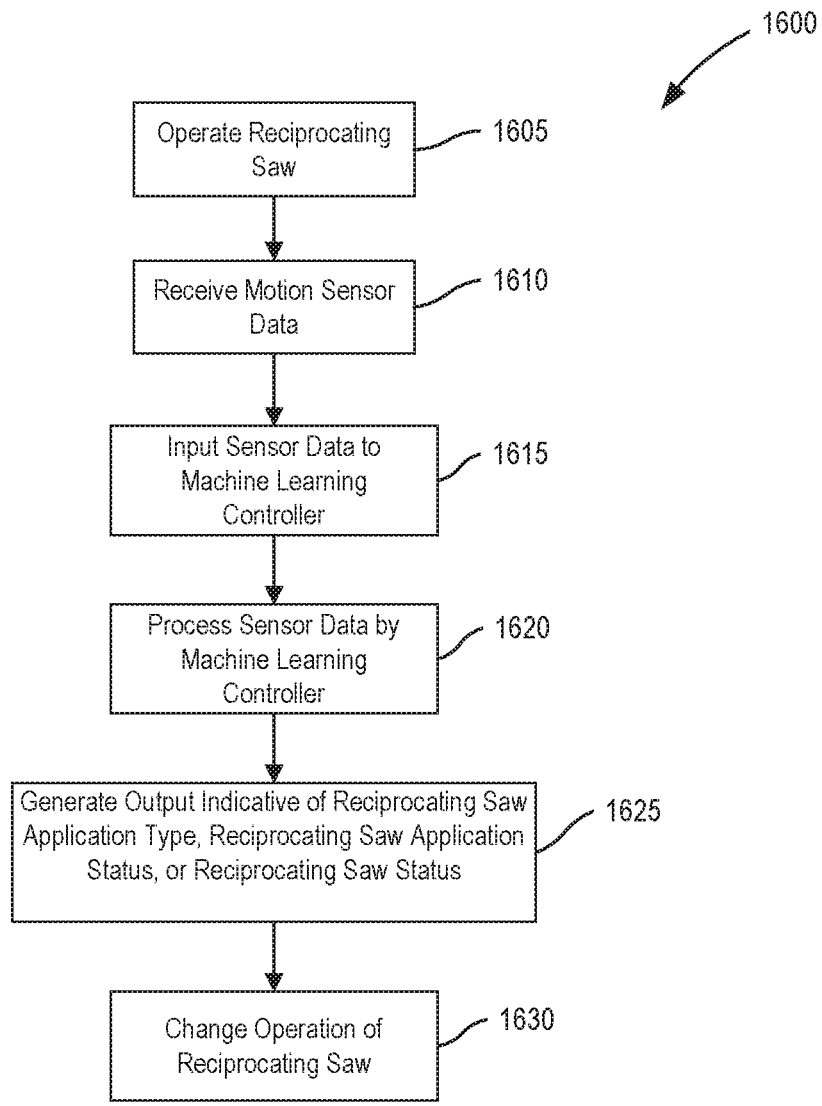
FIG. 27 is a flowchart illustrating a method of using a machine learning controller 540 to monitor and control a power tool based on motion monitoring using a high sampling rate.
Figure 28:
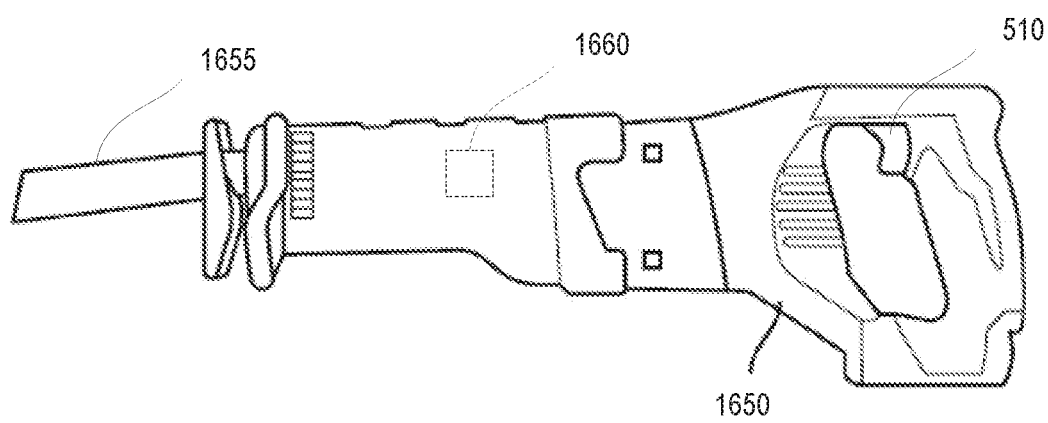
FIG. 28 illustrates a reciprocating saw for use with the flowchart of FIG. 27.

FIG. 27 is a flowchart illustrating a method 1600 of using the machine learning controller 540 to monitor and control the power tool 500 based on motion monitoring using a high sampling rate (e.g., a rate above 2.5 kHz, 5 kHz, 10 kHz, 20 kHz, 25 kHz, or 50 kHz, or a rate between about 2.5 kHz and 50 kHz). The flowchart of FIG. 27 is described with respect to a reciprocating saw 1650 illustrated in FIG. 28, which is an example of the power tool 500 illustrated in FIG. 5. The reciprocating saw 1650 of FIG. 28 drives a blade 1655 using a motor (i.e., with reference to FIG. 5, the motor 505) in response to a pull of the trigger 510. Additionally, the reciprocating saw 1650 includes a motion sensor 1660, which is an example of one of the sensors 530 (see FIG. 5). The motion sensor 1660 may be, for example, an accelerometer, gyroscope, microphone, or other sensor configured to sense motion at a high sampling rate. In some embodiments, the motion sensor 1660 may be integrated into a housing of the reciprocating saw 1650. In some embodiments, the motion sensor 1660 may be coupled to the housing of the reciprocating saw 1650, such as an aftermarket or retrofit motion sensor 1660. Accordingly, existing power tools without an integrated motion sensor may be provided with benefits described herein. As the reciprocating saw 1650 is an example of the power tool 500, the description of the power tool 500 and its various embodiments apply to the reciprocating saw 1650 and they are not restated.

Returning to FIG. 27, the method 1600 includes, at block 1605, operating the reciprocating saw 1650. For example, in response to a trigger pull of the trigger 510, the electronic processor 550 (FIG. 5) drives the motor 505 via the switching network 517, which reciprocates the blade 1655. The motor 505 is coupled to the blade 1655 via a transmission, typical of reciprocating saws, that converts rotational output of the motor 505 to reciprocating motion of the blade 1655.

During an operation of the reciprocating saw 1650, the electronic processor 550 receives motion sensor data from the motion sensor 1660 (block 1610). The motion sensor data may take the form of time-series data having magnitude of sensed motion over time. For example, in the case of a three-axis accelerometer, the motion data includes magnitude for one axis of motion (e.g., the x-axis) relative to time. In other embodiments, multiple axes of motion data is used, or derivatives or integrals of the motion data is used. In some embodiments, the motion sensor data is processed by the electronic processor 550 to, for example, subtract a no-load noise motion data sample (e.g., a known motion data sample captured when the reciprocating saw 1650 is operating without engaging a workpiece or without a blade attached), improving clarity of the motion data. The motion data, raw or processed, can be, in effect, representative of the sound of the reciprocating saw 1650 in operation.

In block 1615, the electronic processor 550 provides the motion data, raw or processed, to the machine learning controller 540. The machine learning controller 540, in turn, processes the motion data using the machine learning control 585 (block 1620). The particular processing depends on the particular machine learning model implemented by the machine learning control 585. Examples of processing by the machine learning controller 540 are provided above in the description of processing by the various machine learning models.

In block 1625, the machine learning controller 540 generates an output to the electronic processor 550 indicative of one or more from the group of a reciprocating saw application type, reciprocating saw application status, and reciprocating saw status. The reciprocating saw application type indicates a current application of the reciprocating saw and includes, for example, one or more of the type of blade (e.g., wood cutting blade, metal cutting blade, fine tooth blade, multi-purpose blade) and the type of workpiece including the material type (e.g., plastic, metal, hard wood, soft wood) and the material shape (e.g., block, sheet, pipe, solid cylinder). The reciprocating saw application status indicates a current status of an application of the reciprocating saw and includes, for example, one or more of an unloaded state, initial loading/cutting state, and breakthrough/cut completed state. The reciprocating saw status indicates a current status of the reciprocating saw and includes, for example, one or more of a worn blade, a broken blade, a bound blade, and a blade engaged a foreign material with workpiece (e.g., nail or screw in wood), and excessive tool vibration. In other words, the machine learning controller 540 classifies the motion data received in block 1615 and generates an output indicative of the one or more classifications in block 1625.

In block 1630, the electronic processor 550 changes operation of the reciprocating saw 1650 based on the received output from the machine learning controller 540. For example, the electronic processor 550 changes speed of the motor 505, changes the current or power to the motor 505, changes the stroke of the blade, changes the orbit of the blade (e.g., by sending a drive signal to an actuator or other electro-mechanical element coupled to the drive train between the motor 505 and the blade 1655), or the like. For example, the speed, current, power, stroke, orbit, or other operating parameter of the reciprocating saw 1650 are changed according to the application type to improve efficiency of power consumption, cut speed, or blade life. In some embodiments, the electronic processor 550 includes a lookup table that maps outputs from the machine learning controller 540 to stored operating parameter values that achieve improved efficiency, cut speed, or blade life. In some embodiments, similar to step 1445 of FIG. 21, in response to the machine learning controller 540 outputting the most likely application of the reciprocating saw 1650, the electronic processor 550 selects a corresponding operating mode profile stored on the reciprocating saw 1650 or external device 107 based on the output from the machine learning controller 540 (e.g., using a lookup table), and controls the motor 505 according to the selected operating mode profile.

In some embodiments, in addition or instead of changing the operation of the reciprocating saw directly, the electronic processor 550 notifies the user of the generated output via an audible, visual, or tactile alert on the reciprocating saw 1650 (e.g., via a speaker, display, or vibration device) or notifies the user via a communication to the external device 107 (e.g., a smart phone) that displays or otherwise conveys the output to a user. In some embodiments, the external device 107 provides suggestions to the user to adjust loading or speed to improve performance of blade life based on the generated output (see, e.g., FIG. 15).

Further, in some embodiments, the reciprocating saw 1650 includes a plurality of selectable operating mode profiles, each specifying one or more of, for example, a particular motor speed, torque, current, ramp up period, breakthrough threshold, and the like. To select between the operating mode profiles, the reciprocating saw 1650 may include a push button, a rotary dial, or the like, to allow a user to provide a selection input signal to the electronic processor 550. In some embodiments, one such selectable operating mode profile is referred to as a machine learning profile that, when enabled, causes the reciprocating saw 1650 to implement the method 1600 of FIG. 27. When not selected, the reciprocating saw 1650 implements an operating mode profile in which the machine learning functions of the method 1600 are disabled.

Additionally, while the method 1600 of FIG. 27 refers to receiving and processing motion data to generate the output in block 1625, in some embodiments, the machine learning controller 540 in the method 1600 also receives and processes other types of data, in conjunction with the motion data, to generate the output in block 1625. In other words, in the processing step 1620, the machine learning control 585 may classify input data received in block 1615, including motion data as well as other operational data (e.g., current draw, voltage, temperature, etc.), to generate the output in block 1625. The additional operational data can provide further context to the machine learning controller 540 from which to identify the reciprocating saw application type, reciprocating saw application status, and reciprocating saw status.

Furthermore, while the method 1600 of FIG. 27 is described with respect to a reciprocating saw, in some embodiments, the method 1600 is implemented by other examples of the power tool 500, such as circular saws, jigsaws, bandsaws, drills-drivers, impact drivers, hammer drills-drivers, and the like. In other words, the motion data (alone or in combination with other operational data) for other tool types may be processed by the machine learning controller 540 to generate outputs for and control operation of these other power tool types. In Table 5, below, a list of example power tools that implement the method 1600 and associated examples of output indications (e.g., tool application types, tool application statuses, and tool statuses) that are provided by the output (in block 1625) through implementing the method 1600 are provided.

TABLE 5

| Power Tool Type | Output Indication |
| --- | --- |
| Drill, ratchet, screw gun | Detection of bit change, a no load condition, hitting a nail or a second material in a first material, drilling breakthrough, workpiece material(s), drilling accessory, steps in a step bit, binding (and hints of future binding), workpiece fracture or splitting, lost accessory engagement, user grip and/or side handle use, fastening application, fastening materials, fasteners, workpiece fracture or splitting, fastener seating, lost fastener engagement and stripping, user grip and/or side handle use |
| Impact driver | Detection of socket characteristics such as deep vs short, of hard vs. soft joints, of tight vs loose fasteners, of worn vs new anvils and sockets, of characteristic impact timing |
| Drain cleaner | Detection of encountering clogs, of windup, of directional changes, of approximate length of cord, of cord breakage, end effector type |
| Circular saw, reciprocating saw, jig saw, chainsaw, table saw, miter saw | Detection of turning, blade binding, blade breakage, blade type, material(s) type, blade wear, type of blade, condition of blade (wear, heat), detection of blade orbit/motion/stroke/tpi/ speed/etc., blade tension (chain saw) |
| Vacuum | Detection of clogs, identification of placement on hard surface or up in the air (characterized in part by adjacent surface contact vibrations) |
| Knockout tool | Detection of improper alignment, breakthrough, die wear |
| Cut tool | Detection of fracturing of brittle material, e.g., polyvinyl chloride (PVC) |
| String trimmer | Detection of hardness, density, and potential location of contacted bodies |
| Hedge trimmer | Detection of type of cutting application, hitting wire and/or metal, cutting surface wear/breakage |
| Various power tools: | Detection of failure modes, including bearing failures, gearbox failures, and power switch failures (e.g., fetting) |
| Transfer pump | Detection of clogs, liquid characteristics |
| Crimpers | Detection of uncentered applications, slippage, improper die and crimp combinations |
| Sanders | Detection of state of sanding material, likely material, if on flat surface or suspended |
| Multitool | Detection of application, blade, blade wear, contact vs. no contact |
| Grinder/cutoff wheel | Detection of application, abrasive wheel, wheel wear, wheel chip, wheel fracture, etc. |
| Bandsaw | Detection of application, cut finish, blade health, blade type |
| Rotary | hammer Detection of contact with rebar, high debris situations, or build-up |
| Rotary tool | Detection of application, accessory, accessory wear |
| Inflator | Detection of tire burst or leak (e.g., in valve) |

As discussed above with respect to FIGS. 1-28, the machine learning controller 540 has various applications and can provide the power tool 500 with an ability to analyze various types of sensor data and received feedback. Generally, the machine learning controller 540 may provide various levels of information and usability to the user of the power tool 500. For example, in some embodiments, the machine learning controller 540 analyzes usage data from the power tool 500 and provides analytics that help the user make more educated decisions. For example, the graph on FIG. 26 can provide the user with an accurate idea of the distribution of power in a particular worksite or area. In some embodiments, the machine learning controller 540 may notify a user regarding, for example, when to purchase or order compatible parts (e.g., screws, sanding material, etc.) to continue with the operation of the power tool 500. In other embodiments, such as, for example the method 1400 illustrated in FIG. 21, the machine learning controller 540 generates specific parameters and thresholds for the electronic processor 550 to use when controlling the motor 505. In yet other embodiments, the machine learning controller 540 classifies or identifies specific conditions of the operation of the power tool 500 (e.g., identifying a particular application of the power tool 500, detecting an abnormal condition, and the like) and provides the identification or classification output to the electronic processor 550. The electronic processor 550 may then determine, based on the output from the machine learning controller 540, which parameters and thresholds to use to optimize the operation of the power tool 500. Additionally, although some implementations of the machine learning controller 540 were illustrated and discussed in detail above, the machine learning controller 540 may be implemented in other power tools and may include different functionality. Additionally, the machine learning controller 540 may be implemented in power tools which are used by a plurality of users. Table 6 below lists a plurality of different implementations or applications of the machine learning controller 540. For each application, Table 6 lists potential inputs to the machine learning controller 540 that would provide sufficient insight for the machine learning controller 540 to provide the listed potential output(s). The inputs are provided by various sources, such as the sensors 530, as described above.

TABLE 6

| Machine Learning Application | Potential Inputs to Machine Learning Controller | Potential Output(s) from Machine Learning Controller |
| --- | --- | --- |
| Anti-kickback control | Motion sensor(s) and/or running data (i.e., motor current, voltage, speed, trigger, gearing, etc.); Optionally mode knowledge, sensitivity settings, detection of side handle, recent kickback, state of tethering, orientation, battery added rotational inertia | Kickback event indication (used as control signal to electronic processor 550 to stop motor), identification of user beginning to let up on trigger and responding faster |
| Fastener seated | Motion sensor(s) and/or running data; Optionally mode knowledge, past use | Fastener seated or near seated indication (used to stop or slow motor, begin state such as pulsing, increase kickback sensitivity temporarily, etc.) |
| Screw strip | Running data and/or motion (movement and/or position); Optionally settings (such as clutch settings), past screw stripping detection/accessory wear, mode knowledge | Screw stripping indication (used as control signal to electronic processor 550, which responds by, e.g., clutching out, backing motor off, updating settings, and/or pulsing motor) |
| Tool application identification (drills, impacts, saws, and others); Similarly: identification of material type, characteristic (e.g., thickness), or condition identification of accessory type or condition identification of power tool event (e.g., stripping, losing engagement with a fastener, binding, breakthrough) identification of power tool context (e.g., likely on a ladder based on tool acceleration) identification of rating of power tool performance | Running data (motor current, voltage, speed, trigger, gearing etc.), recent tool use (accessory change detections), timing, tool settings; Optionally past tool use, knowledge of likely applications (such as trade, common materials, etc.), sound (for material identifications), vibration patterns, nearby tools and/or their recent use, learning rate input or on/off switch, battery presence and properties, user gear selection, direction input, clutch settings, presence of tool attachments (like side handle), nearby tool use, location data | The output is one or more of tweaking of settings, switching modes or profiles (for example, as combinations of profiles), alerting a user to a condition, auto-gear selection, change or activation of output (e.g., reduce saw output if hit nail, turn on orbital motion if softer material, turn off after break through, etc.), use/accessory analytics (including suggestion/auto purchase of accessories, selling of such data to commercial partners, providing analytics of work accomplished); tool bit, blade, or socket identification and condition; workpiece fracturing; detection of hardness, density, and location of contacted objects; detection of uncentered applications, |

TABLE 6-continued

| Machine Learning Application | Potential Inputs to Machine Learning Controller | Potential Output(s) from Machine Learning Controller |
|---|---|---|
| | | slippage, improper die and crimp combinations; condition and identification of sanding material; suspended or level sanding position; tire burst or leak condition; detection of vacuum clogs, suction surface, and orientation; detection of pumping fluid characteristics; and identification of application, material type, material characteristic material condition, accessory type, accessory condition, power tool event, power tool context, and/or rating of power tool performance |
| Light duration/state | Running data, motion data (e.g., when placed on ground/hung on tool belt), nearby tools (e.g., lights), retriggers when light is going out | Optimize tool light duration during or after use; possible recognizing and responding to being picked up |
| Estimate of user condition (e.g., skill, aggressiveness, risk, fatigue) | Running data, detection of kickback, screw stripping, aggressiveness, timing (such as pacing, breaks, or hurriedness) | Safety risk level on jobsite or by user, usable in prevention or motivating insurance rates, or alert to user of detected condition as warning (e.g., fatigue warning) |
| Ideal charging rates | Past tool/battery use, time of day, stage of construction, battery charge states, presence of batteries | A charger may reduce speed of charging if the charger does not think a rapid charge will be necessary for a user (may extend overall battery life) |
| Ideal output (e.g., for a string trimmer) Note: similar for sanders/grinders/many saws, hammering devices, energy needed for nailers, grease gun/soldering iron/ glue gun output | Running and motion data, timing | Detection of contact (resistance) helps to determine height of user as well as typical angle/motion for expecting contact. Running model of string length can help to optimize speed for consistent performance |
| Identification of user | Running data, motion, and/or location data, data from other tools, timing | Useful for tool security features and more quickly setting preferences- especially in a shared tools environment |
| Tool health and maintenance | Running data, motion, location, weather data, higher level identification such as applications, drops, temperature sensors | Identification or prediction of wear, damage, etc., use profile in coordination with customized warrantee rates |
| Precision Impact | Running data, motion, application knowledge (including input of fastener types), timing of use, settings, feedback from digital torque wrench, desired torque or application input | Identification of star pattern for lug nuts, estimate for auto-stop to improve consistency, warning to user for over/under/unknown output |
| Characteristic positive or negative feedback | Tool motion, restarts, or changes in input, trigger depression, tool shaking, feedback buttons | This can feed many other machine learning control blocks and logic flows as well as provide useful analytics on user satisfaction |

In one embodiment, the machine learning controller 540 may be used to analyze operational data for a tool 500 to identify a user currently using the tool. As users may operate the same tool 500 in different manners or for different tasks, the machine learning controller 540 may change the operation of the power tool 500 or a training of the machine learning controller 540 based on characteristics of an identified user, such as the user's trade, present geographic area, age, gender, strength, physical dimensions, or any other characteristics as desired. Accordingly, a plurality of machine learning controllers 540 in respective power tools 500 may provide a similar experience between power tools 500 for respective users. With respect to FIG. 7, for example, sensor signals are input to the machine learning controller 540 (step 715). The machine learning controller may then output (step 720) an identity of the user currently using the tool based on the sensor signals, and tool is then operated based on output (i.e., the identity of the user) (step 725). For example, a power tool may be operated with a reduced maximum motor current or a more sensitive anti-kickback feature with reduced triggering thresholds based on the identity of the user currently using the tool, which may indicate a user preference or user characteristic. The particular identity of the user may be associated with one or more user preferences or characteristics in a lookup table stored locally on the power tool 500 or remotely on an external system device. In some embodiments, the identity of the user is fed back into a further machine learning program of the machine learning controller 540 that is used to generate a further output on which operation of the motor is based.

In one embodiment, the machine learning controller 540 may be used to analyze movement data for tools 500 performing applications during development of the tools 500 and then the resulting pattern recognition information may be included on machine learning controllers 540 that are sold such that tools are pre-trained.

In another embodiment, direct user feedback (button, manual phone input, shaking/hitting tool, override of application mode.) can also be useful input to the machine learning controller 540. A user might provide a "how much to obey the machine learning controller 540 recommendation vs. the trigger" setting such that there is override capability. This could be via an app, a tool input (ex: slider, dial, button) or via trigger switch 555 (multi-stage, function of input, nonlinear trigger, etc.).

Additionally, the machine learning controller's 540 programming may be periodically adjusted by updates, e.g., over the air updates, etc. User input with "most common applications" and other defining characteristics or preferences ("I like to preserve blades over cut fast," "I strongly prefer vibration minimization" etc.) all may feed into the machine learning controller 540. In some embodiments, a user preference or characteristic persists between or across power tools. For example, a user preference for minimized vibration may be used to train a machine learning controller 540 or operate a power tool of a similar type previously used by the user. Alternatively, or in addition, such a user preference or user characteristic may be used to train a machine learning controller 540 or operate a power tool of a dissimilar type previously used by the user. For example, a user with a preference for minimized vibration in an impact driver may be provided a reciprocating saw with a machine learning program pre-trained for minimized vibration.

Accordingly, as discussed above with respect to FIGS. 1-26, the machine learning controller 540 can provide the power tool 500 with an ability to analyze various types of sensor data and provide feedback to the user by one or more of implementing or suggesting changes to an operational mode of the power tool 500, changing the operation of the power tool 500, or providing analytics regarding the use of specific power tools or power tool devices (e.g., power boxes).

Thus, embodiments described herein provide, among other things, power tools and related systems including a machine learning controller to control a feature or function of the power tool or related system. Various features and advantages of the embodiments are set forth in the following claims.

We claim:
1. A power tool comprising:
a housing;
a sensor supported by the housing and configured to generate sensor data associated with the power tool, wherein the sensor data includes one or more of motor speed data, motor current data, battery voltage data, and motion data of the power tool;
a machine learning controller including a first processor and a first memory, the machine learning controller supported by the housing, coupled to the sensor, and including a machine learning control program, the machine learning controller configured to:
  receive the sensor data,
  process the sensor data, using the machine learning control program, wherein the machine learning control program is a trained machine learning control program, and
  generate, using the machine learning control program, an output based on the sensor data, wherein the output includes an indication of a detected application of the power tool, the application corresponding to at least one selected from the group of a type of fastener, a type of implement driven by the power tool, and a type of material on which the power tool is working;
a motor supported by the housing; and
an electronic controller including a second processor and a second memory, the electronic controller supported by the housing, coupled to the motor and to the machine learning controller, the electronic controller configured to:
  receive the output from the machine learning controller, and
  control the motor based on the output.
2. The power tool of claim 1, wherein the machine learning control program is generated on an external system device through training based on example sensor data and associated outputs and is received by the power tool from the external system device.
3. The power tool of claim 2, wherein the machine learning control program is a static machine learning control program.
4. The power tool of claim 1, further comprising a wireless communication device configured to receive a machine learning control program update wirelessly from an external system device,
  wherein the machine learning control program is an adjustable machine learning control program and the machine learning controller is configured to update the machine learning program based on the machine learning control program update.
5. The power tool of claim 4,
  wherein the power tool is configured to receive feedback regarding the control of the motor based on the output and to provide the feedback and the sensor data to the external system device via the wireless communication device, and
  wherein the machine learning control program update is generated by the external system device through further training based on the feedback and the sensor data.
6. The power tool of claim 1, wherein the machine learning controller is further configured to:
  receive feedback regarding the control of the motor based on the output,
  provide the feedback to the machine learning control program to train the machine learning control program,
  receive further sensor data from the sensor, process the further sensor data, using the machine learning control program trained with the feedback, and
generate, using the machine learning control program trained with the feedback, a further output based on the further sensor data.
7. The power tool of claim 1, wherein the machine learning controller is further configured to:
receive feedback from another power tool,
provide the feedback to the machine learning control program to train the machine learning control program,
receive further sensor data from the sensor,
process the further sensor data, using the machine learning control program trained with the feedback, and
generate, using the machine learning control program trained with the feedback, a further output based on the further sensor data.
8. The power tool of claim 1, wherein the machine learning controller is further configured to receive a request to adjust, from user input, at least one selected from the group of a learning rate and a switching rate, and to adjust the at least one selected from the group of the learning rate and the switching rate of the machine learning control program based on the request.
9. The power tool of claim 1, wherein the output indicates to the electronic controller at least one selected from the group of:
to change an operational threshold of the power tool,
to change to a stored operating mode profile,
a condition of at least one selected from the group of the power tool, a fastener being drive by the power tool, an accessory of the power tool, a workpiece on which the power tool is working,
a power tool event,
a power tool context,
an identity of a user of the power tool,
a rating of power tool performance,
a safety risk level, and
a condition of a user of the power tool.
10. A method of operating a power tool comprising:
generating, by a sensor of the power tool, sensor data associated with the power tool, wherein the sensor data includes one or more of motor speed data, motor current data, battery voltage data, and motion data of the power tool;
receiving, by a machine learning controller of the power tool, the sensor data, the machine learning controller including a first memory and a first processor configured to execute instructions stored on the first memory;
processing the sensor data, using a machine learning control program of the machine learning controller;
generating, using the machine learning control program, an output based on the sensor data, wherein the output data includes a condition of at least one selected from the group of a fastener being driven by the power tool, an accessory of the power tool, and a workpiece on which the power tool is working;
receiving, by an electronic controller of the power tool, the output from the machine learning controller, the electronic controller including a second memory and a second processor configured to execute instructions stored on the second memory; and
controlling, by the electronic controller, a motor of the power tool based on the output.
11. The method of claim 10, further comprising:
receiving, by the machine learning controller, the machine learning control program from an external system device, wherein the machine learning control program is generated on the external system device through training based on example sensor data and associated outputs.
12. The method of claim 10, further comprising:
receiving, by a wireless communication device of the power tool, a machine learning control program update wirelessly from an external system device; and
updating, by the machine learning controller, the machine learning program based on the machine learning control program update.
13. The method of claim 12, further comprising:
receiving, by the power tool, feedback regarding the control of the motor based on the output; and
providing the sensor data and the feedback to the external system device via the wireless communication device, wherein the machine learning control program update is generated by the external system device through further training based on the sensor data and the feedback.
14. The method of claim 10, further comprising:
receiving, by the machine learning controller, feedback regarding the control of the motor based on the output;
providing, by the machine learning controller, the feedback to the machine learning control program to train the machine learning control program;
receiving, by the machine learning controller, further sensor data from the sensor;
processing the further sensor data, using the machine learning control program trained with the feedback; and
generating, using the machine learning control trained with the feedback, a further output based on the further sensor data; and
controlling, by the electronic controller, the motor based on the output.
15. The method of claim 14, further comprising:
receiving, by the machine learning controller, a request to adjust at least one selected from the group of a learning rate and a switching rate; and
adjusting the at least one selected from the group of the learning rate and the switching rate of the machine learning control program based on the request.
16. The method of claim 10, wherein the output indicates to the electronic controller at least one selected from the group of:
to change an operational threshold of the power tool,
to change to a stored operating mode profile,
a condition of at least one selected from the group of the power tool, a fastener being drive by the power tool, an accessory of the power tool, a workpiece on which the power tool is working, and
a power tool event,
a power tool context,
an identity of a user of the power tool,
a rating of power tool performance,
a safety risk level, and
a condition of a user of the power tool.
17. The method of claim 10, further comprising:
receiving an input, via an activation switch, disabling the machine learning program.
18. An external system device in communication with a power tool, the external system device comprising:
a first transceiver for wirelessly communicating with a second transceiver positioned within a housing of the power tool; and
a first machine learning controller in communication with the first transceiver, the machine learning controller including an electronic processor and a memory, the first machine learning controller configured to:
receive, via the first transceiver, tool usage data from the power tool from the second transceiver including feedback collected by the power tool,
train a machine learning control program using the tool usage data to generate an updated machine learning control program, the updated machine learning control program configured to be executed by a second machine learning controller of the power tool to cause the second machine learning controller of the power tool to:
receive power tool sensor data as input, wherein the sensor data includes one or more of motor speed data, motor current data, battery voltage data, and motion data of the power tool,
process the power tool sensor data, using the machine learning control program, and
provide an output, on which motor control is to be based, to a power tool electronic controller that controls a motor of the power tool based on the processed sensor data, wherein the output includes a detected application of the power tool; and
transmit, via the transceiver, the updated machine learning control program to the power tool.

19. The external system device of claim 18, wherein the external system device is at least one selected from the group of a server, a smart telephone, a tablet computer, a laptop computer, and a wireless hub.

20. The external system device of claim 18, wherein the feedback is at least one selected from the group of positive feedback indicating a correct classification by the machine learning program and negative feedback indicating an incorrect classification by the machine learning program.

21. The external system device of claim 18, wherein the output indicates to the electronic controller at least one selected from the group of:
to change an operational threshold of the power tool,
to change to a stored operating mode profile,
a condition of at least one selected from the group of the power tool, a fastener being drive by the power tool, an accessory of the power tool, a workpiece on which the power tool is working, and
the detected application of the power tool, wherein the application corresponds to at least one selected from the group of a type of fastener, a type of implement driven by the power tool, and a type of material on which the power tool is working,
a power tool event,
a power tool context,
an identity of a user of the power tool,
a rating of power tool performance,
a safety risk level, and
a condition of a user of the power tool.

22. The external system device of claim 18, wherein the first machine learning controller is further configured to:
receive, via the first transceiver, further tool usage data from another power tool including further feedback collected by the power tool, and
train the machine learning control program using the further tool usage data to generate the updated machine learning control program that is transmitted to the power tool.

* * * * *